(12) United States Patent
Olcott et al.

(10) Patent No.: US 11,287,540 B2
(45) Date of Patent: Mar. 29, 2022

(54) METHODS FOR PET DETECTOR AFTERGLOW MANAGEMENT

(71) Applicant: RefleXion Medical, Inc., Hayward, CA (US)

(72) Inventors: Peter Demetri Olcott, Los Gatos, CA (US); Matthew Francis Bieniosek, Danville, CA (US); Brent Harper, New Glarus, WI (US)

(73) Assignee: RefleXion Medical, Inc., Hayward, CA (US)

( * ) Notice: Subject to any disclaimer, the term of this patent is extended or adjusted under 35 U.S.C. 154(b) by 0 days.

(21) Appl. No.: 16/887,896

(22) Filed: May 29, 2020

(65) Prior Publication Data

US 2020/0363540 A1 Nov. 19, 2020

Related U.S. Application Data

(63) Continuation of application No. 16/033,125, filed on Jul. 11, 2018, now Pat. No. 10,795,037.

(Continued)

(51) Int. Cl.
*G01T 1/29* (2006.01)
*G01T 7/00* (2006.01)
(Continued)

(52) U.S. Cl.
CPC ............ *G01T 1/2985* (2013.01); *G01T 1/172* (2013.01); *G01T 1/208* (2013.01); *G01T 1/2023* (2013.01); *G01T 7/005* (2013.01)

(58) Field of Classification Search
CPC ..... G01T 1/2985; G01T 1/172; G01T 1/2023; G01T 1/208; G01T 7/005
See application file for complete search history.

(56) References Cited

U.S. PATENT DOCUMENTS 3,418,475 A 12/1968 Hudgens
3,668,399 A 6/1972 Cahill et al.
(Continued)

FOREIGN PATENT DOCUMENTS

CN 1681436 A 10/2005
CN 1960780 A 5/2007
(Continued)

OTHER PUBLICATIONS

Chang, J.Y. et al. (2008). "Image-guided radiation therapy for non-small cell lung cancer," *J. Thorac. Oncol.* 3(2):177-186.
(Continued)

*Primary Examiner* — Blake C Riddick
(74) *Attorney, Agent, or Firm* — Cooley LLP

(57) ABSTRACT

Disclosed herein are methods and devices for the acquisition of positron emission (or PET) data in the presence of ionizing radiation that causes afterglow of PET detectors. In one variation, the method comprises adjusting a coincidence trigger threshold of the PET detectors during a therapy session. In one variation, the method comprises adjusting a gain factor used in positron emission data acquisition (e.g., a gain factor used to multiply and/or shift the output(s) of a PET detector(s)) during a therapy session. In some variations, a method for acquiring positron emission data during a radiation therapy session comprises suspending communication between the PET detectors and a signal processor of a controller for a predetermined period of time after a radiation pulse has been emitted by the linac.

43 Claims, 25 Drawing Sheets

Related U.S. Application Data

(60) Provisional application No. 62/531,260, filed on Jul. 11, 2017.

(51) Int. Cl.
*G01T 1/202* (2006.01)
*G01T 1/172* (2006.01)
*G01T 1/208* (2006.01)

(56) References Cited

U.S. PATENT DOCUMENTS

| | | |
|---|---|---|
| 3,794,840 A | 2/1974 | Scott |
| 3,869,615 A | 3/1975 | Hoover et al. |
| 3,906,233 A | 9/1975 | Vogel |
| 4,361,902 A | 11/1982 | Brandt et al. |
| 4,389,569 A | 6/1983 | Hattori et al. |
| 4,503,331 A | 3/1985 | Kovacs, Jr. et al. |
| 4,529,882 A | 7/1985 | Lee |
| 4,563,582 A | 1/1986 | Mullani |
| 4,575,868 A | 3/1986 | Ueda et al. |
| 4,628,499 A | 12/1986 | Hammett |
| 4,642,464 A | 2/1987 | Mullani |
| 4,647,779 A | 3/1987 | Wong |
| 4,677,299 A | 6/1987 | Wong |
| 4,771,785 A | 9/1988 | Duer |
| 4,868,844 A | 9/1989 | Nunan |
| 5,075,554 A | 12/1991 | Yunker et al. |
| 5,099,505 A | 3/1992 | Seppi et al. |
| 5,117,445 A | 5/1992 | Seppi et al. |
| 5,168,532 A | 12/1992 | Seppi et al. |
| 5,206,512 A | 4/1993 | Iwao |
| 5,207,223 A | 5/1993 | Adler |
| 5,272,344 A | 12/1993 | Williams |
| 5,317,616 A | 5/1994 | Swerdloff et al. |
| 5,329,567 A | 7/1994 | Ikebe |
| 5,351,280 A | 9/1994 | Swerdloff et al. |
| 5,390,225 A | 2/1995 | Hawman |
| 5,394,452 A | 2/1995 | Swerdloff et al. |
| 5,396,534 A | 3/1995 | Thomas |
| 5,418,827 A | 5/1995 | Deasy et al. |
| 5,442,675 A | 8/1995 | Swerdloff et al. |
| 5,548,627 A | 8/1996 | Swerdloff et al. |
| 5,661,773 A | 8/1997 | Swerdloff et al. |
| 5,668,371 A | 9/1997 | Deasy et al. |
| 5,724,400 A | 3/1998 | Swerdloff et al. |
| 5,751,781 A | 5/1998 | Brown et al. |
| 5,813,985 A | 9/1998 | Carroll |
| 5,818,902 A | 10/1998 | Yu |
| 5,851,182 A | 12/1998 | Sahadevan |
| 5,889,834 A | 3/1999 | Vilsmeier et al. |
| 5,937,028 A | 8/1999 | Tybinkowski et al. |
| 5,946,425 A | 8/1999 | Bove, Jr. et al. |
| 5,954,647 A | 9/1999 | Bova et al. |
| 6,023,494 A | 2/2000 | Senzig et al. |
| 6,180,943 B1 | 1/2001 | Lange |
| 6,184,530 B1 | 2/2001 | Hines et al. |
| 6,188,748 B1 | 2/2001 | Pastyr et al. |
| 6,255,655 B1 | 7/2001 | McCroskey et al. |
| 6,260,005 B1 | 7/2001 | Yang et al. |
| 6,271,517 B1 | 8/2001 | Kroening, Jr. et al. |
| 6,281,505 B1 | 8/2001 | Hines et al. |
| 6,385,288 B1 | 5/2002 | Kanematsu |
| 6,396,902 B2 | 5/2002 | Tybinkowski et al. |
| 6,438,202 B1 | 8/2002 | Olivera et al. |
| 6,449,331 B1 | 9/2002 | Nutt et al. |
| 6,449,340 B1 | 9/2002 | Tybinkowski et al. |
| 6,455,856 B1 | 9/2002 | Gagnon |
| 6,459,769 B1 | 10/2002 | Cosman |
| 6,504,899 B2 | 1/2003 | Pugachev et al. |
| 6,560,311 B1 | 5/2003 | Shepard et al. |
| 6,618,467 B1 | 9/2003 | Ruchala et al. |
| 6,624,451 B2 | 9/2003 | Ashley et al. |
| 6,628,744 B1 | 9/2003 | Luhta et al. |
| 6,661,866 B1 | 12/2003 | Limkeman et al. |
| 6,696,694 B2 | 2/2004 | Pastyr et al. |
| 6,700,949 B2 | 3/2004 | Susami et al. |
| 6,714,076 B1 | 3/2004 | Kalb |
| 6,730,924 B1 | 5/2004 | Pastyr et al. |
| 6,735,277 B2 | 5/2004 | McNutt et al. |
| 6,778,636 B1 | 8/2004 | Andrews |
| 6,792,078 B2 | 9/2004 | Kato et al. |
| 6,794,653 B2 | 9/2004 | Wainer et al. |
| 6,810,103 B1 | 10/2004 | Tybinkowski et al. |
| 6,810,108 B2 | 10/2004 | Clark et al. |
| 6,831,961 B1 | 12/2004 | Tybinkowski et al. |
| 6,865,254 B2 | 3/2005 | Nafstadius |
| 6,888,919 B2 | 5/2005 | Graf |
| 6,914,959 B2 | 7/2005 | Bailey et al. |
| 6,934,363 B2 | 8/2005 | Seufert |
| 6,965,661 B2 | 11/2005 | Kojima et al. |
| 6,976,784 B2 | 12/2005 | Kojima et al. |
| 6,990,175 B2 | 1/2006 | Nakashima et al. |
| 7,020,233 B1 | 3/2006 | Tybinkowski et al. |
| 7,026,622 B2 | 4/2006 | Kojima et al. |
| 7,110,808 B2 | 9/2006 | Adair |
| 7,129,495 B2 | 10/2006 | Williams et al. |
| 7,154,096 B2 | 12/2006 | Amano |
| 7,167,542 B2 | 1/2007 | Juschka et al. |
| 7,188,999 B2 | 3/2007 | Mihara et al. |
| 7,199,382 B2 | 4/2007 | Rigney et al. |
| 7,227,925 B1 | 6/2007 | Mansfield et al. |
| 7,242,750 B2 | 7/2007 | Tsujita |
| 7,263,165 B2 | 8/2007 | Ghelmansarai |
| 7,265,356 B2 | 9/2007 | Pelizzari et al. |
| 7,280,633 B2 | 10/2007 | Cheng et al. |
| 7,291,840 B2 | 11/2007 | Fritzler et al. |
| 7,297,958 B2 | 11/2007 | Kojima et al. |
| 7,298,821 B2 | 11/2007 | Ein-Gal |
| 7,301,144 B2 | 11/2007 | Williams et al. |
| 7,310,410 B2 | 12/2007 | Sohal et al. |
| 7,331,713 B2 | 2/2008 | Moyers |
| 7,338,207 B2 | 3/2008 | Gregerson et al. |
| 7,386,099 B1 | 6/2008 | Kasper et al. |
| 7,397,901 B1 | 7/2008 | Johnsen |
| 7,397,902 B2 | 7/2008 | Seeber et al. |
| 7,405,404 B1 | 7/2008 | Shah |
| 7,412,029 B2 | 8/2008 | Myles |
| 7,433,503 B2 | 10/2008 | Cherek et al. |
| 7,439,509 B1 | 10/2008 | Grazioso et al. |
| 7,446,328 B2 | 11/2008 | Rigney et al. |
| 7,453,983 B2 | 11/2008 | Schildkraut et al. |
| 7,453,984 B2 | 11/2008 | Chen et al. |
| 7,469,035 B2 | 12/2008 | Keall et al. |
| 7,545,911 B2 | 6/2009 | Rietzel et al. |
| 7,555,103 B2 | 6/2009 | Johnsen |
| 7,558,378 B2 | 7/2009 | Juschka et al. |
| 7,560,698 B2 | 7/2009 | Rietzel |
| 7,564,951 B2 | 7/2009 | Hasegawa et al. |
| 7,596,209 B2 | 9/2009 | Perkins |
| 7,627,082 B2 | 12/2009 | Kojima et al. |
| 7,639,853 B2 | 12/2009 | Olivera et al. |
| 7,656,999 B2 | 2/2010 | Hui et al. |
| 7,679,049 B2 | 3/2010 | Rietzel |
| 7,715,606 B2 | 5/2010 | Jeung et al. |
| 7,742,575 B2 | 6/2010 | Bourne |
| 7,755,054 B1 | 7/2010 | Shah et al. |
| 7,755,055 B2 | 7/2010 | Schilling |
| 7,755,057 B2 | 7/2010 | Kim |
| 7,778,691 B2 | 8/2010 | Zhang et al. |
| 7,792,252 B2 | 9/2010 | Bohn |
| 7,795,590 B2 | 9/2010 | Takahashi et al. |
| 7,800,070 B2 | 9/2010 | Weinberg et al. |
| 7,820,975 B2 | 10/2010 | Laurence et al. |
| 7,839,972 B2 | 11/2010 | Ruchala et al. |
| 7,847,274 B2 | 12/2010 | Kornblau et al. |
| 7,869,562 B2 | 1/2011 | Khamene et al. |
| 7,885,371 B2 | 2/2011 | Thibault et al. |
| 7,939,808 B1 | 5/2011 | Shah et al. |
| 7,942,843 B2 | 5/2011 | Tune et al. |
| 7,952,079 B2 | 5/2011 | Neustadter et al. |
| 7,957,507 B2 | 6/2011 | Cadman |
| 7,965,819 B2 | 6/2011 | Nagata |
| 7,983,380 B2 | 7/2011 | Guertin et al. |
| 8,017,915 B2 | 9/2011 | Mazin |

(56) References Cited

U.S. PATENT DOCUMENTS

| | | |
|---|---|---|
| 8,019,042 B2 | 9/2011 | Shukla et al. |
| 8,059,782 B2 | 11/2011 | Brown |
| 8,063,376 B2 | 11/2011 | Maniawski et al. |
| 8,090,074 B2 | 1/2012 | Filiberti et al. |
| 8,093,568 B2 | 1/2012 | Mackie et al. |
| 8,116,427 B2 | 2/2012 | Kojima et al. |
| 8,139,713 B2 | 3/2012 | Janbakhsh |
| 8,139,714 B1 | 3/2012 | Sahadevan |
| 8,144,962 B2 | 3/2012 | Busch et al. |
| 8,148,695 B2 | 4/2012 | Takahashi et al. |
| 8,160,205 B2 | 4/2012 | Saracen et al. |
| 8,193,508 B2 | 6/2012 | Shchory et al. |
| 8,198,600 B2 | 6/2012 | Neustadter et al. |
| 8,232,535 B2 | 7/2012 | Olivera et al. |
| 8,239,002 B2 | 8/2012 | Neustadter et al. |
| 8,269,195 B2 | 9/2012 | Rigney et al. |
| 8,278,633 B2 | 10/2012 | Nord et al. |
| 8,280,002 B2 | 10/2012 | Bani-Hashemi et al. |
| 8,295,906 B2 | 10/2012 | Saunders et al. |
| 8,304,738 B2 | 11/2012 | Gagnon et al. |
| 8,306,185 B2 | 11/2012 | Bal et al. |
| 8,335,296 B2 | 12/2012 | Dehler et al. |
| 8,357,903 B2 | 1/2013 | Wang et al. |
| 8,384,049 B1 | 2/2013 | Broad |
| 8,395,127 B1 | 3/2013 | Frach et al. |
| 8,406,844 B2 | 3/2013 | Ruchala et al. |
| 8,406,851 B2 | 3/2013 | West et al. |
| 8,442,287 B2 | 5/2013 | Fordyce, II et al. |
| 8,447,387 B2 | 5/2013 | Xu et al. |
| 8,461,538 B2 | 6/2013 | Mazin |
| 8,461,539 B2 | 6/2013 | Yamaya et al. |
| 8,467,497 B2 | 6/2013 | Lu et al. |
| 8,483,803 B2 | 7/2013 | Partain et al. |
| 8,509,383 B2 | 8/2013 | Lu et al. |
| 8,520,800 B2 | 8/2013 | Wilfley et al. |
| 8,536,547 B2 | 9/2013 | Maurer, Jr. et al. |
| 8,537,373 B2 | 9/2013 | Humphrey |
| 8,581,196 B2 | 11/2013 | Yamaya et al. |
| 8,588,367 B2 | 11/2013 | Busch et al. |
| 8,617,422 B2 | 12/2013 | Koschan et al. |
| 8,641,592 B2 | 2/2014 | Yu |
| 8,664,610 B2 | 3/2014 | Chuang |
| 8,664,618 B2 | 3/2014 | Yao |
| 8,712,012 B2 | 4/2014 | O'Connor |
| 8,745,789 B2 | 6/2014 | Saracen et al. |
| 8,748,825 B2 | 6/2014 | Mazin |
| 8,767,917 B2 | 7/2014 | Ruchala et al. |
| 8,816,307 B2 | 8/2014 | Kuusela et al. |
| 8,873,710 B2 | 10/2014 | Ling et al. |
| 8,884,240 B1 | 11/2014 | Shah et al. |
| 8,992,404 B2 | 3/2015 | Graf et al. |
| 9,061,141 B2 | 6/2015 | Brunker et al. |
| 9,179,982 B2 | 11/2015 | Kunz et al. |
| 9,205,281 B2 | 12/2015 | Mazin |
| 9,360,570 B2 | 6/2016 | Rothfuss et al. |
| 9,370,672 B2 | 6/2016 | Parsai et al. |
| 9,437,339 B2 | 9/2016 | Echner |
| 9,437,340 B2 | 9/2016 | Echner et al. |
| 9,498,167 B2 | 11/2016 | Mostafavi et al. |
| 9,560,970 B2 | 2/2017 | Rose et al. |
| 9,575,192 B1 | 2/2017 | Ng et al. |
| 9,649,509 B2 | 5/2017 | Mazin et al. |
| 9,694,208 B2 | 7/2017 | Mazin et al. |
| 9,697,980 B2 | 7/2017 | Ogura et al. |
| 9,731,148 B2 | 8/2017 | Olivera et al. |
| 9,820,700 B2 | 11/2017 | Mazin |
| 9,878,180 B2 | 1/2018 | Schulte et al. |
| 9,886,534 B2 | 2/2018 | Wan et al. |
| 9,952,878 B2 | 4/2018 | Grimme et al. |
| 9,974,494 B2 | 5/2018 | Mostafavi et al. |
| 10,159,853 B2 | 12/2018 | Kuusela et al. |
| 10,327,716 B2 | 6/2019 | Mazin |
| 10,478,133 B2 | 11/2019 | Levy et al. |
| 10,603,515 B2 | 3/2020 | Olcott et al. |
| 10,695,586 B2 | 6/2020 | Harper et al. |
| 10,745,253 B2 | 8/2020 | Saracen et al. |
| 10,795,037 B2 | 10/2020 | Olcott et al. |
| 10,959,686 B2 | 3/2021 | Mazin |
| 11,007,384 B2 | 5/2021 | Olcott et al. |
| 2002/0051513 A1 | 5/2002 | Pugachev et al. |
| 2002/0148970 A1 | 10/2002 | Wong et al. |
| 2002/0163994 A1 | 11/2002 | Jones |
| 2002/0191734 A1 | 12/2002 | Kojima et al. |
| 2002/0193685 A1 | 12/2002 | Mate et al. |
| 2003/0036700 A1 | 2/2003 | Weinberg |
| 2003/0080298 A1 | 5/2003 | Karplus et al. |
| 2003/0105397 A1 | 6/2003 | Turner et al. |
| 2003/0108147 A1 | 6/2003 | Kojima et al. |
| 2003/0128801 A1 | 7/2003 | Eisenberg et al. |
| 2003/0219098 A1 | 11/2003 | McNutt et al. |
| 2004/0024300 A1 | 2/2004 | Graf |
| 2004/0030246 A1 | 2/2004 | Townsend et al. |
| 2004/0037390 A1 | 2/2004 | Mihara et al. |
| 2004/0057557 A1 | 3/2004 | Nafstadius |
| 2004/0158416 A1 | 8/2004 | Slates |
| 2004/0162457 A1 | 8/2004 | Maggiore et al. |
| 2005/0028279 A1 | 2/2005 | de Mooy |
| 2005/0104001 A1 | 5/2005 | Shah |
| 2005/0213705 A1 | 9/2005 | Hoffman |
| 2005/0228255 A1 | 10/2005 | Saracen et al. |
| 2006/0002511 A1 | 1/2006 | Miller et al. |
| 2006/0072699 A1 | 4/2006 | Mackie et al. |
| 2006/0113482 A1 | 6/2006 | Pelizzari et al. |
| 2006/0124854 A1 | 6/2006 | Shah |
| 2006/0173294 A1 | 8/2006 | Ein-Gal |
| 2006/0182326 A1 | 8/2006 | Schildkraut et al. |
| 2006/0193435 A1 | 8/2006 | Hara et al. |
| 2006/0208195 A1 | 9/2006 | Petrick et al. |
| 2006/0237652 A1 | 10/2006 | Kimchy et al. |
| 2007/0003010 A1 | 1/2007 | Guertin et al. |
| 2007/0003123 A1 | 1/2007 | Fu et al. |
| 2007/0014391 A1 | 1/2007 | Mostafavi et al. |
| 2007/0023669 A1 | 2/2007 | Hefetz et al. |
| 2007/0025513 A1 | 2/2007 | Ghelmansarai |
| 2007/0043289 A1 | 2/2007 | Adair |
| 2007/0053491 A1 | 3/2007 | Schildkraut et al. |
| 2007/0055144 A1 | 3/2007 | Neustadter et al. |
| 2007/0164239 A1 | 7/2007 | Terwilliger et al. |
| 2007/0211857 A1 | 9/2007 | Urano et al. |
| 2007/0221869 A1 | 9/2007 | Song |
| 2007/0265528 A1 | 11/2007 | Xu et al. |
| 2007/0270693 A1 | 11/2007 | Fiedler et al. |
| 2008/0002811 A1 | 1/2008 | Allison |
| 2008/0031404 A1 | 2/2008 | Khamene et al. |
| 2008/0043910 A1 | 2/2008 | Thomas |
| 2008/0103391 A1 | 5/2008 | Dos Santos Varela |
| 2008/0128631 A1 | 6/2008 | Suhami |
| 2008/0130825 A1 | 6/2008 | Fu et al. |
| 2008/0152085 A1 | 6/2008 | Saracen et al. |
| 2008/0156993 A1 | 7/2008 | Weinberg et al. |
| 2008/0203309 A1 | 8/2008 | Frach et al. |
| 2008/0205588 A1 | 8/2008 | Kim |
| 2008/0214927 A1 | 9/2008 | Cherry et al. |
| 2008/0217541 A1 | 9/2008 | Kim |
| 2008/0230705 A1 | 9/2008 | Rousso et al. |
| 2008/0251709 A1 | 10/2008 | Cooke et al. |
| 2008/0253516 A1 | 10/2008 | Hui et al. |
| 2008/0262473 A1 | 10/2008 | Kornblau et al. |
| 2008/0273659 A1 | 11/2008 | Guertin et al. |
| 2008/0298536 A1 | 12/2008 | Ein-Gal |
| 2009/0003655 A1 | 1/2009 | Wollenweber |
| 2009/0086909 A1 | 4/2009 | Hui et al. |
| 2009/0116616 A1 | 5/2009 | Lu et al. |
| 2009/0131734 A1 | 5/2009 | Neustadter et al. |
| 2009/0169082 A1 | 7/2009 | Mizuta et al. |
| 2009/0236532 A1 | 9/2009 | Frach et al. |
| 2009/0256078 A1 | 10/2009 | Mazin |
| 2009/0309046 A1 | 12/2009 | Balakin |
| 2010/0010343 A1 | 1/2010 | Daghighian et al. |
| 2010/0040197 A1 | 2/2010 | Maniawski et al. |
| 2010/0054412 A1 | 3/2010 | Brinks et al. |
| 2010/0063384 A1 | 3/2010 | Kornblau et al. |
| 2010/0065723 A1 | 3/2010 | Burbar et al. |
| 2010/0067660 A1 | 3/2010 | Maurer, Jr. et al. |

(56) References Cited

U.S. PATENT DOCUMENTS

| | | |
|---|---|---|
| 2010/0069742 A1 | 3/2010 | Partain et al. |
| 2010/0074400 A1 | 3/2010 | Sendai |
| 2010/0074498 A1 | 3/2010 | Breeding et al. |
| 2010/0166274 A1 | 7/2010 | Busch et al. |
| 2010/0176309 A1 | 7/2010 | Mackie et al. |
| 2010/0198063 A1 | 8/2010 | Huber et al. |
| 2010/0237259 A1 | 9/2010 | Wang |
| 2010/0276601 A1* | 11/2010 | Duraj .................. G01T 1/202 250/362 |
| 2011/0006212 A1 | 1/2011 | Shchory et al. |
| 2011/0044429 A1 | 2/2011 | Takahashi et al. |
| 2011/0073763 A1 | 3/2011 | Subbarao |
| 2011/0092814 A1 | 4/2011 | Yamaya et al. |
| 2011/0105895 A1 | 5/2011 | Kornblau et al. |
| 2011/0105897 A1 | 5/2011 | Kornblau et al. |
| 2011/0118588 A1 | 5/2011 | Kornblau et al. |
| 2011/0198504 A1 | 8/2011 | Eigen |
| 2011/0200170 A1 | 8/2011 | Nord et al. |
| 2011/0211665 A1 | 9/2011 | Maurer, Jr. et al. |
| 2011/0215248 A1 | 9/2011 | Lewellen et al. |
| 2011/0215259 A1 | 9/2011 | Iwata |
| 2011/0272600 A1 | 11/2011 | Bert et al. |
| 2011/0297833 A1 | 12/2011 | Takayama |
| 2011/0301449 A1 | 12/2011 | Maurer, Jr. |
| 2011/0309252 A1 | 12/2011 | Moriyasu et al. |
| 2011/0309255 A1 | 12/2011 | Bert et al. |
| 2011/0313231 A1 | 12/2011 | Guertin et al. |
| 2011/0313232 A1 | 12/2011 | Balakin |
| 2012/0035470 A1 | 2/2012 | Kuduvalli et al. |
| 2012/0068076 A1 | 3/2012 | Daghighian |
| 2012/0138806 A1 | 6/2012 | Holmes et al. |
| 2012/0161014 A1 | 6/2012 | Yamaya et al. |
| 2012/0174317 A1 | 7/2012 | Saracen et al. |
| 2012/0230464 A1 | 9/2012 | Ling et al. |
| 2012/0318989 A1 | 12/2012 | Park et al. |
| 2012/0323119 A1 | 12/2012 | Neustadter et al. |
| 2013/0025055 A1 | 1/2013 | Saracen et al. |
| 2013/0060134 A1 | 3/2013 | Eshima et al. |
| 2013/0092842 A1 | 4/2013 | Zhang et al. |
| 2013/0111668 A1 | 5/2013 | Wiggers et al. |
| 2013/0193330 A1 | 8/2013 | Wagadarikar et al. |
| 2013/0266116 A1 | 10/2013 | Abenaim et al. |
| 2013/0327932 A1 | 12/2013 | Kim et al. |
| 2013/0343509 A1 | 12/2013 | Gregerson et al. |
| 2014/0029715 A1 | 1/2014 | Hansen et al. |
| 2014/0107390 A1 | 4/2014 | Brown et al. |
| 2014/0163368 A1 | 6/2014 | Rousso et al. |
| 2014/0184197 A1 | 7/2014 | Dolinsky |
| 2014/0193336 A1 | 7/2014 | Rousso et al. |
| 2014/0217294 A1 | 8/2014 | Rothfuss et al. |
| 2014/0224963 A1 | 8/2014 | Guo et al. |
| 2014/0228613 A1 | 8/2014 | Mazin et al. |
| 2014/0239204 A1 | 8/2014 | Orton et al. |
| 2014/0257096 A1 | 9/2014 | Prevrhal et al. |
| 2014/0341351 A1 | 11/2014 | Berwick et al. |
| 2015/0018673 A1 | 1/2015 | Rose et al. |
| 2015/0076357 A1 | 3/2015 | Frach |
| 2015/0078528 A1 | 3/2015 | Okada |
| 2015/0131774 A1 | 5/2015 | Maurer, Jr. et al. |
| 2015/0168567 A1 | 6/2015 | Kim et al. |
| 2015/0177394 A1 | 6/2015 | Dolinsky et al. |
| 2015/0190658 A1 | 7/2015 | Yu |
| 2015/0276947 A1 | 10/2015 | Hoenk et al. |
| 2015/0285922 A1 | 10/2015 | Mintzer et al. |
| 2016/0023019 A1 | 1/2016 | Filiberti et al. |
| 2016/0073977 A1 | 3/2016 | Mazin |
| 2016/0097866 A1 | 4/2016 | Williams |
| 2016/0146949 A1 | 5/2016 | Frach et al. |
| 2016/0209515 A1 | 7/2016 | Da Silva Rodrigues et al. |
| 2016/0219686 A1 | 7/2016 | Nakayama et al. |
| 2016/0266260 A1 | 9/2016 | Preston |
| 2016/0273958 A1 | 9/2016 | Hoenk et al. |
| 2016/0299240 A1 | 10/2016 | Cho et al. |
| 2016/0325117 A1 | 11/2016 | Arai |
| 2016/0361566 A1 | 12/2016 | Larkin et al. |
| 2016/0374632 A1 | 12/2016 | David |
| 2017/0014648 A1 | 1/2017 | Mostafavi |
| 2017/0036039 A1 | 2/2017 | Gaudio |
| 2017/0052266 A1 | 2/2017 | Kim et al. |
| 2017/0065834 A1 | 3/2017 | Liu |
| 2017/0082759 A1 | 3/2017 | Lyu et al. |
| 2017/0199284 A1 | 7/2017 | Silari et al. |
| 2017/0220709 A1 | 8/2017 | Wan et al. |
| 2017/0242136 A1 | 8/2017 | O'Neill et al. |
| 2017/0281975 A1 | 10/2017 | Filiberti et al. |
| 2018/0133508 A1 | 5/2018 | Pearce et al. |
| 2018/0292550 A1 | 10/2018 | Xu et al. |
| 2019/0018154 A1 | 1/2019 | Olcott et al. |
| 2019/0070437 A1 | 3/2019 | Olcott et al. |
| 2019/0143145 A1 | 5/2019 | Laurence, Jr. et al. |
| 2019/0357859 A1 | 11/2019 | Mazin |
| 2020/0164432 A1 | 1/2020 | Maolinbay |
| 2020/0164230 A1 | 5/2020 | Larkin et al. |
| 2020/0215355 A1 | 7/2020 | Olcott et al. |
| 2020/0222724 A1 | 7/2020 | Mazin et al. |
| 2020/0368557 A1 | 11/2020 | Harper et al. |
| 2021/0196212 A1 | 7/2021 | Mazin |

FOREIGN PATENT DOCUMENTS

| | | |
|---|---|---|
| CN | 101970043 A | 2/2011 |
| DE | 10-2008-053321 A1 | 5/2010 |
| EP | 0 984 393 B1 | 3/2007 |
| EP | 1 501 604 B1 | 12/2009 |
| EP | 1 898 234 B1 | 4/2010 |
| EP | 2 188 815 B1 | 11/2011 |
| EP | 2 687 259 A1 | 1/2014 |
| EP | 2 874 702 B1 | 9/2016 |
| EP | 1 664 752 B1 | 6/2017 |
| IL | 208396 | 12/2010 |
| JP | H-11-290466 A | 10/1999 |
| JP | 2003-534823 A | 11/2003 |
| JP | 2007-502166 A | 2/2007 |
| JP | 2007-507246 A | 3/2007 |
| JP | 2008-173299 A | 7/2008 |
| NL | 9520013 A | 2/1997 |
| WO | WO-89/10090 A1 | 11/1989 |
| WO | WO-95/22241 A1 | 8/1995 |
| WO | WO-00/15299 A1 | 3/2000 |
| WO | WO-2004/017832 A2 | 3/2004 |
| WO | WO-2004/017832 A3 | 3/2004 |
| WO | WO-2005/018734 A2 | 3/2005 |
| WO | WO-2005/018734 A3 | 3/2005 |
| WO | WO-2005/018735 A2 | 3/2005 |
| WO | WO-2005/018735 A3 | 3/2005 |
| WO | WO-2005/110495 A1 | 11/2005 |
| WO | WO-2007/045076 A1 | 4/2007 |
| WO | WO-2007/094002 A2 | 8/2007 |
| WO | WO-2007/094002 A3 | 8/2007 |
| WO | WO-2007/124760 A1 | 11/2007 |
| WO | WO-2008/019118 A2 | 2/2008 |
| WO | WO-2008/019118 A3 | 2/2008 |
| WO | WO-2008/024463 A2 | 2/2008 |
| WO | WO-2008/024463 A3 | 2/2008 |
| WO | WO-2009/114117 A2 | 9/2009 |
| WO | WO-2009/114117 A3 | 9/2009 |
| WO | WO-2010/015358 A1 | 2/2010 |
| WO | WO-2012/135771 A1 | 10/2012 |
| WO | WO-2015/042510 A1 | 3/2015 |
| WO | WO-2016/097977 A1 | 6/2016 |

OTHER PUBLICATIONS

Chen, Y. et al. (2011). Dynamic tomotherapy delivery, *Am. Assoc. Phys. Med.* 38:3013-3024.

Corrected Notice of Allowability dated Jan. 29, 2020, for U.S. Appl. No. 16/100,054, filed Aug. 9, 2018, 4 pages.

Dieterich, S. et al. (2003). "Skin respiratory motion tracking for stereotactic radiosurgery using the CyberKnife," *Elsevier Int'l Congress Series* 1256:130-136.

Erdi, Y.E. (2007). "The use of PET for radiotherapy," *Curr. Medical Imaging Reviews* 3(1):3-16.

(56) References Cited

OTHER PUBLICATIONS

Extended European Search Report dated Oct. 7, 2015, for European Application No. 12 763 280.0, filed on Mar. 30, 2012, 11 pages.
Extended European Search Report dated Mar. 31, 2017, for European Application No. 09 719 473.2, filed on Mar. 9, 2009, 8 pages.
Fan, Q. et al. (2012). "Emission Guided Radiation Therapy for Lung and Prostrate Cancers: A Feasibility Study on a Digital Patient," *Med. Phys.* 39(11):7140-7152.
Fan, Q. et al. (2013). "Toward a Planning Scheme for Emission Guided Radiation Therapy (EGRT): FDG Based Tumor Tracking in a Metastatic Breast Cancer Patient," *Med. Phys.* 40(8): 12 pages.
Final Office Action dated Aug. 15, 2012, for U.S. Appl. No. 13/209,275, filed Aug. 12, 2011, 8 pages.
Galvin, J.M. (2018). "The multileaf collimator—A complete guide," 17 total pages.
Gibbons, J.P. (2004). "Dose calculation and verification for tomotherapy," 2004 ACMP Meeting, Scottsdale, AZ., 71 total pages.
Glendinning, A.G. et al. (2001). "Measurement of the response of $Gd_2O_2S$:Tb phosphor to 6 MV x-rays," Phys. Mol. Biol. 46:517-530.
Handsfield, L.L. et al. (2014). "Phantomless patient-specific TomoTherapy QA via delivery performance monitoring and a secondary Monte Carlo dose calculation," *Med. Phys.* 41:101703-1-101703-9.
International Search Report dated May 4, 2009, for PCT Application No. PCT/US2009/01500, filed on Mar. 9, 2009, 3 pages.
International Search Report dated Jul. 20, 2012, for PCT Patent Application No. PCT/US2012/031704, filed on Mar. 30, 2012, 2 pages.
International Search Report dated Mar. 7, 2018, for PCT Application No. PCT/US2017/061848, filed on Nov. 15, 2017, 4 pages.
International Search Report dated Oct. 2, 2018, for PCT Application No. PCT/US2018/041700, filed on Jul. 11, 2018, 2 pages.
International Search Report dated Oct. 24, 2018, for PCT Application No. PCT/US2018/046132, filed on Aug. 9, 2018, 2 pages.
International Search Report dated Mar. 13, 2018, for PCT Application No. PCT/US2017/061855, filed on Nov. 15, 2017, 4 pages.
International Search Report dated Jun. 20, 2018, for PCT Application No. PCT/US2018/025252, filed on Mar. 29, 2018, 2 pages.
International Search Report dated Jan. 30, 2019, for PCT Application No. PCT/US2018/061099, filed on Nov. 14, 2018, 4 pages.
Kapatoes, J.M. et al. (2001). "A feasible method for clinical delivery verification and dose reconstruction in tomotherapy," *Med. Phys.* 28:528-542.
Keall, P.J. et al. (2001). "Motion adaptive x-ray therapy: a feasibility study," *Phys. Med. Biol.* 46:1-10.
Kim, H. et al. (2009). "A multi-threshold method for the TOF-PET Signal Processing," Nucl. Instrum. Meth. Phys. Res. A. 602:618-621.
Krouglicof, N. et al. (2013). "Development of a Novel PCB-Based Voice Coil Actuator for Opto-Mechatronic Applications," presented at *IEEE/RSJ International Conference on Intelligent Robots and Systems (IROS)*, Tokyo, Japan, Nov. 3-7, 2013, pp. 5834-5840.
Langen, K.M. et al. (2010). "QA for helical tomotherapy: report of the AAPM Task Group 148," *Med. Phys.* 37:4817-4853.
Mackie, T.R. et al. (Nov.-Dec. 1993). "Tomotherapy: A New Concept for the Delivery of Dynamic Conformal Radiotherapy," *Med. Phys.* 20(6):1709-1719.
Mazin, S. R. et al. (2010). "Emission-Guided Radiation Therapy: Biologic Targeting and Adaptive Treatment," *Journal of American College of Radiology* 7(12):989-990.
Non-Final Office Action dated Jan. 10, 2011, for U.S. Appl. No. 12/367,679, filed Feb. 9, 2009, 9 pages.
Non-Final Office Action dated Feb. 28, 2012, for U.S. Appl. No. 13/209,275, filed Aug. 12, 2011, 8 pages.
Non-Final Office Action dated Sep. 19, 2013, for U.S. Appl. No. 13/895,255, filed May 15, 2013, 8 pages.
Non-Final Office Action dated Jan. 7, 2020, for U.S. Appl. No. 15/814,222, filed Nov. 15, 2017, 13 pages.

Notice of Allowance dated Jul. 25, 2011, for U.S. Appl. No. 12/367,679, filed Feb. 9, 2009, 7 pages.
Notice of Allowance dated Apr. 9, 2014, for U.S. Appl. No. 13/895,255, filed May 15, 2013, 7 pages.
Notice of Allowance dated Oct. 27, 2015, for U.S. Appl. No. 14/278,973, filed May 15, 2014, 8 pages.
Notice of Allowance dated Mar. 27, 2013, for U.S. Appl. No. 13/209,275, filed Aug. 12, 2011, 9 pages.
Notice of Allowance dated Oct. 5, 2017, for U.S. Appl. No. 14/951,194, filed Nov. 24, 2015, 11 pages.
Notice of Allowance dated Apr. 4, 2019, for U.S. Appl. No. 15/807,383, filed Nov. 8, 2017, 11 pages.
Notice of Allowance dated Dec. 4, 2019, for U.S. Appl. No. 16/100,054, filed Aug. 9, 2018, 13 pages.
Notice of Allowance dated Apr. 10, 2020, for U.S. Appl. No. 16/033,125, filed Jul. 11, 2018, 18 pages.
Notice of Allowance dated Apr. 30, 2020, for U.S. Appl. No. 15/814,222, filed Nov. 15, 2017, 10 pages.
North Shore LIJ (2008). IMRT treatment plans: Dosimetry measurements & monitor units validation, 133 total pages.
Papanikolaou, N. et al. (2010). "MU-Tomo: Independent dose validation software for helical tomo therapy," *J. Cancer Sci. Ther.* 2:145-152.
Parodi, K. (2015). "Vision 20/20: Positron emission tomography in radiation therapy planning, delivery, and monitoring," *Med. Phys.* 42:7153-7168.
Partial Supplementary European Search Report dated Jun. 25, 2015, for European Application No. 12 763 280.0, filed on Mar. 30, 2012, 6 pages.
Prabhakar, R. et al. (2007). "An Insight into PET-CT Based Radiotherapy Treatment Planning," *Cancer Therapy* (5):519-524.
Schleifring (2013). Slip Ring Solutions—Technology, 8 total pages.
Tashima, H. et al. (2012). "A Single-Ring Open PET Enabling PET Imaging During Radiotherapy," *Phys. Med. Biol.* 57(14):4705-4718.
TomoTherapy® (2011). TomoHD Treatment System, Product Specifications, 12 total pages.
Varian Medical Systems (2004). "Dynamic Targeting™ Image-Guided Radiation Therapy—A Revolution in Cancer Care," *Business Briefing: US Oncology Review*, Abstract only, 2 pages.
Wikipedia (2016). "Scotch yoke," Retrieved from https://en.wikipedia.org/wiki/Scotch_yoke, 3 pages.
Willoughby, T. et al. (2012). "Quality assurance for nonradiographic radiotherapy localization and positioning systems: Report of task group 147," Med. Phys. 39:1728-1747.
Written Opinion of the International Searching Authority dated May 4, 2009, for PCT Application No. PCT/US2009/01500, filed on Mar. 9, 2009, 5 pages.
Written Opinion of the International Searching Authority dated Jul. 20, 2012, for PCT Patent Application No. PCT/US2012/031704, filed on Mar. 30, 2012, 10 pages.
Written Opinion of the International Searching Authority dated Mar. 7, 2018, for PCT Application No. PCT/US2017/061848, filed on Nov. 15, 2017, 5 pages.
Written Opinion of the International Searching Authority dated Oct. 2, 2018, for PCT Application No. PCT/US2018/041700, filed on Jul. 11, 2018, 19 pages.
Written Opinion of the International Searching Authority dated Oct. 24, 2018, for PCT Application No. PCT/US2018/046132, filed on Aug. 9, 2018, 7 pages.
Written Opinion of the International Searching Authority dated Mar. 13, 2018, for PCT Application No. PCT/US2017/061855, filed on Nov. 15, 2017, 6 pages.
Written Opinion of the International Searching Authority dated Jun. 20, 2018, for PCT Application No. PCT/US2018/025252, filed on Mar. 29, 2018, 12 pages.
Written Opinion of the International Searching Authority dated Jan. 30, 2019, for PCT Application No. PCT/US2018/061099, filed on Nov. 14, 2018, 11 pages.
Yamaya, T. et al. (2008). "A proposal of an open PET geometry," *Physics in Med. and Biology* 53:757-773.
Corrected Notice of Allowability dated Feb. 3, 2021, for U.S. Appl. No. 16/425,416, filed May 29, 2019, 2 pages.

(56) References Cited

OTHER PUBLICATIONS

Extended European Search Report dated Oct. 30, 2020, for EP Application No. 20 179 036.7, filed on Mar. 9, 2009, 12 pages.
Lu, W. (2009). "Real-time motion-adaptive-optimization (MAO) in tomotherapy," Phys. Med. Biol. 54:4373-4398.
Lu, W. (2008). "Real-time motion-adaptive delivery (MAD) using binary MLC: I. Static beam (topotherapy) delivery," Phys. Med. Biol. 53:6491-6511.
McMahon, R. et al. (2008). "A real-time dynamic-MLC control algorithm for delivering IMRT to targets undergoing 2D rigid motion in the beam's eye view," Med. Phys. 35:3875-3888.
Non-Final Office Action dated Nov. 3, 2020, for U.S. Appl. No. 16/818,325, filed Mar. 13, 2020, 9 pages.
Notice of Allowance dated Jan. 12, 2021, for U.S. Appl. No. 16/425,416, filed May 29, 2019, 13 pages.
Notice of Allowance dated Feb. 22, 2021, for U.S. Appl. No. 16/818,325, filed Mar. 13, 2020, 7 pages.
Olivera, G.H. et al. (2000). "Modifying a plan delivery without re-optimization to account for patient offset in tomotherapy," Proceedings of the $22^{nd}$ Annual EMBS International Conference, Jul. 23-28, 2000, Chicago, IL, pp. 441-444.
ViewRay's MRIDIAN LINAC enables radiosurgery with MRI vision for cancer therapy, (2017). YouTube video located at https://www.youtube.com/watch?v=zm3g-BISYDQ, PDF of Video Screenshot Provided.
Extended European Search Report dated Apr. 1, 2021, for EP Application No. 18 844 237.0, filed on Aug. 9, 2018, 8 pages.
Extended European Search Report dated May 26, 2021, for EP Application No. 18 832 571.6, filed on Jul. 11, 2018, 9 pages.
Non-Final Office Action dated Apr. 26, 2021, for U.S. Appl. No. 16/191,131, filed Nov. 14, 2018, 28 pages.

* cited by examiner

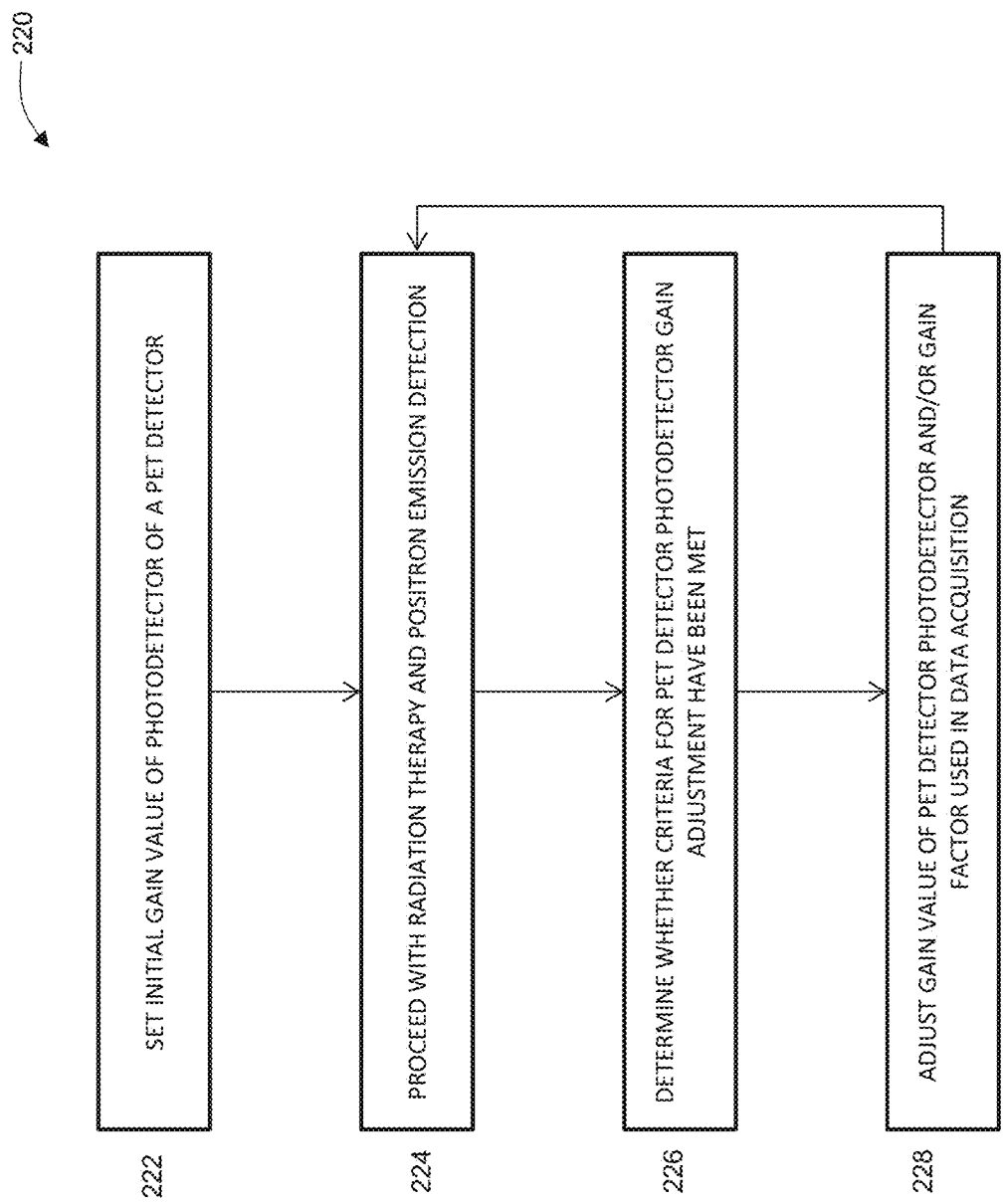

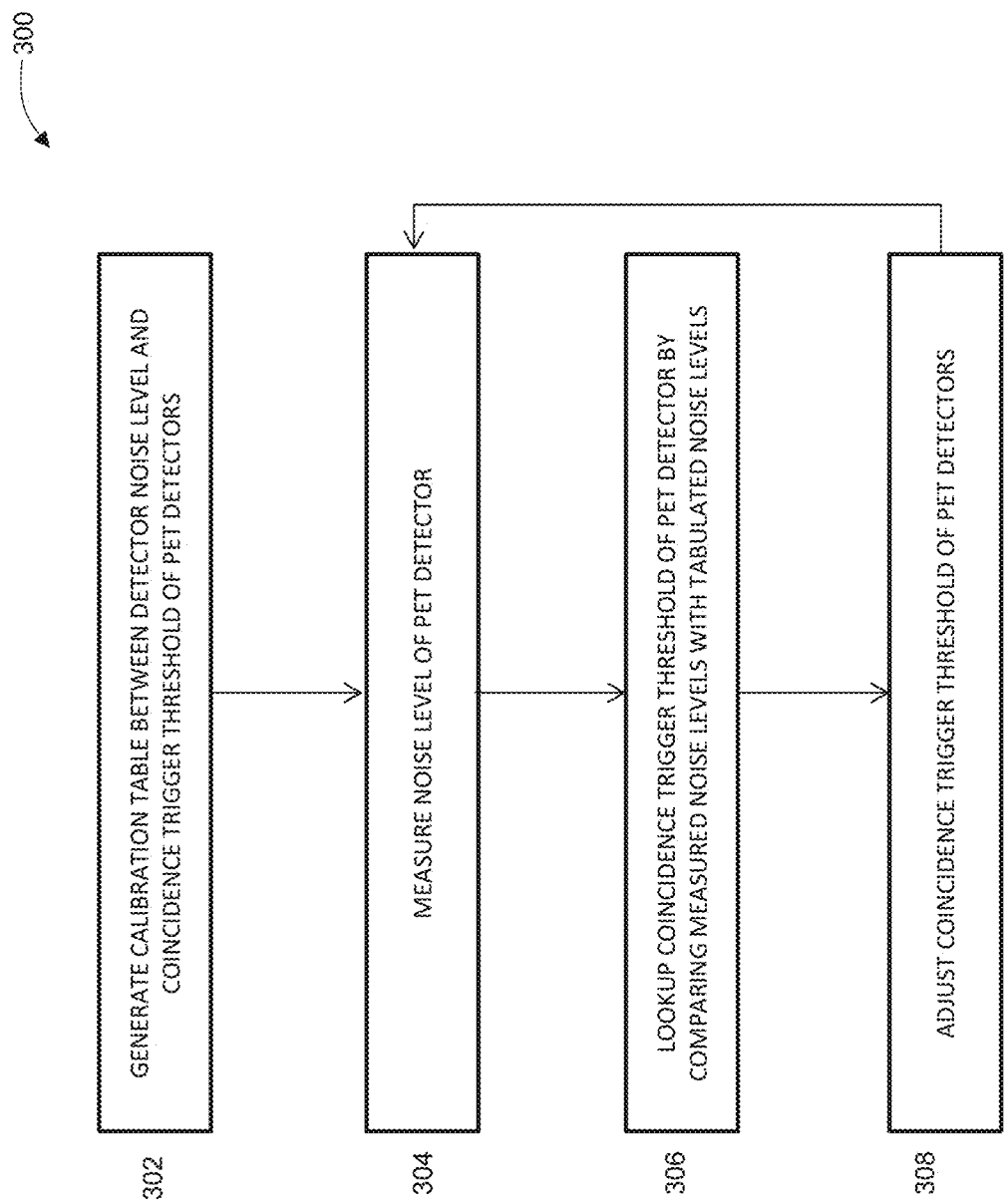

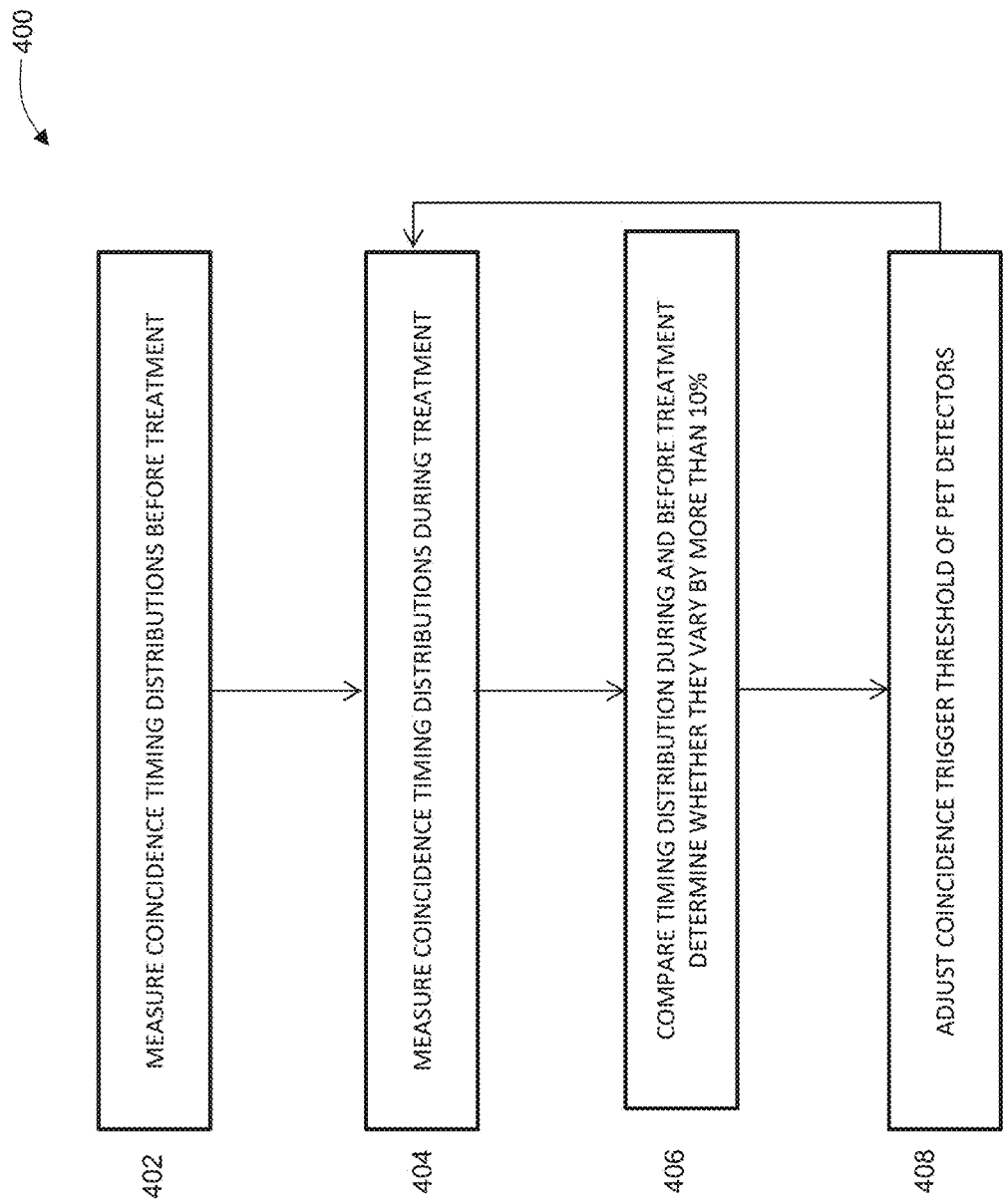

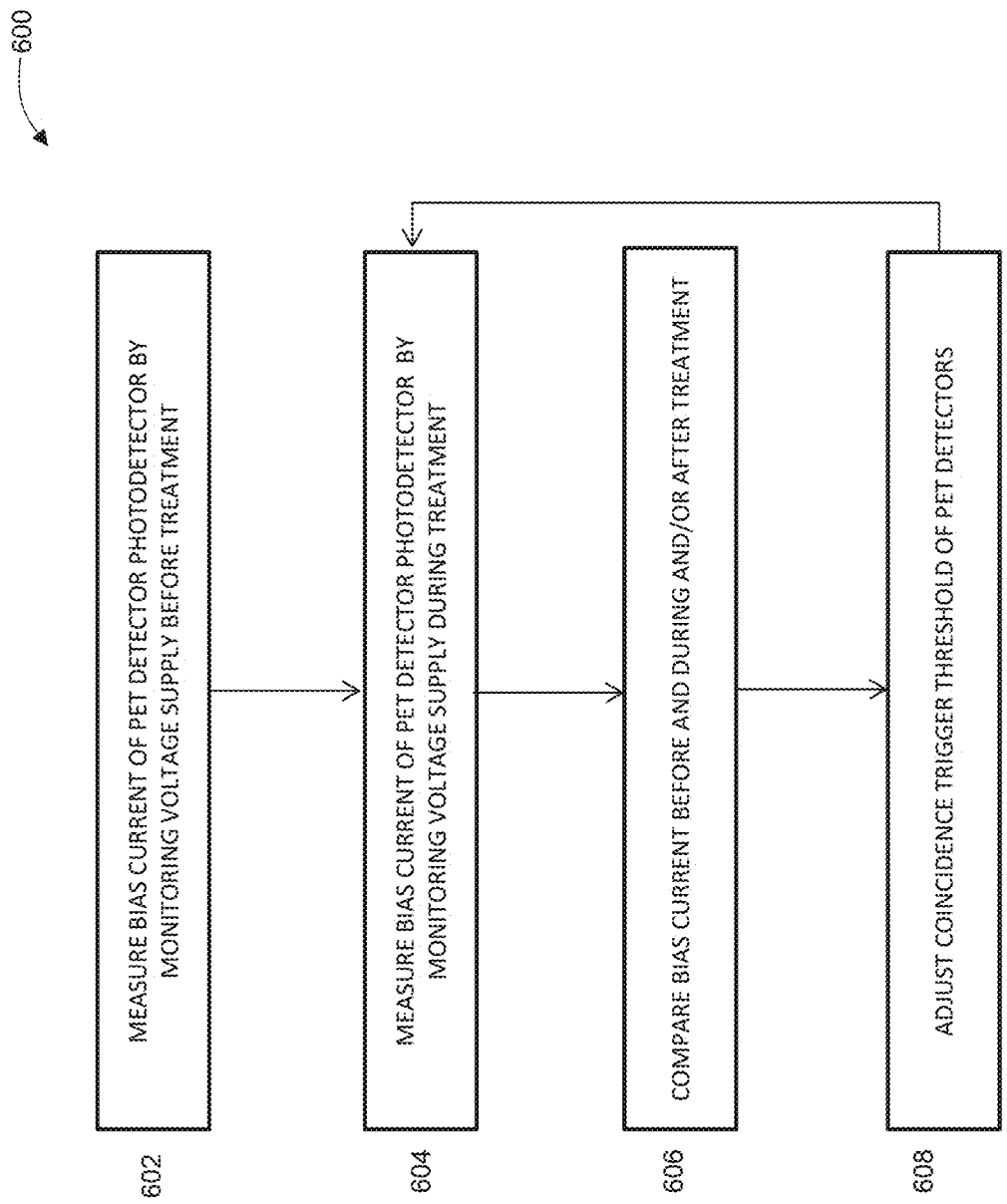

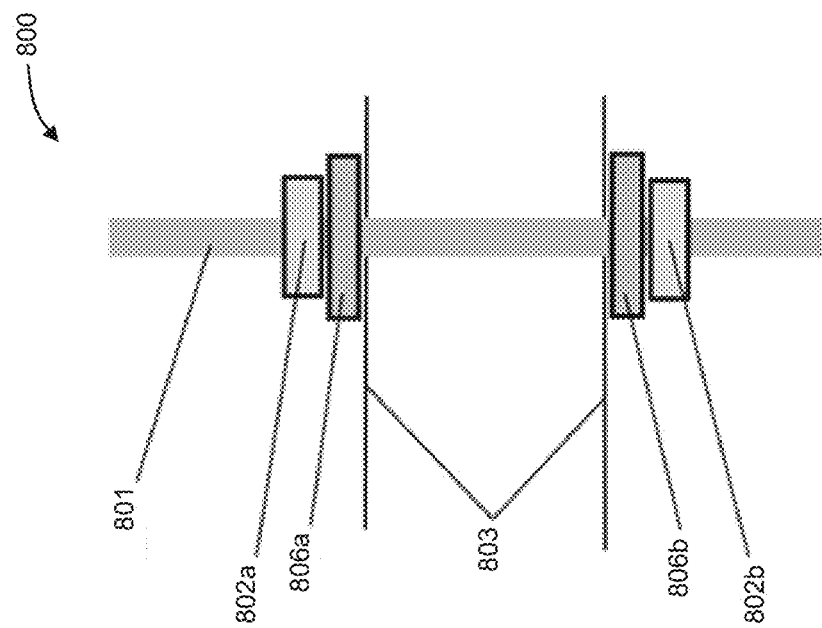
FIG. 8C
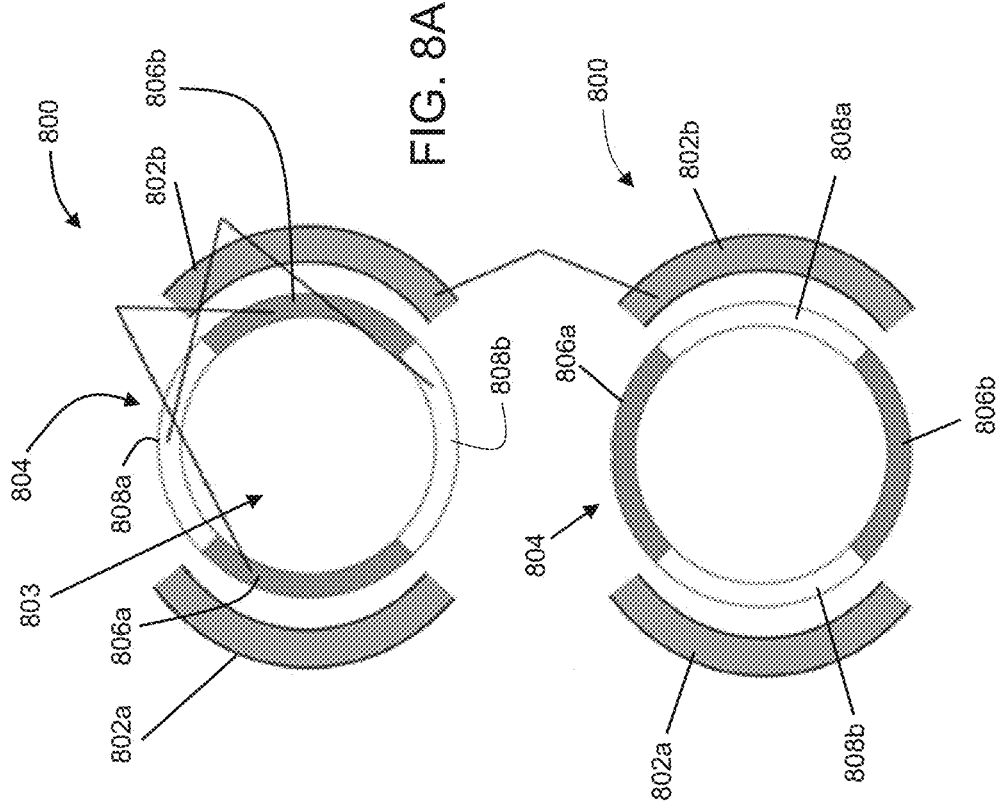
FIG. 8A
FIG. 8B

METHODS FOR PET DETECTOR AFTERGLOW MANAGEMENT

CROSS-REFERENCE TO RELATED APPLICATIONS

This application is a continuation of U.S. patent application Ser. No. 16/033,125, filed Jul. 11, 2018, now issued as U.S. Pat. No. 10,795,037, which claims priority to U.S. Provisional Patent Application No. 62/531,260, filed Jul. 11, 2017, the disclosure of each of which is hereby incorporated by reference in its entirety.

STATEMENT REGARDING FEDERALLY SPONSORED RESEARCH OR DEVELOPMENT

This invention was made in part during work supported by grant number 2R44CA153466-02A1 from the National Cancer Institute. The government may have certain rights in the invention.

TECHNICAL FIELD

This disclosure relates to methods for use in a radiation therapy system comprising a linear accelerator (or other ionizing radiation source) and one or more positron emission (or PET) detectors.

BACKGROUND

Radiation therapy systems typically have a radiation source (e.g., a linear accelerator or linac) that generates therapeutic radiation beams for the irradiation of targeted tissue regions, such as patient tumor regions. Although the generated radiation beams may be directed toward targeted regions and may be beam-limited by one or more jaws and/or collimators, a portion of the radiation beams may deviate and/or scatter from the targeted regions. This scattered radiation may interfere with the function of other components of the radiation therapy system.

For example, scattered or stray radiation may affect the ability of various detectors in a radiation therapy system, such as X-ray and/or PET detectors, to precisely acquire data. PET detectors in a radiation therapy system may be affected such that the PET detector response to scattered or stray radiation may be indistinguishable from true positron emission events. In situations with high levels of radiation (e.g., during a radiation pulse from a linac, for example), the PET detectors may "blank" and/or saturate. This may render them incapable of meaningfully detecting positron emission data.

Accordingly, it may be desirable to develop methods and devices to manage the risk of equipment damage and/or data corruption due to scattered radiation from the linac.

SUMMARY

Disclosed herein are methods and devices for the acquisition of positron emission (or PET) data in the presence of ionizing radiation that causes afterglow of PET detectors. In one variation, the method may comprise adjusting a coincidence trigger threshold of the PET detectors during a therapy session. The coincidence trigger threshold may be increased as the degree of PET detector afterglow increases. For example, the coincidence trigger threshold may be increased as a dark count rate of one or more of the PET detectors increases and/or exceeds a threshold dark count rate. Alternatively or additionally, the coincidence trigger threshold may be increased as a bias current of one or more of the PET detectors increases and/or exceeds a threshold bias current level. The coincidence trigger threshold may also be adjusted based on a measured temperature of the system (e.g., at or around the PET detectors), where the coincidence trigger threshold may be increased as the temperature of the system increases. In some variations, the coincidence trigger threshold may be adjusted based on the radiation output of the radiation source or linac. For example, the coincidence trigger threshold may be adjusted when the number of emitted radiation pulses exceeds a predetermined threshold, and/or based on a pulse schedule, and/or based on the cumulative amount of radiation emitted by the linac during a therapy session. In some variations, the coincidence trigger threshold may be adjusted if the synchronization between two system components (e.g., linac and collimator) shifts, and the timing shift exceeds a predetermined threshold.

In some variations, a method for acquiring positron emission data during a radiation therapy session may comprise suspending communication between the PET detectors and a signal processor of a controller for a predetermined period of time after a radiation pulse has been emitted by the linac. For example, the predetermined period of time may be about 100 µs or more, or about 200 µs or more. Alternatively or additionally, the predetermined period of time may be determined at least in part by a width or duration of a linac radiation pulse. For example, the predetermined period of time may be about 25 times or about 100 times longer than the duration of a linac pulse. After the predetermined period of time has elapsed, communication between the PET detectors and the signal processor may resume and positron emission data may be transmitted from the detectors to the signal processor and/or acquired by the signal processor for analysis and/or storage by the controller.

In other variations, a radiation therapy system may comprise a radiation source, a plurality of PET detectors (e.g., PET detector arrays), and a radiation-blocking shield movable over the plurality of PET detectors. The radiation-blocking shield may be positioned over the PET detectors during an irradiation interval when the radiation source is emitting radiation, and may be positioned away from the PET detectors during a detection interval when the radiation source is not emitting radiation.

One variation of a radiation therapy system may comprise a radiation source configured to direct one or more radiation pulses toward a PET-avid region of interest, where each radiation pulse has a predetermined pulse duration, a plurality of PET detectors configured to detect a positron emission path by detecting a pair of positron annihilation photons incident upon a portion of the detectors within a coincidence time-window and that generate a detector signal that exceeds a coincidence trigger threshold, and a controller in communication with the plurality of PET detectors, where the controller is configured to adjust the coincidence trigger threshold during a therapy session. The controller may be configured to adjust the coincidence trigger threshold after a threshold number of radiation pulses have been directed toward the region of interest. The threshold number of radiation pulses may be approximately 1,000 radiation pulses. The coincidence trigger threshold may be from about two photon-triggers to about five photon-triggers. The coincidence trigger threshold may be a first coincidence trigger threshold and the threshold number of radiation pulses may be a first threshold number of radiation pulses, and the controller may be configured to adjust the first coincidence trigger threshold to a second coincidence trigger threshold after a second threshold number of radiation pulses have been directed toward the region of interest. The second coincidence trigger threshold may be greater than the first coincidence trigger threshold and the second threshold number of radiation pulses may be greater than the first threshold number of radiation pulses. The second coincidence trigger threshold may be from about four photon-triggers to about six photon-triggers, and the second threshold number of radiation pulses may be about 2,000. The second coincidence trigger threshold may be less than the first coincidence trigger threshold and the second threshold number of radiation pulses may be greater than the first threshold number of radiation pulses. The controller may be configured to adjust the coincidence trigger threshold based on changes in timing greater than 10% from baseline and/or may be configured to adjust the coincidence trigger threshold when a dark count rate of one or more of the plurality of PET detectors exceeds a threshold dark count rate. The threshold dark count rate may be from about 3 Mcps to about 10 Mcps, for example. Optionally, the controller may further comprise a current detector configured to measure a bias current of one or more of the plurality of PET detectors, and wherein the controller is configured to adjust the coincidence trigger threshold when the bias current exceeds a threshold bias current value. The threshold bias current value may be from about 0.1 mA to about 5 mA, e.g., about 1 mA, about 3 mA. Alternatively or additionally, the controller may be configured to adjust the coincidence trigger threshold when the amount of radiation emitted from the radiation source exceeds a threshold radiation level. The threshold radiation level may be from about 0.1 cGy/min to about 1 cGy/min. The controller may further comprises a signal processor and a switch configured to selectively communicate a PET detector output signal to the signal processor. The switch may be configured to suspend communication of the PET detector output signal to the signal processor for a predetermined period of time following each radiation pulse, where a ratio of the predetermined period of time to the duration of each radiation pulse may be between about 25:1 to about 100:1. The controller may be configured to suspend communication of the PET detector output signal to the signal processor for the duration of each radiation pulse and the predetermined period of time following each radiation pulse. The controller may be configured to suspend communication of the PET detector output signal to the signal processor based on a gate signal. The gate signals may cause the controller to suspend communication of the PET detector output signal to the signal processor for at least 100 µs following each radiation pulse. In some variations, the gate signal may cause the controller to suspend communication of the PET detector output signal to the signal processor for at least 200 us following each radiation pulse. Alternatively or additionally, the controller may be configured to adjust the coincidence trigger threshold at least partially based on a timing schedule of the radiation pulses.

Also disclosed herein is a method for automatically adjusting the coincidence trigger threshold for PET detectors. The method may comprise measuring a characteristic of a radiation therapy system comprising two or more PET detectors having a coincidence trigger threshold, determining whether the measured characteristic exceeds a pre-determined threshold for that characteristic, and adjusting the coincidence trigger threshold based on the determination of whether the measured characteristic exceeds the threshold for that characteristic. Adjusting the coincidence trigger threshold may comprise increasing the coincidence trigger threshold if the measured characteristic exceeds the pre-determined threshold for that characteristic or decreasing the coincidence trigger threshold if the measured characteristic is at or below the pre-determined threshold for that characteristic. The measured characteristic may be a dark count rate of the two or more PET detectors and the pre-determined threshold may be a dark count rate threshold. The measured characteristic may be a bias current of the two or more PET detectors and the pre-determined threshold may be a bias current threshold. The radiation therapy system may comprise a temperature sensor, and the measured characteristic may be a temperature measurement and the pre-determined threshold may be a temperature threshold. Alternatively or additionally, the radiation therapy system may comprise a radiation source having a pulse counter, and the measured characteristic may be a pulse count measured from the pulse counter and the pre-determined threshold may be a pulse count threshold. The radiation therapy system may comprises a radiation source and a collimator, where the radiation source and the collimator may be configured to operate together with a pre-determined timing tolerance, and where the measured characteristic may be the amount of deviation from the pre-determined timing tolerance and the pre-determined threshold may be a timing deviation threshold.

Also disclosed herein is a method for detecting positron annihilation emission paths. The method may comprise directing one or more radiation beam pulses to a target region, where the target region is PET-avid, detecting a first positron emission path defined by a first pair of positron annihilation photons that are incident upon a portion of a plurality of PET detectors within a time-window and that generate a detector signal that exceeds a first coincidence trigger threshold, adjusting the first coincidence trigger threshold to a second coincidence trigger threshold, and detecting a second positron emission path defined by a second pair of positron annihilation photons that are incident upon a portion of the plurality of PET detectors within the time-window and that generate a detector signal that exceeds the second coincidence trigger threshold. The first coincidence trigger threshold may be adjusted to a second coincidence trigger threshold after a predetermined number of radiation beam pulses have been directed to the target region. Adjusting the first coincidence trigger threshold may be at least partially based on a timing schedule of radiation pulses. The second coincidence trigger threshold may have a greater value than the first coincidence trigger threshold, for example, the second coincidence trigger threshold may be about four photon-triggers and the first coincidence trigger threshold may be about two photon-triggers. In some variations, the predetermined number of radiation pulses may be about 1,000. The predetermined number of radiation pulses may be a first predetermined number of radiation pulses and the method may further comprise adjusting the second coincidence trigger threshold to a third coincidence trigger threshold after a second predetermined number of radiation pulses have been directed to the target region and detecting a third positron emission path defined by a third pair of positron annihilation photons that are incident upon a portion of the plurality of PET detectors within the time-window and that generate a detector signal that exceeds the third coincidence trigger threshold. The third coincidence trigger threshold may be greater than the second coincidence trigger threshold and the second predetermined number of radiation pulses may be greater than the first predetermined number of radiation pulses. The third coincidence trigger threshold may be from about four photon-triggers to about six photon-triggers, and the second predetermined number of radiation pulses may be about 2,000. The radiation beam pulses may each have a pulse width, and the plurality of PET detectors may be in communication with a controller comprising a signal processor, and the method may further comprise suspending communication of data from the PET detectors to the signal processer is for a predetermined period of time following each radiation pulse, where a ratio of the predetermined period of time to the pulse width may be between about 25:1 and about 100:1. Optionally, suspending communication of the data may be based on a gate signal. The gate signal may cause suspension of communication of data from the PET detectors to the signal processor for at least 100 μs following the radiation pulse, or the gate signal may cause suspension of communication of data from the PET detectors to the signal processor for at least 200 μs following each radiation pulse. The first coincidence trigger threshold may be adjusted to a second coincidence trigger threshold when a dark count rate of one or more of the plurality of PET detectors exceeds a threshold dark count rate. The threshold dark count rate may be from about 3 Mcps to about 10 Mcps. The first coincidence trigger threshold may be adjusted to a second coincidence trigger threshold when a bias current of one or more of the plurality of PET detectors exceeds a threshold bias current value. For example, the threshold bias current value may be from about 0.1 mA to about 5 mA, e.g., about 1 mA, about 3 mA. The first coincidence trigger threshold may be adjusted to a second coincidence trigger threshold when the amount of radiation emitted from the radiation source exceeds a threshold radiation level. For example, the threshold radiation level may be from about 0.1 cGy/min to about 1 cGy/min.

Also disclosed herein is a radiation therapy system comprising a radiation source configured to deliver one or more radiation pulses toward a PET-avid region of interest during one or more irradiation intervals, a plurality of PET detectors configured to detect one or more positron emission paths emitted by the PET-avid region of interest during one or more detection intervals, and a radiation-blocking filter movable over the plurality of PET detectors. The radiation-blocking filter may be configured to be positioned over the plurality of PET detectors during the one or more irradiation intervals and positioned away from the PET detectors during the one or more detection intervals.

Disclosed herein is a radiation therapy system comprising a radiation source configured to direct one or more radiation pulses toward a PET-avid region of interest a plurality of PET detectors that are configured to detect positron annihilation photons, a current detector configured to measure a bias current of the plurality of PET detectors, and a controller configured to receive photon data output from the plurality of PET detectors, wherein the controller is configured to detect a pair of coincident positron annihilation photons by adjusting the photon data output using a gain factor having a value that is based on the measured bias current during a therapy session (e.g., calculated based on the measured bias current). The controller may be configured to adjust the gain factor when the bias current exceeds a threshold bias current value, e.g., the threshold bias current value may be from about 0.1 mA to about 1 mA. In some variations, the gain factor may be a ratio between the measured bias current and a magnitude of a photopeak shift of the detection of the positron annihilation photons in photon data output. Adjusting the photon data output may comprise multiplying the photon data output by the gain factor or linearly shifting the photon data output by the gain factor. Alternatively or additionally, the controller may be configured to adjust the gain factor after a threshold number of radiation pulses have been directed toward the region of interest, e.g., the threshold number of radiation pulses may be approximately 1,000 radiation pulses. In some variations, the gain factor may be a first gain factor and the threshold number of radiation pulses may be a first threshold number of radiation pulses, and the controller may be configured to adjust the first gain factor to a second gain factor after a second threshold number of radiation pulses have been directed toward the region of interest. The second gain factor may be greater than the first gain factor and the second threshold number of radiation pulses may be greater than the first threshold number of radiation pulses. Alternatively or additionally, the controller may be configured to calculate a photopeak location of annihilation photons based on the photon data output from the plurality of PET detectors and to adjust the gain factor based on shifts of the photopeak location from a baseline level. Alternatively or additionally, the controller may be configured to adjust the gain factor when a dark count rate of one or more of the plurality of PET detectors exceeds a threshold dark count rate, e.g., the threshold dark count rate is from about 3 Mcps to about 10 Mcps. Alternatively or additionally, the controller may be configured to adjust the gain factor when the amount of radiation emitted from the radiation source exceeds a threshold radiation level, e.g., the threshold radiation level may be from about 0.1 cGy/min to about 1 cGy/min.

In some variations, the controller may further comprise a signal processor and a switch configured to selectively communicate a PET detector output signal to the signal processor. The switch may be configured to suspend communication of the PET detector output signal to the signal processor for a predetermined period of time following each radiation pulse, where a ratio of the predetermined period of time to the duration of each radiation pulse may be between about 25:1 to about 100:1. The controller may be configured to suspend communication of the PET detector output signal to the signal processor for the duration of each radiation pulse and the predetermined period of time following each radiation pulse. For example, the controller may be configured to suspend communication of the PET detector output signal to the signal processor based on a gate signal. In some variations, the gate signal may cause the controller to suspend communication of the PET detector output signal to the signal processor for 100 us or more following each radiation pulse, e.g., the gate signal may cause the controller to suspend communication of the PET detector output signal to the signal processor for 200 us or more following each radiation pulse. Alternatively or additionally, the controller may be configured to adjust the gain factor at least partially based on a timing schedule of the radiation pulses.

BRIEF DESCRIPTION OF THE DRAWINGS

FIG. 2A is a flowchart diagram of one variation of a method for dynamic gain adjustment.

FIG. 3 is a flowchart diagram of one variation of a method for dynamic PET detector threshold adjustment based on PET detector noise levels.

FIG. 4 is a flowchart diagram of another variation of a method for dynamic PET detector threshold adjustment based on changes in component timing distributions.

FIG. 6A is a flowchart diagram of one variation of a method for dynamic PET detector threshold adjustment based on PET detector bias current.

FIG. 8A is a schematic depiction of one variation of a radiation filter ring in a first configuration.

FIG. 8B is a schematic depiction of the radiation filter ring of FIG. 8A in a second configuration.

FIG. 8C is a side-view of a schematic depiction of the radiation filter ring of FIG. 8A in the first configuration.

DETAILED DESCRIPTION

Figure 1A:
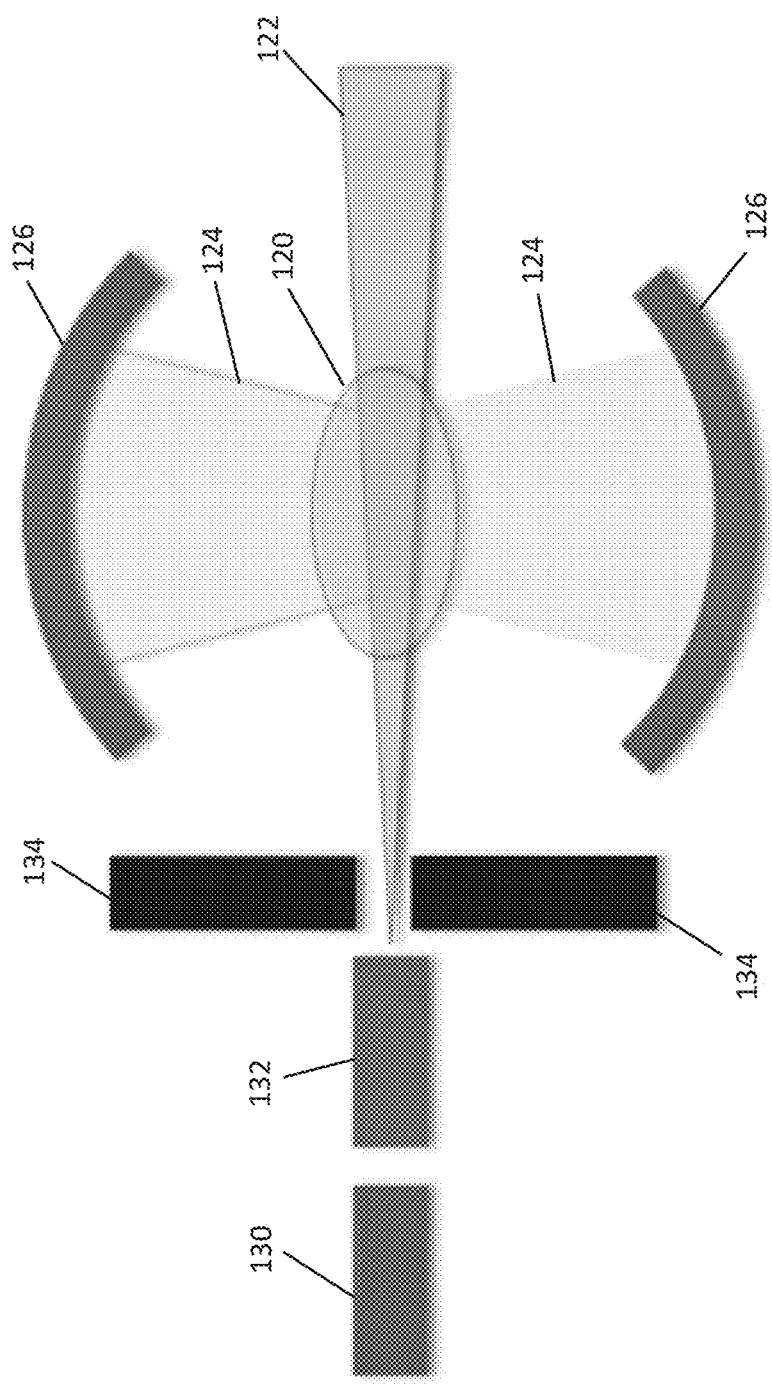
FIG. 1A is a schematic diagram of a front view of one variation of a radiation therapy system.

Some variations of radiation therapy systems may comprise a therapeutic radiation source (such as a linac) and one or more PET detectors (e.g., one or more PET detector arrays) for detecting emissions from a positron-emitting (i.e., PET-avid) tissue region. A patient may be injected with a molecule labeled with a radioactive atom, known as a PET radiotracer prior to a treatment session, and the tracer may preferentially accumulate at one or more tumor regions. The radioactive atoms inside the patient undergo radioactive decay and emit positrons. Once emitted from an atom, a positron will quickly collide with a nearby electron after which both will be annihilated. Two high energy photons (511 keV) are emitted from the point of annihilation and travel in opposite directions. When the two photons are simultaneously detected by two PET detectors, it is known that the annihilation occurred somewhere along the line joining the two PET detectors. Radiation therapy systems may acquire positron emission data before or during the treatment session, and this emission data may be used to guide irradiation of these tumor regions. For example, emission-guided radiation therapy systems may comprise a plurality of PET detectors and a linac that are mounted on a gantry that is rotatable about a patient. In some variations, a plurality of PET detectors may comprise two PET detector arrays that are disposed opposite each other on the gantry. Emission data acquired in real-time by the detectors may be analyzed by a system controller to control the rotation of the gantry to direct radiation from the linac to the PET-avid tumor regions. In some variations, real-time positron emission data may also be used to update treatment plans to account for any tumor movement that may have occurred between the treatment planning session and the treatment session.

A PET detector comprises a scintillating material (e.g., a scintillating crystal such as bismuth germanium oxide, gadolinium oxyorthosilicate, or lutetium oxyorthosilicate), coupled to a sensor (e.g., any photodetector, a photomultiplier tube such as a silicon photomultiplier). When a high-energy photon strikes a PET detector, the energy from that photon causes a scintillation event in the scintillating material, which may generate one or more lower-energy (e.g., visible light) photons that are detected by the photodetector device. Photodetector devices may have a baseline dark count rate or dark current, where random fluctuations in the output may be indistinguishable from fluctuations that indicate the presence of a photon. A dark count causes a pixel of a detector to fire by discharging. When a pixel discharges, it draws current from the power source, and the current drawn from the power source may be referred to as a bias current. The bias current may be proportional to the average number of dark counts that have fired over a period time plus other constant or slowly varying terms; that is, the bias current may be proportional to the dark current. The dark current may be proportional to the afterglow photocurrent plus the thermal noise current of the PET photodetector. The bias current may be measured using a current-measurement device or module that may be included with a PET detector array. Alternatively or additionally, the bias current may be measured using an ammeter disposed in series with the PET detector photodetector and the power source. Measuring the bias current and/or changes to the bias current to the photodetector at a selected or set operating range (e.g., gain and/or sensitivity) may provide an indication of the dark count rate and/or changes in the dark count rate (i.e., changes in the bias current may indicate shifts in the dark count rate). For example, as the dark count rate increases, the bias current to the photodetector of the PET detector may also increase because more current is drawn from the power source as a greater number of random fluctuations causes a pixel of a detector to discharge more frequently. Under normal operating conditions, the dark count rate may be relatively low, for example, approximately 2 million dark counts per second (cps). Increased ambient temperature and/or elevated levels of radiation may cause the dark count rate or dark current of a photodetector to increase.

A radiation therapy system may comprise at least two arrays of PET detectors located opposite each other on a gantry. For example, a PET detector on a first array may have a corresponding PET detector on a second array located on the opposite side so that the two high-energy photons from a positron annihilation event may be detected. In one variation, a radiation therapy system may comprise two PET detector arrays, each comprising 32 PET detector modules (for a total of 64 PET detector modules). Each PET detector module may comprise a 6×12 subarray of PET detectors, where each PET detector has its own photodetector. In some variations, each PET detector module may measure and output the bias current of all of the photodetectors in the 6×12 array of PET detectors, and the gain of all of the photodetectors in the PET detector module may be set by a single gain input value. Since positron emission and annihilation events are stochastic events, the PET detectors of a system may detect a plurality of high-energy photons within a short time interval, and a controller uses the temporal information of each detected photon (e.g., time of detection), as well as the location of the PET detectors that detected these photons, to determine which two photons are part of a positron annihilation photon pair. For example, if two high-energy photons are detected by two PET detectors that are located opposite to each other within a particular time interval (e.g., a coincidence time-window), then the controller may pair these two photons together as originating from the same positron annihilation event, which occurred somewhere along the line joining these two PET detectors. A coincidence time-window is the time interval within which detected photons may be considered coincident (and processed as if they originate from the same positron annihilation event). The coincidence trigger threshold may be a trigger threshold that discriminates between signals arising from the detection of an annihilation photon and signals that arise from scattered radiation and/or other noise sources (e.g., random detector noise, afterglow, thermal noise, etc.). If the location of the annihilation event is closer to one of the PET detectors than the other, one photon of the pair will have a shorter distance to travel than the other (i.e., one photon will have a shorter time-of-flight than the other), and will therefore strike the first PET detector before the second photon strikes the second PET detector. The time differential between the detection of the photons in a positron annihilation pair may be used by the controller to determine where an annihilation event occurred on the line between the two PET detected events. PET detectors that have sufficient temporal precision to sense differences in the time-of-flight (TOF) of positron annihilation photons may transmit TOF data to a system controller for calculating the location of the positron annihilation event.

Figure 1B:
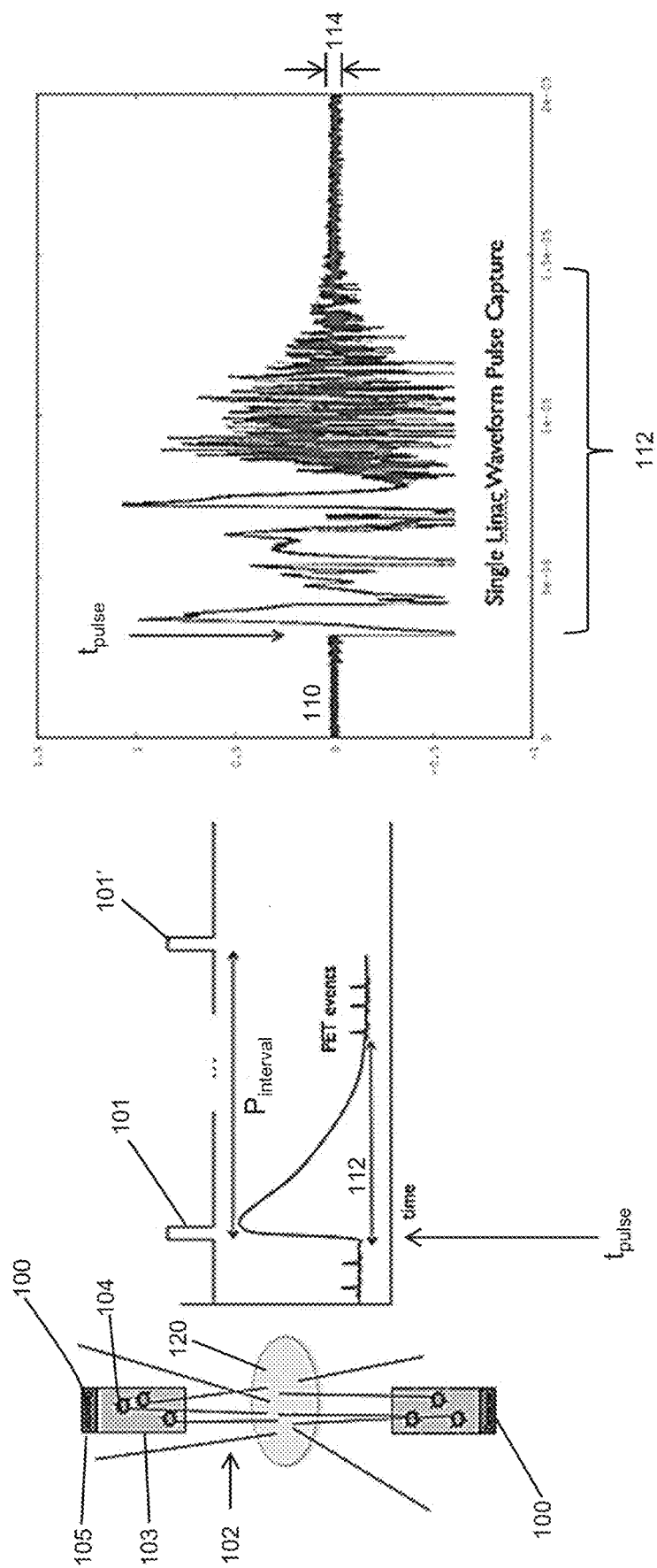
FIG. 1B schematically depicts scattered X-rays that may cause PET detector afterglow and plots of PET detector outputs affected by afterglow.

During a treatment session, the linac may generate pulses of high-flux X-rays that are emitted toward the target regions. Beam-limiting devices, such as one or more jaws and/or collimators (e.g., a multi-leaf collimator), may help to limit the spread of the X-rays and direct the X-rays to targeted tissue regions. These X-rays may interact with the patient, where a portion of the X-rays irradiate the target regions in patient (e.g., tumor regions), and a portion of the X-rays may be scattered by the patient. The scattered X-rays may interact with components of the radiotherapy system, such as X-ray detectors (e.g., MV or kV detectors) and/or PET detectors. This effect is schematically depicted in FIG. 1A, where the body of a patient 120 may scatter X-rays from a linac 130 and target 132. The X-rays from the linac and target may be shaped by beam-limiting devices, such as a multi-leaf collimator 134 to form a treatment beam 122. The scattered X-rays or radiation 124 may be incident on the PET detectors 126, triggering scintillating events (e.g., lower-energy photons) that may be indistinguishable from scintillating events caused by positron emissions, which are then sensed by the photodetector of the PET detector. Other radiotherapy systems, such as a proton therapy system, may also generate either scattered X-rays or neutrons. Scattered radiation from proton sources may also cause excitation of scintillation crystals. Afterglow of the PET detectors 126 caused by scattered radiation (and/or other radiation sources) may accumulate over time and cause the detectors to saturate or "blank" for a period of time, rendering them incapable of detecting positron emission event data during that blanking interval. FIG. 1B depicts an example of an output trace 110 from a PET detector 100, where a linac pulse 101 was applied at $t_{pulse}$. A linac pulse may have a pulse width from about 1 μs to about 10 μs (e.g., from about 3 μs to about 5 μs, about 3 μs about 5 μs about 8 μs etc.), with an inter-pulse interval $P_{interval}$ from about 2 ms to about 20 ms (e.g., from about 4 ms to about 10 ms, from about 5 ms to about 15 ms, about 4 ms, about 10 ms, etc.) and/or a pulse frequency from about 100 Hz to about 250 Hz. Scattered X-rays/radiation 102 from the linac pulse may irradiate the PET detectors 100, generating afterglow photons 104 in the scintillating material 103, which are then detected by photodetector 105. As seen in the output trace 110, the afterglow photons cause a substantial short term artifact over a time period of from immediately after to approximately 50 μs or more, e.g., 100 μs, during which time the PET detector ability respond to positron emission events is reduced or degraded. (e.g., PET detector saturation or blanking may be the result of photodetector saturation, and/or the scintillator reaching its maximal photon output, and/or electrical and/or magnetic interference from the linac, etc.). This time period may be referred to as the blanking interval 112, and is a short-term effect of detector afterglow. The blanking interval 112 may last from the beginning of the pulse to about 50 μs (or more), depending on, for example, the duration and energy of the linac pulse. After the initial blanking interval 112, the scintillating material of the PET detector may continue to scintillate such that afterglow photons continue to be generated, though possibly at a lower rate than during the blanking interval 112. These afterglow photons may be generated by, for example, continued excitation and/or increased energy levels of the scintillating material of the PET detectors. The continued incidence of these afterglow photons on the photodetector 105 may result in a greater level of noise 114 in the output trace 110 after the linac pulse was applied than before the pulse was applied. This increased level of noise 114 may take about 1-5 hours to decay to pre-linac pulse levels, and may be a long-term effect of afterglow. In scenarios where there are high levels of scattered radiation, afterglow photons may saturate the photodetector (e.g., silicon photomultipliers). Since more than one linac pulse is emitted during a treatment session (e.g., with about 2 ms to about 10 ms between each pulse), afterglow noise of later pulses may cumulatively add to the afterglow noise of previous pulses, which may result in an increasingly noisier signal on the output trace 110 of the PET detector. This may disrupt the ability of the PET detectors to acquire accurate and precise positron emission data throughout the duration of one or more treatment sessions. In particular, the ability of PET detectors to detect a pair of coincident positron annihilation photons with sufficient precision for time-of-flight analysis may be compromised due to either the short term or long term afterglow effect.

Another way that the afterglow effect may disrupt the ability of the PET detectors to acquire accurate and precise positron emission data throughout the duration of one or more treatment sessions is from the degradation of the energy resolution of the photodetector. As described above, photodetectors may saturate from afterglow photons. A photodetector, such as a silicon photomultiplier, may comprise hundreds to thousands of discrete Geiger avalanche photodiodes (which may be referred to as micro-pixels). An optical photon that interacts with an individual Geiger avalanche photodiode or micro-pixel may cause the micro-pixel to discharge. After discharging, the micro-pixel requires some finite amount of time to recover. This finite amount of time may be from about 10 ns to about 100 ns. If there is significant afterglow (e.g., as determined from an elevated bias current that exceeds a threshold), the total number of discrete micro-pixels available for the detection of positron emission data may be reduced because they are firing from afterglow photons, and cannot detect the scintillation signal resulting from positron annihilation photons. As the photodetector saturates from afterglow, its effective or cumulative gain is reduced. That is, the signal output from a photodetector affected by afterglow for a particular scintillation event is reduced as compared to the signal output from a photodetector under normal (i.e., non-afterglow) conditions. If the gain of the photodetector is reduced, then the quantitative accuracy of measuring the total energy of the incoming photon (e.g., scintillation event) may be degraded, which may hinder the ability to reject scattered photons. While the sensitivity of a PET detector may not be degraded by the afterglow effect, the afterglow effect may reduce the quantitative accuracy of the energy and timing resolution of each scintillation event.

Afterglow may also cause photodetectors to detect or register positron annihilation photons (i.e., 511 keV photons) at a lower energy level; that is, instead of the photopeak of 511 keV photons being located at the 511 keV level on the energy-spectrum, the photopeak of the 511 keV photons are located at energy levels lower than 511 keV. Since coincidence detection controllers or processors are configured to detect positron annihilation events based on 511 keV photons (e.g., setting a detection window centered around the 511 keV level), shifting the photopeak of the 511 keV photons to a lower energy level (e.g., outside of the detection window) may cause the PET detection system controller or processor to miss the detection of a positron annihilation event.

Methods

One method for acquiring positron emission data from PET detectors in the presence of scattered radiation may comprise adjusting the gain of the PET detector photodetectors (e.g., photomultipliers) as afterglow of the detectors increases, as depicted in the flow diagram of FIG. 2A. As depicted there, method 220 may comprise setting 222 an initial gain value for the photodetectors of the PET detectors of a radiation therapy system. This step may take place during the assembly and/or manufacturing of the system, or may take place just prior to the start of a radiation therapy session. After the gain value has been set, the method may comprise proceeding 224 with radiation therapy, which may comprise injecting a patient with a PET tracer, and activating a linac to generate and fire radiation pulses to one or more targets regions. During the radiation therapy session, a system controller may monitor one or more parameters and/or characteristics of the linac and/or PET detectors and/or any other detectors or sensors (e.g., current or voltage sensors, temperature sensors, radiation sensors, etc.). The controller may determine 226 whether one or more of those characteristics meet criteria for adjusting the gain value for the photodetectors of the PET detectors. If one or more criteria have been met for adjusting the gain value, then the controller may adjust 228 the gain value of the PET detectors, e.g., by adjusting the bias voltage of the photodetectors and/or by adjusting a gain factor used in data acquisition or analysis (e.g., adjusting an acquisition or analysis software gain factor) by a processor of the controller. For example, one or more system parameters exceeding predetermined thresholds may indicate that PET detector afterglow has increased to a certain level, and increasing the gain value of the photodetectors and/or the data acquisition gain factor may help to reduce the false detection of coincident high-energy photons. At increased levels of afterglow, there may be more photons generated by the scintillating material. These afterglow photons may cause the PET detector photodetectors to register the detection of 511 keV photons at lower energy levels. That is, the output from the PET detectors may indicate that photons at an energy level lower than 511 keV were detected, when in fact, 511 keV photons were detected, but the magnitude/energy of the PET detector photodetector output is reduced due to afterglow. Increasing the gain value of the photodetectors of the PET detectors (e.g., by increasing the bias voltage to the photodetectors) may help to increase the PET detector photodetector output so that it accurately reflects the detection of 511 keV photons, which may help to improve the rate of detection of true coincident high-energy photons. Alternatively or additionally, a gain factor may be used by the system processor in data acquisition that compensates for the reduced PET detector output. For example, the system processor may multiply and/or shift the output of a PET detector by a gain factor whose value depends on the afterglow level. In some variations, the method depicted in FIG. 2A, along with the methods depicted in FIGS. 3-7 may be implemented in machine-readable instruction sets that may be stored in the memory of a controller in communication with the PET detectors. Data from the radiation therapy system, such as from various sensors, the PET detectors, the linac, etc. may be transmitted to the controller, which may perform computations (e.g., analysis) based on those measurements and/or may store the results of those computations and/or system data in one or more controller memories. Command signals generated by the controller may be transmitted to the components of the radiation therapy system (e.g., the PET detectors and/or linac) to control the operation of those components (e.g., adjusting the gain value of the photodetectors of the PET detectors).

Figure 2B:
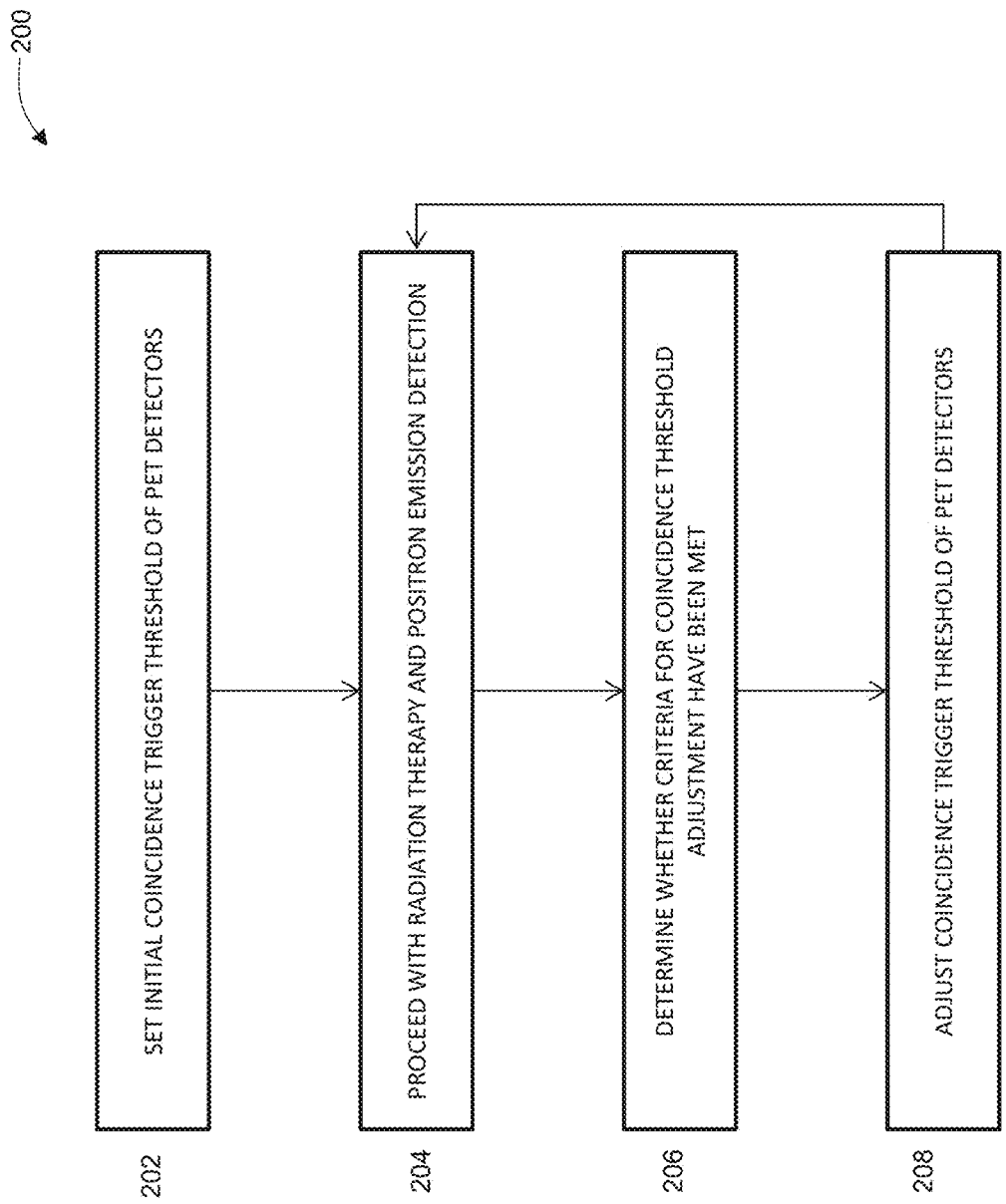
FIG. 2B is a flowchart diagram of one variation of a method for dynamic PET detector threshold adjustment.

One method for acquiring positron emission data from PET detectors in the presence of scattered radiation may comprise adjusting the coincidence trigger threshold of the PET detectors as afterglow of the detectors increases, as depicted in the flow diagram of FIG. 2B. As depicted there, method 200 may comprise setting 202 an initial coincidence trigger threshold for the PET detectors of a radiation therapy system. This step may take place during the assembly and/or manufacturing of the system, or may take place just prior to the start of a radiation therapy session. After the coincidence trigger threshold has been set, the method may comprise proceeding 204 with radiation therapy, which may comprise injecting a patient with a PET tracer, and activating a linac to generate and fire radiation pulses to one or more targets regions. During the radiation therapy session, a system controller may monitor one or more parameters and/or characteristics of the linac and/or PET detectors and/or any other detectors or sensors (e.g., current or voltage sensors, temperature sensors, radiation sensors, etc.). The controller may determine 206 whether one or more of those characteristics meet criteria for adjusting the coincidence trigger threshold for the PET detectors. If one or more criteria have been met for adjusting the coincidence trigger threshold, then the controller may adjust 208 the coincidence trigger threshold of the PET detectors. For example, one or more system parameters exceeding predetermined thresholds may indicate that PET detector afterglow has increased to a certain level, and increasing the coincidence trigger threshold may help to reduce the false detection of coincident high-energy photons. That is, at increased levels of afterglow, there may be more photons generated by the scintillating material. These afterglow photons may degrade or reduce the ability of the PET detectors to detect coincident high-energy photons. Increasing the coincidence trigger threshold of the PET detectors may help to disregard afterglow photons, and help to improve the rate of detection of true coincident high-energy photons. In some variations, the method depicted in FIG. 2B, along with the methods depicted in FIGS. 3-7 may be implemented in machine-readable instruction sets that may be stored in the memory of a controller in communication with the PET detectors. Data from the radiation therapy system, such as from various sensors, the PET detectors, the linac, etc. may be transmitted to the controller, which may perform computations based on those measurements and/or may store the results of those computations and/or system data in one or more controller memories. Command signals generated by the controller may be transmitted to the components of the radiation therapy system (e.g., the PET detectors and/or linac) to control the operation of those components (e.g., adjusting the coincidence trigger threshold of the PET detectors).

The criteria for PET detector photodetector gain adjustment (e.g., adjusting the gain value of the PET detector photodetectors and/or gain factor used in positron emission data acquisition) and/or coincidence threshold adjustment may be measured over an entire array of PET detectors, and/or a PET detector module (i.e., having a subarray of PET detectors), and/or a single PET detector. For example, in a radiation therapy system with two PET detector arrays, each PET detector array comprising a plurality of PET detector modules (e.g., 32 PET detector modules), each PET detector module comprising a subarray of PET detectors (e.g., a 6×12 subarray of PET detectors), and where each PET detector has its own photodetector, the criteria (and/or temperatures, bias currents, noise levels, coincidence timing distributions, photopeaks, dark count rates, etc.) may be measured over an entire PET detector array, and/or over individual PET detector modules, and/or over individual PET detectors. Similarly, the gain and/or coincidence trigger threshold may be adjusted for an entire PET detector array, and/or individual PET detector modules, and/or individual PET detectors. For example, all of the PET detectors in a PET detector module may have the same photodetector gain value (i.e., bias voltage applied to the module is applied to all of the PET detector photodetectors), and a bias current measurement may be the cumulative bias currents of all of the PET detectors in the module. The bias current, bias voltage, and/or gain factor for each PET detector module may be different from each other. That is, differing levels of afterglow correction may be applied to different PET detector modules. For example, in a radiation therapy system with two PET detector arrays with 32 PET detector modules each, the afterglow effect may be corrected for each of the 64 PET detector modules by measuring 64 bias currents of the 64 PET detector modules (and/or temperatures, noise levels, coincidence timing distributions, photopeaks, dark count rates, etc.) and then applying the afterglow correction to the 64 PET detector modules individually (e.g., applying 64 potentially different gain and/or coincident threshold adjustments). Alternatively or additionally, the bias current (and/or temperatures, noise levels, coincidence timing distributions, photopeaks, dark count rates, etc.) may be measured for individual PET detector photodetectors and/or over an entire PET detector array having multiple PET detector modules. While the description and variations described below may refer to measuring the bias current (and/or temperature, noise level, coincidence timing distribution, photopeak, dark count rate, etc.) for a single PET detector and/or photodetector (or for a plurality of PET detectors and/or photodetectors) and adjusting the gain and/or gain factor and/or coincidence threshold for that single PET detector and/or photodetector (or plurality of PET detectors and/or photodetectors, respectively), it should be understood that the description also applies to measuring a plurality of bias currents (and/or temperatures, noise levels, coincidence timing distributions, photopeaks, dark count rates, etc.) for a plurality of PET detectors and/or photodetectors (or for an individual PET detector and/or photodetector), and adjusting the gain and/or gain factor and/or coincidence threshold for that plurality of PET detectors and/or photodetectors (or for an individual PET detector and/or photodetector, respectively).

One variation of a method for acquiring positron emission data in the presence of scattered or stray radiation is depicted in FIG. 3. Method 300 may comprise generating 302 a calibration table between detector noise levels and coincidence trigger thresholds of PET detectors. One method of generating a calibration table may comprise creating environments that give rise to varying degrees or levels of noise on the PET detectors, providing a positron emission source (e.g., a positron-emitting seed) that emits positrons at a known rate, and adjusting the coincidence trigger threshold of the PET detectors at each noise level until the PET detector output corresponds to a pre-determined time resolution quality or metric. The time resolution quality or metric may be determined during the manufacture and/or calibration of the radiation therapy system. The time resolution quality may be measured using a calibration source and may analyze the time spectrum of coincidence detected photons. For example, a positron-emitting point source may have a time-spectrum that follows a Gaussian distribution where the mean is related to the spatial offset of the point source between PET detectors and the variance is related to the quality of the time-resolving capability. One method for quantifying the time resolution quality may comprise calculating the full-width-at-half maximum (FWHM) of this time spectrum. Method 300 may also comprise measuring 304 the noise level of the PET detectors during a treatment session and comparing 306 the measured noise levels with the noise levels in the calibration table to identify the coincidence trigger threshold that corresponds with the measured noise level. The coincidence trigger threshold may be adjusted 308 based on changes in the measured noise levels. For example, the coincidence trigger threshold may be increased as the noise level on the PET detectors increases. Alternatively or additionally, the method 300 may be used to adjust the gain value of PET detector photodetectors and/or gain factor used in positron emission data acquisition (e.g., a gain factor used to multiply and/or shift the output(s) of a PET detector(s)). For example, a variation of method 300 may comprise generating a calibration table between detector noise levels and gain values and/or gain factors, measuring the noise level of the PET detectors during a treatment session and comparing the measured noise levels with the noise levels in the calibration table to identify the gain values and/or gain factors that correspond with the measured noise level. The gain value and/or gain factor may be adjusted based on changes in the measured noise levels.

Scattered X-rays may interfere with the ability of PET detectors to precisely measure the arrival time of high-energy photons. In the absence of scattered X-rays, the timing precision of PET detectors may be characterized by a coincidence timing distribution having a range of timing errors. The coincidence timing distribution may be measured, for example, by using a point calibration source, as described above. The time difference from thousands or millions of coincidence events may be analyzed and the coincidence timing distribution may be binned and/or histogrammed to generate a timing distribution. The full-width-at-half-maximum (FWHM) of the timing distribution may be used to characterized the timing resolution of a PET detector or entire PET system. As the levels of scattered radiation increase, the coincidence timing distribution may change such that the range of timing errors increases. For example, without the interference of X-rays, PET detectors may have a coincidence timing distribution such that the range of timing of errors is 300 ps FWHM, but in the presence of scattered X-rays, the coincidence timing distribution may change such that the range of timing errors is 550 ps FWHM. One method of acquiring positron emission data in the presence of scattered radiation based on coincidence timing distributions is depicted in FIG. 4. Method 400 may comprise measuring 402 the coincidence timing distribution of the PET detectors before the linac is activated (e.g., before a treatment session, and/or during manufacture and/or a calibration session), measuring 404 the coincidence timing distribution of the PET detectors during a time period when the linac has been activated (e.g., during a treatment session), and comparing 406 the coincidence timing distribution measured in step 404 with the coincidence timing distribution measured in step 402. If the timing distribution varies more than about 10% from the previously measured timing distribution, then the coincidence trigger threshold of the PET detectors may be adjusted 408. One method of changing the coincidence trigger threshold is by sending a command to a readout circuit (e.g., an ASIC) to increase the voltage of a timing comparator. In another method, the coincidence trigger threshold may be a predetermined number of optical photons that are counted on a photodetector. In this method, the coincidence trigger threshold may be adjusted by changing (e.g., increasing or decreasing) the number of photons that need to be detected to signal a coincidence event. Alternatively or additionally, the method 400 may be used to adjust the gain value of PET detector photodetectors and/or gain factor used in positron emission data acquisition (e.g., a gain factor used to multiply and/or shift the output(s) of a PET detector(s)). For example, a variation of method 400 may comprise measuring the coincidence timing distribution of the PET detectors before the linac is activated (e.g., before a treatment session, and/or during manufacture and/or a calibration session), measuring the coincidence timing distribution of the PET detectors during a time period when the linac has been activated (e.g., during a treatment session), and comparing the coincidence timing distribution measured during treatment with the coincidence timing distribution measured before treatment. If the timing distribution varies more than about 10% from the previously measured timing distribution, then the gain value and/or gain factor may be adjusted based on changes in the timing distribution.

Figure 5:
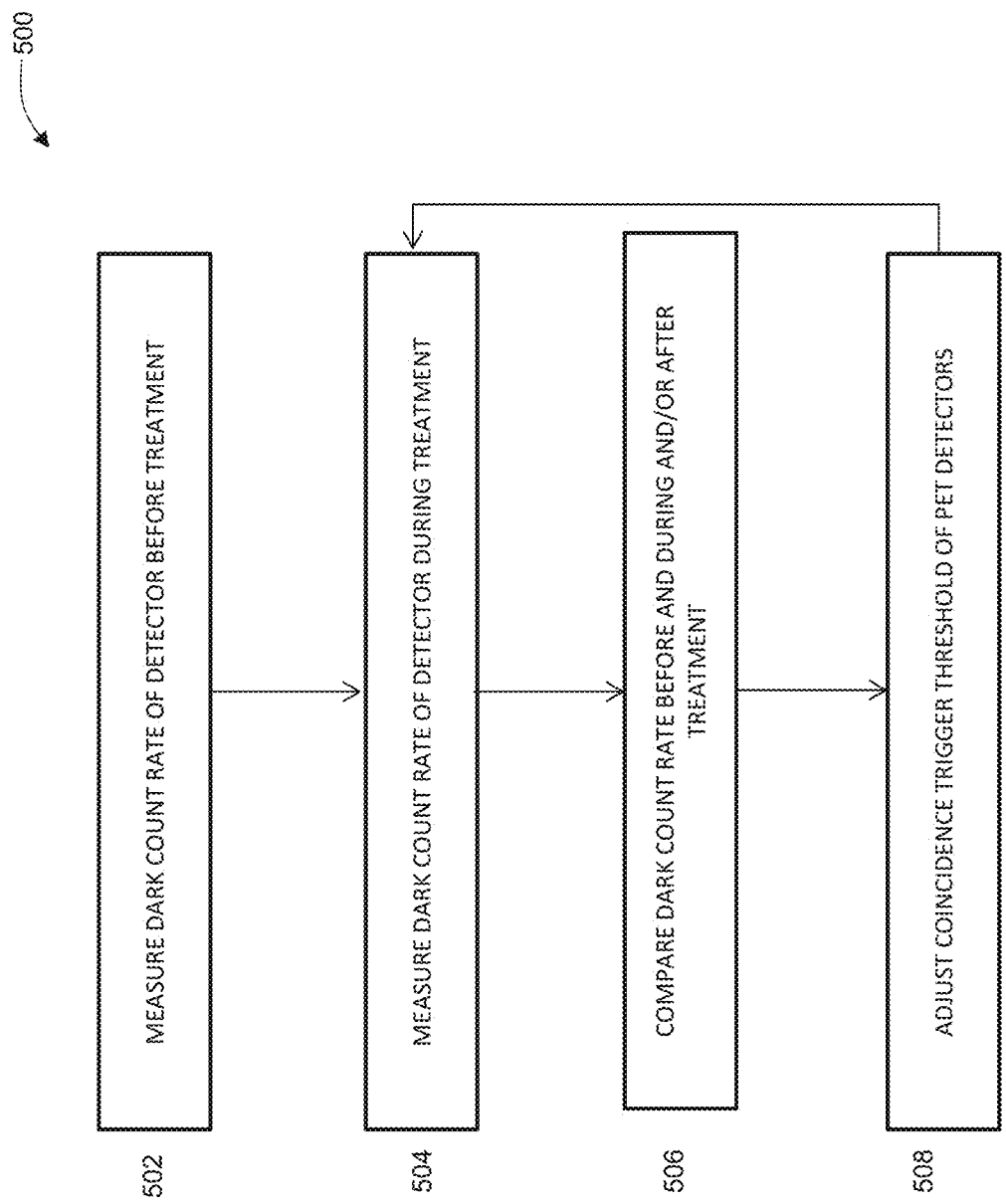
FIG. 5 is a flowchart diagram of one variation of a method for dynamic PET detector threshold adjustment based on PET detector dark count rates.

Afterglow of PET detectors may cause the dark count rate of the photodetector to increase, which may interfere with precise detection of positron emission events. Another variation of a method for acquiring positron emission data in the presence of scattered radiation is depicted in FIG. 5. In this method, the coincidence trigger threshold may be adjusted based on changes in the dark count rate of the PET photodetector. Method 500 may comprise measuring 502 the dark count rate of the PET detectors before activation of the linac (e.g., before a treatment session, and/or during manufacture and/or a calibration session), measuring 504 the dark count rate of the PET detectors during a time period when the linac has been activated (e.g., during a treatment session), and comparing 506 the dark count rate measured in step 504 with the dark count rate measured in 502. In some variations, the dark count rate may be measured by measuring the bias current of the photodetector, and the comparison in step 506 may be between the calculated dark count rate based on the bias current and/or the bias current measurement itself. Alternatively or additionally, the dark count rate may be measured by counting low-photon triggers (i.e., measuring the number of low energy photon triggers). The dark count rate may be measured over an entire PET detector array or module/subarray, and/or may be measured on a per photodetector basis. If the dark count rate measured in steps 504 and 506 deviates more than about 2 Mcps to about 10 Mcps (e.g., about 3 Mcps), the coincidence trigger threshold of the PET detector(s) may be adjusted 508. For example, the coincidence trigger threshold of the PET detectors may be increased if the dark count rate increases or exceeds a threshold (e.g., exceeds about 2 Mcps, exceeds about 3 Mcps, and/or exceeds about 10 Mcps). Steps 504-508 may be repeated throughout the treatment session and/or while the linac is in use. Alternatively or additionally, the method 500 may be used to adjust the gain value of PET detector photodetectors and/or gain factor used in positron emission data acquisition (e.g., a gain factor used to multiply and/or shift the output(s) of a PET detector(s)). For example, a variation of method 500 may comprise measuring the dark count rate of the PET detectors before the linac is activated (e.g., before a treatment session, and/or during manufacture and/or a calibration session), measuring the dark count rate of the PET detectors during a time period when the linac has been activated (e.g., during a treatment session), and comparing the dark count rate measured during treatment with the dark count rate measured before treatment. If the dark count rate measured during treatment deviates by more than about 2 Mcps to about 10 Mcps (e.g., about 3 Mcps) from the dark count rate measured before treatment, then the gain value and/or gain factor may be adjusted based on changes in the timing distribution.

The effect of PET detector afterglow may also be measured in the bias current of the photodetector. Changes in the bias current may indicate degradation in the ability of the PET detectors to acquire positron emission data, and adjusting the coincidence trigger threshold (e.g., increasing the coincidence trigger threshold as the afterglow effects increase) may help improve the precision of the emission data acquisition. One variation of a method for acquiring positron emission data in the presence of scattered radiation is depicted in FIG. 6A. In this method, the coincidence trigger threshold may be adjusted based on changes in the bias current of the photodetector. The bias current may be measured by monitoring the voltage supply (such as a high-voltage supply) for the photodetector. Method 600 may comprise measuring 602 the bias current of the photodetector before activation of the linac (e.g., before a treatment session, and/or during manufacture and/or a calibration session), measuring 604 the bias current of the photodetector during a time period when the linac has been activated (e.g., during a treatment session), and comparing 606 the bias current measured in step 604 with the bias current measured in 602. If the bias current measured in steps 604 and 606 deviate more than about 0.1 mA to about 5 mA, the coincidence trigger threshold of the PET detectors may be adjusted 608. Alternatively or additionally, the bias current may be measured over an entire PET detector array or module/subarray, and/or may be measured on a per photodetector basis. Steps 604-608 may be repeated throughout the treatment session and/or while the linac is in use.

Alternatively or additionally, the coincidence trigger threshold of the PET detectors and/or gain value of the PET detector photodetectors and/or gain factor used in positron emission data acquisition may be adjusted based on temperature and/or radiation measurements of the areas at or around the linac (or any therapeutic radiation source) and/or PET detector arrays. For example, a radiation therapy system may comprise one or more temperature sensors, which may be located at or near the PET detector arrays and/or at or near the linac. Temperature data from these sensors may be transmitted to the controller, and if the temperature at the linac and/or the PET detector arrays exceeds one or more thresholds, the coincidence trigger threshold of the PET detectors may be adjusted. Similarly, one or more dosimeters (e.g., MOSFET dosimeter, thermoluminescent dosimeter, and the like) may be located at or near the PET detector arrays and/or at or near the linac. Radiation data from these dosimeters may be transmitted to the controller, and if the radiation levels at the linac and/or the PET detector exceed one or more thresholds, the coincidence trigger threshold of the PET detectors may be adjusted. Some methods may also adjust the coincidence trigger threshold and/or gain value of the PET detector photodetectors and/or gain factor used in positron emission data acquisition (e.g., a gain factor used to multiply and/or shift the output(s) of a PET detector(s)) based on the radiation output of the linac. For example, a radiation therapy system may comprise a dose chamber or ionization chamber disposed in the beam path of the linac. The ionization chamber may transmit the amount of radiation emitted by the linac to the controller, which may adjust the coincidence trigger threshold of PET detectors and/or gain value of the PET detector photodetectors and/or gain factor used in positron emission data acquisition based on the radiation output of the linac. For example, a table that maps various radiation output thresholds to various coincidence trigger thresholds and/or gain value of the PET detector photodetectors and/or gain factor used in positron emission data acquisition may be stored in controller memory, and the controller may compare real-time ionization chamber measurements with the thresholds in the table to determine whether to adjust the coincidence trigger thresholds and/or gain value of the PET detector photodetectors and/or gain factor used in positron emission data acquisition. The thresholds may be based on cumulative radiation output starting from the first pulse emitted by the linac until the current time point, and/or may be based on the radiation output over a predetermined interval of time (e.g., a pulse rate during a treatment session). For example, radiation output levels for a linac greater than 0.1 Gy/min into a human torso may generate a sufficient level of scattered radiation that may leads to afterglow in a PET detector.

In some variations, a table that maps linac pulse counts to various coincidence trigger thresholds and/or gain value of the PET detector photodetectors and/or gain factor used in positron emission data acquisition (e.g., a gain factor used to multiply and/or shift the output(s) of a PET detector(s)) may be stored in controller memory. The number of radiation pulses emitted by the linac may be used by the controller to adjust the coincidence trigger threshold of the PET detectors. For example, the controller may adjust the coincidence trigger threshold of the PET detectors after a first number of pulses have been emitted by the linac, e.g., 10,000 pulses. The controller may adjust the coincidence trigger threshold and/or gain value of the PET detector photodetectors and/or gain factor used in positron emission data acquisition again when the linac has emitted an additional number of pulses, e.g., another 10,000 pulses, bringing the cumulative pulse count to 20,000. The number of pulses emitted by the linac (i.e., threshold number of radiation pulses) before adjusting the coincidence trigger threshold and/or gain value of the PET detector photodetectors and/or gain factor used in positron emission data acquisition may be about 1,000, about 2,000, about 4,000, about 7,500, or about 12,000 pulses, etc., depending on level of scattered or stray radiation present in a particular treatment system. That is, for systems with elevated levels of scattered or background radiation, the number of linac pulses before adjusting the coincidence trigger threshold and/or gain value of the PET detector photodetectors and/or gain factor used in positron emission data acquisition may be lower than for systems with lower levels of scattered or background radiation. In some variations, the table may map linac pulse rates or pulse schedules (i.e., number of pulses over a particular interval of time, and/or a timing schedule of pulses) to PET detector coincidence trigger thresholds and/or gain values of the PET detector photodetectors and/or gain factor used in positron emission data acquisition. One or more of these parameters may be used alone and/or in combination with one or more of the methods described herein to determine when to adjust PET detector coincidence trigger thresholds and/or gain values of the PET detector photodetectors and/or gain factor used in positron emission data acquisition, and/or how much to adjust the coincidence trigger thresholds (e.g., increase or decrease by a specific value, etc.). As an example, the initial coincidence trigger threshold for PET detectors at the beginning of a treatment session may be about 2 photon-triggers. A photon-trigger may be the voltage, charge or count that represents a detected photon. For example, a 2 photon-trigger means that the timing discriminator of a PET detector fires when it detects the arrival of two or more photons. After 10,000 radiation pulses have been emitted, the coincidence trigger threshold may be increased to about 5 photon-triggers. After another 10,000 radiation pulses have been emitted (that is, 20,000 radiation pulses cumulatively), the coincidence trigger threshold may be increased to about 6 photon-triggers. The threshold number of radiation pulses before changing the coincidence trigger threshold, as well as the coincidence trigger threshold change increments may vary from this example, as may be desirable.

Figure 6B:
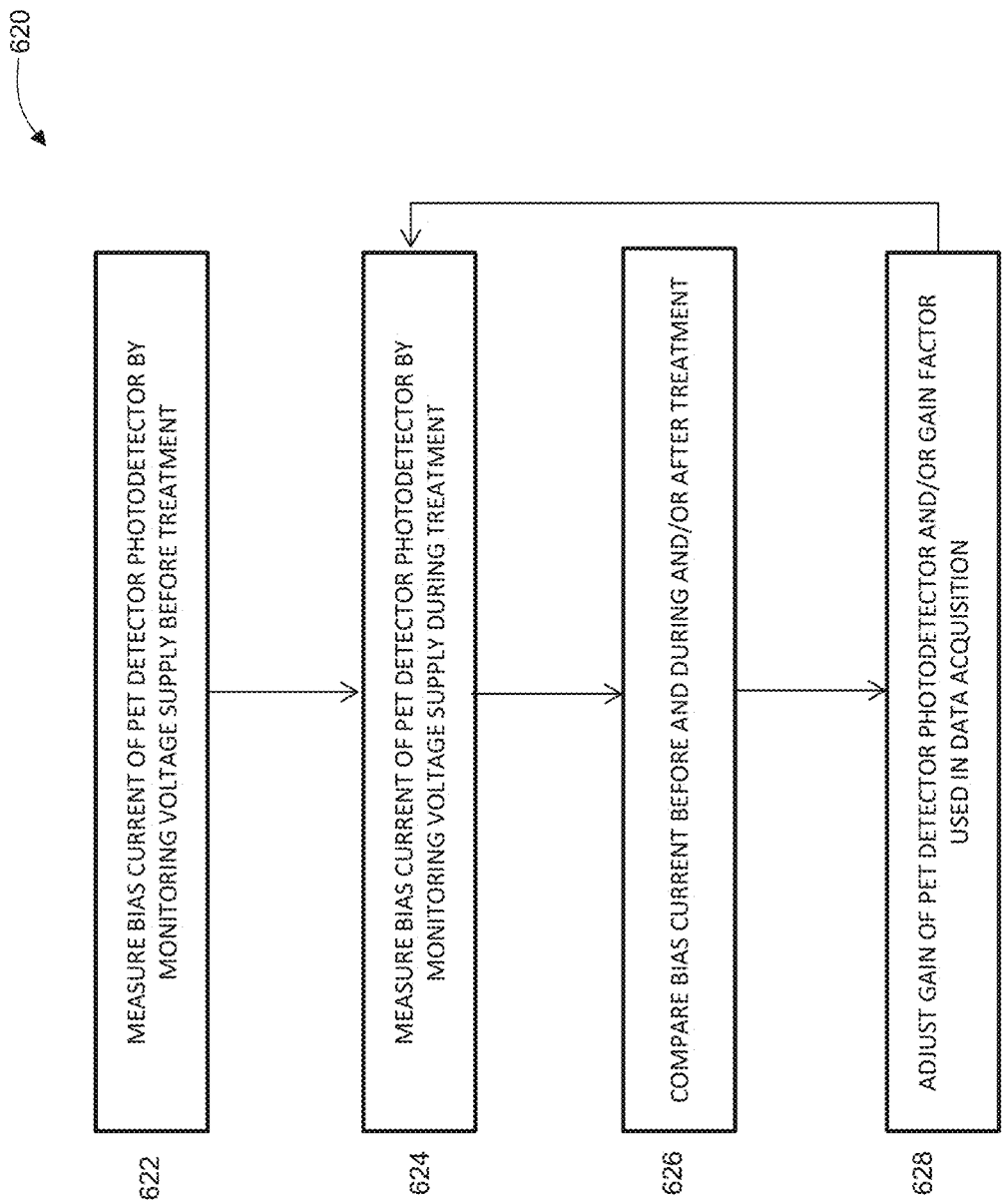
FIG. 6B is a flowchart diagram of one variation of a method for dynamic gain adjustment based on PET detector bias current.

FIG. 6B depicts one variation of a method where the gain value of PET detector photodetectors may be adjusted based on changes in the bias current of the photodetector, which may compensate for the saturation of the photodetector (e.g., silicon-photomultiplier) due to afterglow. The bias current may be measured by monitoring the voltage supply (such as a high-voltage supply) for the photodetector. Method 620 may comprise measuring 622 the bias current of the photodetector before activation of the linac (e.g., before a treatment session, and/or during manufacture and/or a calibration session), measuring 624 the bias current of the photodetector during a time period when the linac has been activated (e.g., during a treatment session), and comparing 626 the bias current measured in step 624 with the bias current measured in 622. If the bias current measured in steps 624 and 626 deviate more than about 0.1 mA to about 5 mA, a gain value of the PET detector photodetectors and/or gain factor used in positron emission data acquisition may be adjusted 628. The bias current may be measured over an entire PET detector array or module/subarray, and/or may be measured on a per photodetector basis. Steps 624-628 may be repeated throughout the treatment session and/or while the linac is in use. In some variations, the gain value of the photodetector(s) may be adjusted by adjusting the bias voltage of the photodetector and/or a gain factor used in positron emission data acquisition (e.g., adjusting an acquisition or analysis software gain factor) by a processor of the controller. For example, a gain factor may be used by the system processor in data acquisition to help compensate for the reduced PET detector output due to the afterglow effect. For example, the system processor may multiply and/or shift the output of a PET detector by a gain factor whose value depends on the afterglow level (as indicated by, for example, the measured bias current). The gain factor may be calculated by, for example, measuring PET detector output values corresponding to 511 keV photons at different levels of afterglow (corresponding to different values of measured bias current), taking a difference between the measured PET detector output values and the nominal output value corresponding to the detection of 511 keV photons (i.e., in the absence of afterglow), and calculating a ratio of the difference to the nominal output value. Alternatively or additionally, the gain factor may be calculated by measuring a photopeak shift of 511 keV photons at different levels of afterglow (corresponding to different values of measured bias current), taking a difference between the shifted photopeak(s) and the nominal photopeak at 511 keV (i.e., in the absence of afterglow), and calculating a ratio of the difference to each of the shifted photopeaks. A calibration table or plot may be generated that maps the measured bias current to gain factor values. Changing the gain value and/or gain factor used in positron emission data acquisition may adjust the energy and timestamp of a positron annihilation event recorded by the PET detectors to correct for saturation of the detector caused by afterglow. In some variations, a method for adjusting the gain value and/or gain factor may comprise generating a calibration table between bias current values and gain values (and/or gain factors), measuring the bias current of the PET detector photodetectors during a treatment session, comparing the measured bias current with the bias current values in the calibration table to identify the gain values and/or gain factors that correspond with the measured bias current, and then adjusting the gain value and/or gain factor according to the calibration table.

Figure 13A:
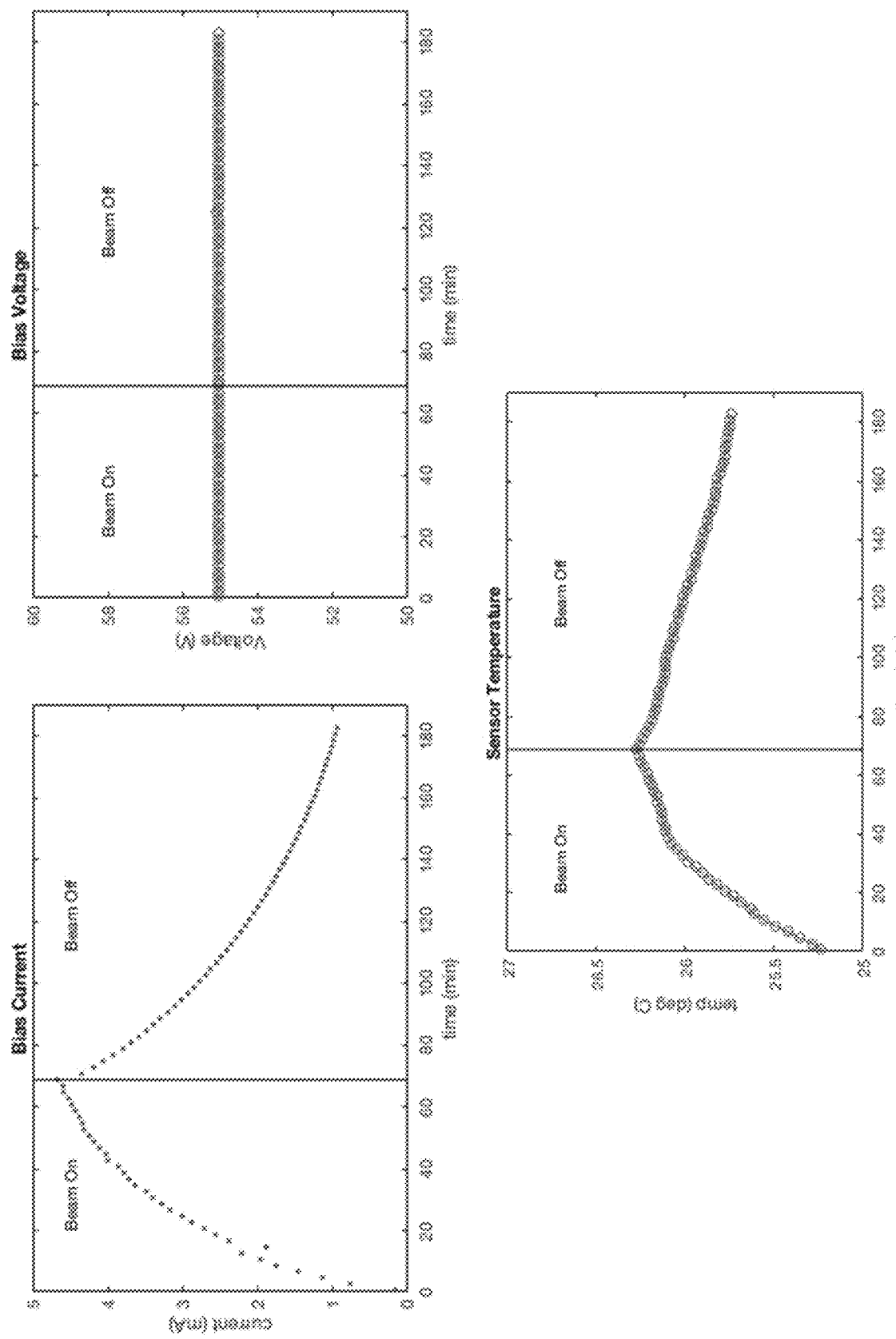
FIG. 13A depicts an experimental data plot of the changes in bias current and temperature as a function of linac beam on-time.

FIG. 13A depicts experimental data plots of the changes in bias current and temperature as a function of linac beam over time, while keeping the bias voltage constant. As depicted there, it can be seen that after the beam is turned on at time point 0, the bias current increases from a low level of approximately 0.2 mA to approximately 4.2 mA over about one hour. When the beam is turned off at time point 69 (i.e., 69 minutes after the beam was turned on), the bias current drifts downward back to its baseline value over about 100 minutes. The temperature also drifts upward as the PET detector heats up because it has to dissipate more power in the photodetector. The heat accumulated in the PET detector may be the bias-current multiplied by the bias voltage. In this experiment, the heat generated in the detector starts at approximately 11 mW at around time point 0 (0.2 mA*55V) but increases significantly to approximately 231 mW at the peak around time point 69 (4.2 mA*55V). The change in temperature also affect the gain value of the photodetector, which may be corrected or compensated by adjusting the gain factor used in positron emission data acquisition, as described herein.

Figure 13B:
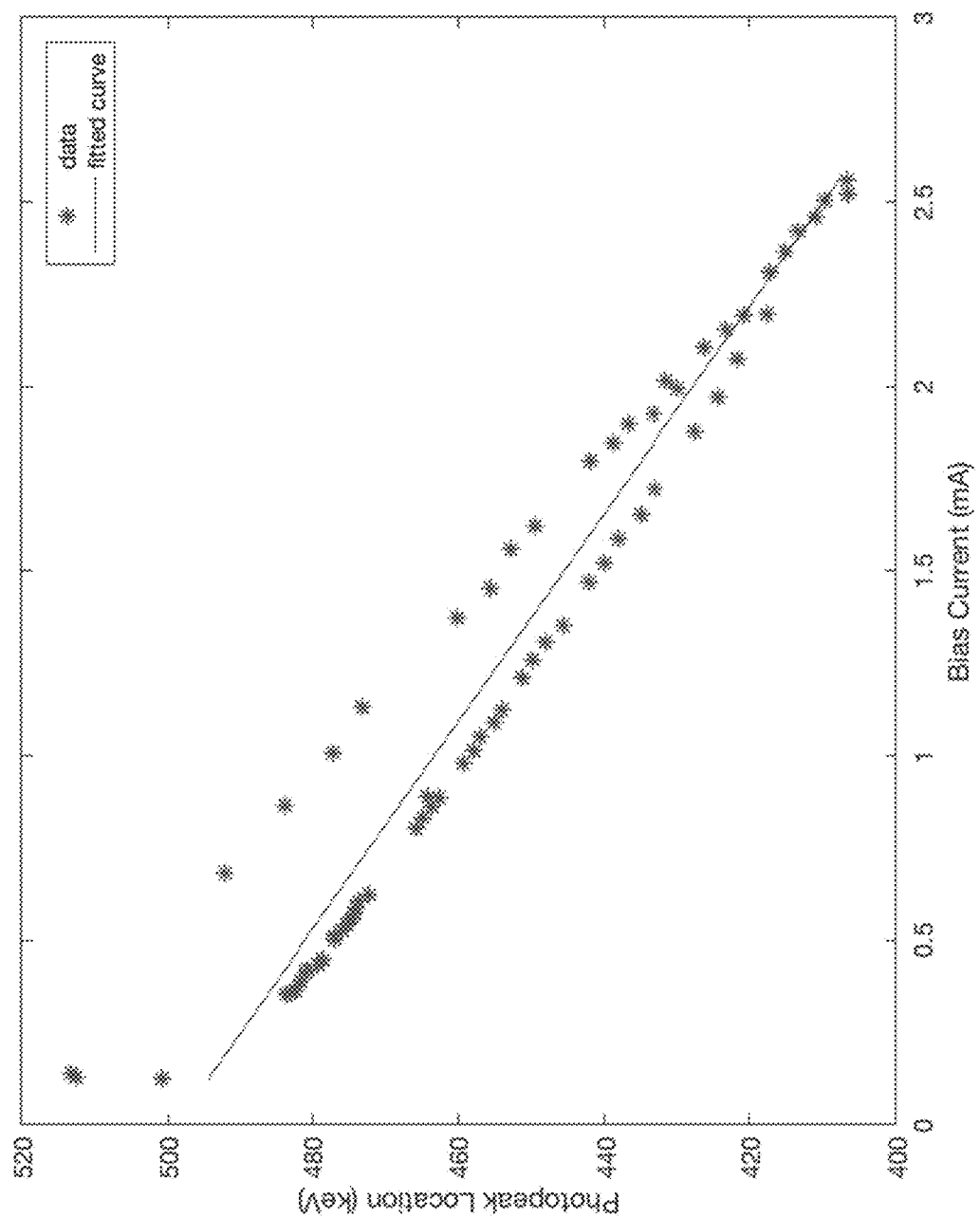
FIG. 13B depicts a calibration plot that has been generated by measuring the bias current and photopeak location.
Figure 13C:
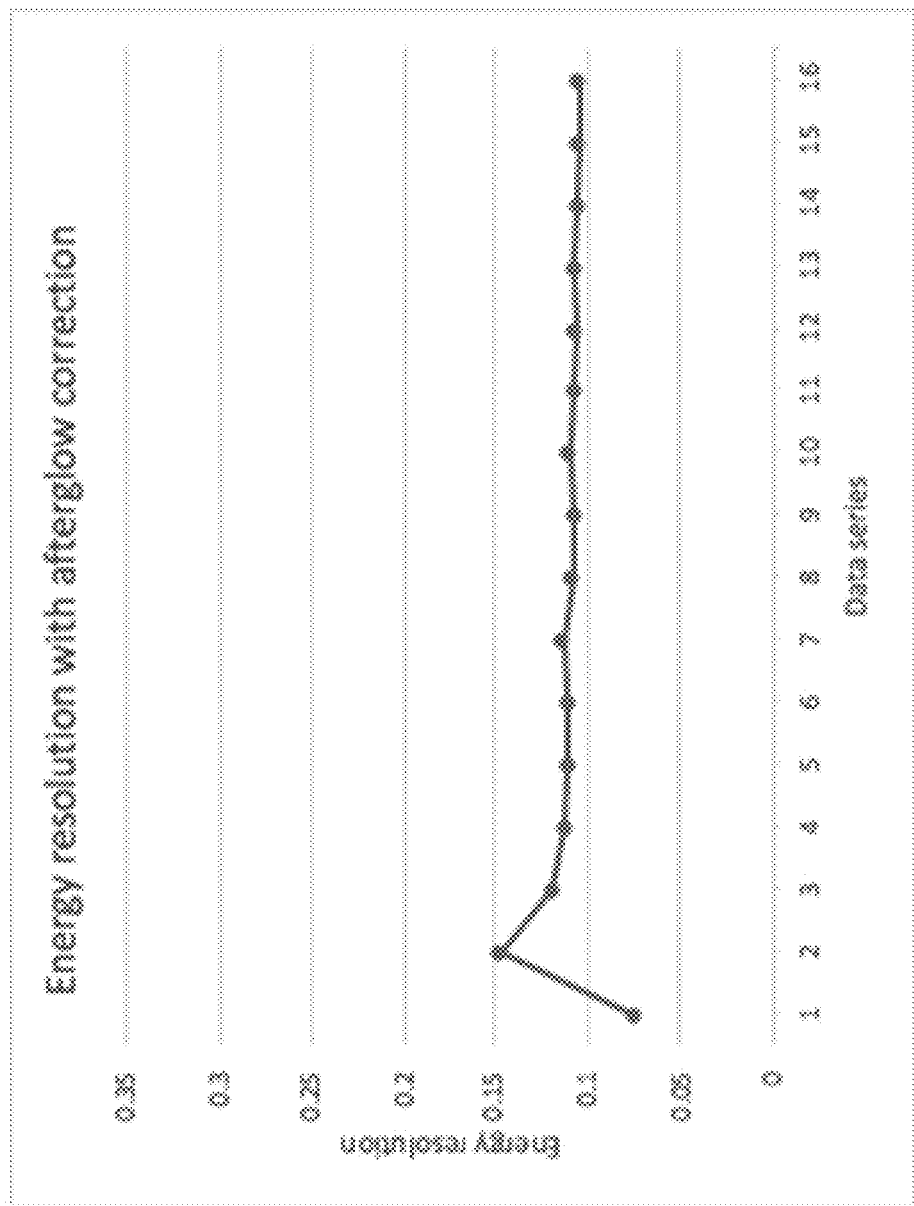
FIG. 13C depicts a plot of the energy resolution of a PET detector over time (each data-series interval represents a 10 minute increment where the linac beam was turned on at data-series value 1 and turned off at data-series value 7), with afterglow correction by gain adjustment.

A calibration table may be generated by measuring positron emission data of a calibration positron emitting point source (e.g., Na-22) using a PET detector, and tracking (i.e., quantifying) how that measurement changes at differing levels of afterglow. FIG. 13B depicts a calibration plot (which may be presented as a calibration table) that has been generated by measuring the bias current and photopeak location over a PET detector module having a 6×12 subarray of PET detectors. The photopeak is the location of the 511 keV peak of the photodetector along the energy-spectrum as detected by a PET detector photodetector. Photons emitted by a positron annihilation event have the same energy, and so therefore, every valid event has the same energy value. The "photopeak" may be the 511 keV peak on an energy-spectrum histogram plot of all the detected events. As can be seen in FIG. 13B, as the photodetectors of the PET detector is subject to greater afterglow, the bias current increases and the photopeak of 511 keV photons is detected as if lower-energy photons were detected (e.g., drifts linearly downward from 511 keV (nominal) to 400 keV). This downward shift of the 511 keV photopeak may degrade the performance of the photodetector, and hinder its ability to recognize or report 511 keV photons resulting from a positron annihilation event. FIG. 13C depicts a plot of the energy resolution of a PET detector over time (each data-series interval represents a 10 minute increment, where the linac beam was turned on at data-series value 1 and turned off at data-series value 7), where the gain of the PET detector photodetector has been adjusted to compensate for the downward shift of the 511 keV photopeak. As depicted there, with the gain adjustment or correction, the energy resolution remains stable over time. As described previously, photodetector gain may be adjusted or changed by adjusting the bias voltage to the detector. Alternatively or additionally, a gain factor that may be used by the system processor in data acquisition may be adjusted so that the system processor multiplies and/or shifts the output of a PET detector by the gain factor. In one variation, the gain factor for each bias current value may be the slope of the curve or line at that bias current value in a photopeak location to bias current plot. In the example of FIG. 13B, the gain factor may be the slope of the line (fitted to the data points in the plot), and the gain factor may be multiplied with the PET detector module output to identify positron annihilation events. A calibration table may be generated based on the plot of FIG. 13B that maps measured bias current levels to the photopeak location on the energy-spectrum. FIG. 13C shows the result of applying gain correction under different afterglow scenarios. As depicted there, adjusting the gain factor in different afterglow conditions/levels helps to keep the energy resolution or quality of measuring the energy of the incoming photon relatively constant. Monitoring the location of the photopeak on the energy-spectrum (e.g., during a treatment session) may provide an indication as to whether the gain has been appropriately adjusted to compensate or correct for the effects of afterglow (e.g., gain is not too high or too low). For example, alternatively or additionally to a calibration table that maps bias current levels to gain values (e.g., bias voltage levels, software gain factor), a calibration table may be generated that maps photopeak locations (e.g., 511 keV photopeak locations) to gain values (and/or gain factors used in positron emission data acquisition) so that during treatment, the gain value and/or gain factor may be adjusted according to photopeak locations.

Figure 13D:
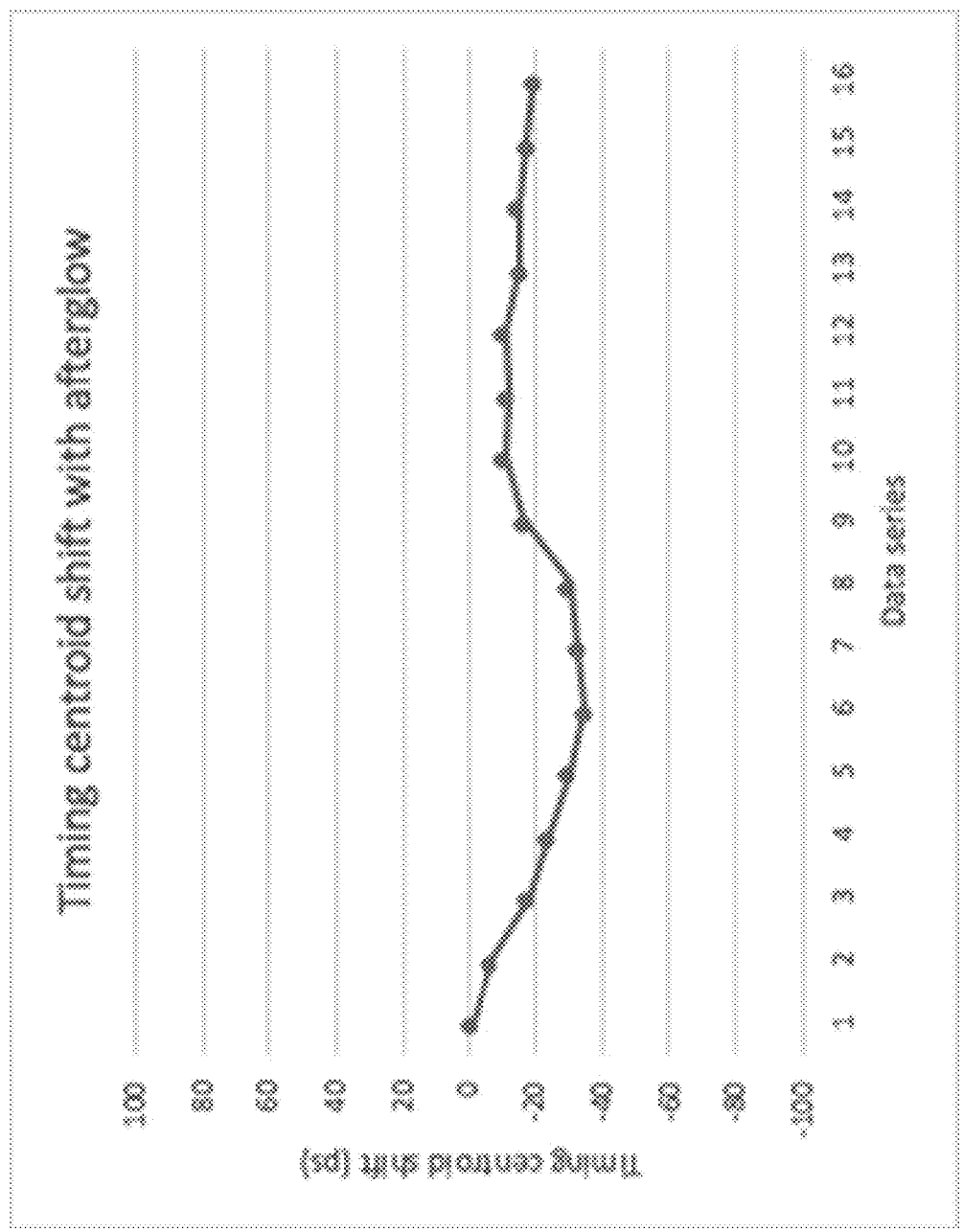
FIG. 13D depicts the shift of a time resolution centroid over time (each data-series interval represents a 10 minute increment where the linac beam was turned on at data-series value 1 and turned off at data-series value 7).

Another metric that may be used to determine whether the photodetector gain adjustment appropriately corrects for the afterglow effect is the time resolution of the photodetector. The time resolution of a photodetector, which represents the smallest time interval between two photon detection events that may be distinguishable by the photodetector as two separate events, may shift due to the afterglow effect. FIG. 13D depicts the shift of a time resolution centroid over time (each data-series interval represents a 10 minute increment, where the linac beam was turned on at data-series value 1, turned off at data-series value 7, and the recovery period is from data-series values 8-16) as a PET detector photodetector is subject to scattered linac X-rays that cause afterglow. The shift value of the timing centroid may be used, in some variations, to predict or estimate afterglow levels. Some methods for adjusting the gain of photodetectors to correct for afterglow effects may comprise calculating a calibration table that maps shifts in the timing centroid shift as a function of bias current. Alternatively or additionally, a calibration table may be generated that maps timing centroid shifts to gain values (e.g., bias voltage levels, software gain factor). During a treatment session, the timing resolution (e.g., timing centroid) may be measured/monitored and may provide an indication as to whether the gain has been appropriately adjusted to compensate or correct for the effects of afterglow (e.g., gain is not too high or too low). In some variations, the gain of PET detector photodetectors may be adjusted to correct for any timing centroid drifts.

As described previously, any of the methods for acquiring positron emission data from PET detectors in the presence of scattered radiation may comprise measuring and monitoring one or more parameters and/or characteristics of the linac and/or PET detectors and/or any other detectors or sensors (e.g., current or voltage sensors, temperature sensors, radiation sensors, etc.), and determining the afterglow level or severity based on these one or more parameters. That is, parameters such as temperature, bias current, radiation emission levels and/or pulse count, etc. may act as surrogates that quantify the afterglow level or effect. Based upon these measurements, a treatment system may change the gain to PET detector photodetectors by applying changes to the bias voltage and/or corrections or changes to the gain value used in data acquisition or analysis (e.g., adjusting an acquisition or analysis software gain factor) by a processor of the controller.

Alternatively or additionally, some methods may comprise delaying the acquisition of PET data by the controller during a linac radiation pulse and for a specified time interval after the radiation pulse. Delaying or suspending PET data acquisition and/or transmission during a linac pulse and for a specified time interval after the pulse may help to reduce or eliminate the storage and processing of positron emission data with afterglow noise and/or radiation pulse artifacts. The amount of radiation artifacts from the linac pulse and/or afterglow effect may be the greatest during the pulse and the time interval immediately following the pulse, and processing positron emission data with elevated levels of noise or artifacts may result in incorrect or imprecise coincidence detection. In some variations, the width of the radiation pulse from the linac may be about 5 µs or less and pulsed at a frequency of about 100 to about 300 Hz. In this configuration, the duty cycle of actual radiation beam on-time is from about 0.05% to about 0.15% (i.e., radiation beam off-time is about 99.85% to about 99.95%). The PET detectors and/or controller may delay and/or gate the acquisition of PET data during the linac pulse (e.g., delaying and/or gating the acquisition of positron emission data during a 5 µs linac beam pulse) and/or a period of time after the linac pulse with little or no impact on PET sensitivity. For time-of-flight PET systems, reducing or eliminating relatively high-noise positron emission data from the time-of-flight calculations may help to facilitate more precise location calculations, and/or may help to reduce margins of error.

The duration of the delay time interval may be determined at least in part based on the amount of PET detector afterglow, which may be qualitatively and/or quantitatively determined based on one or more of PET detector noise levels, detector timing distributions, dark count rate, bias current, temperature, ambient radiation levels, etc., including any of the parameters described previously. For example, the delay time interval may be from about 85 µs to about 500 µs, e.g., at least about 100 µs, at least about 200 µs, etc. In some variations, delaying the acquisition of positron emission data by the controller may comprise gating the reception of positron emission data by the controller such that positron emission data are not stored by the controller if the data was detected by the PET detectors during the specified time interval after a linac pulse. Alternatively or additionally, the transmission of positron emission data from the PET detector to the controller may be delayed such that PET data detected by the PET detectors during the specified time interval after a linac pulse is not transmitted. For example, data transmission from the PET detectors to the controller may be suspended during the specified time interval after a linac pulse, and may resume after the specified time interval has elapsed. In some variations, delaying the acquisition of positron emission data by the controller may comprise reading out positron emission data stored by the controller after the specified time interval after a linac pulse. For example, the positron emission data may be acquired and stored in controller memory even during the specified time interval after a linac pulse, however, the controller does not read the positron emission data from the memory until the after the specified time interval has passed and the positron emission data stored in the controller memory reflects data acquired after the specified time interval.

Figure 7A:
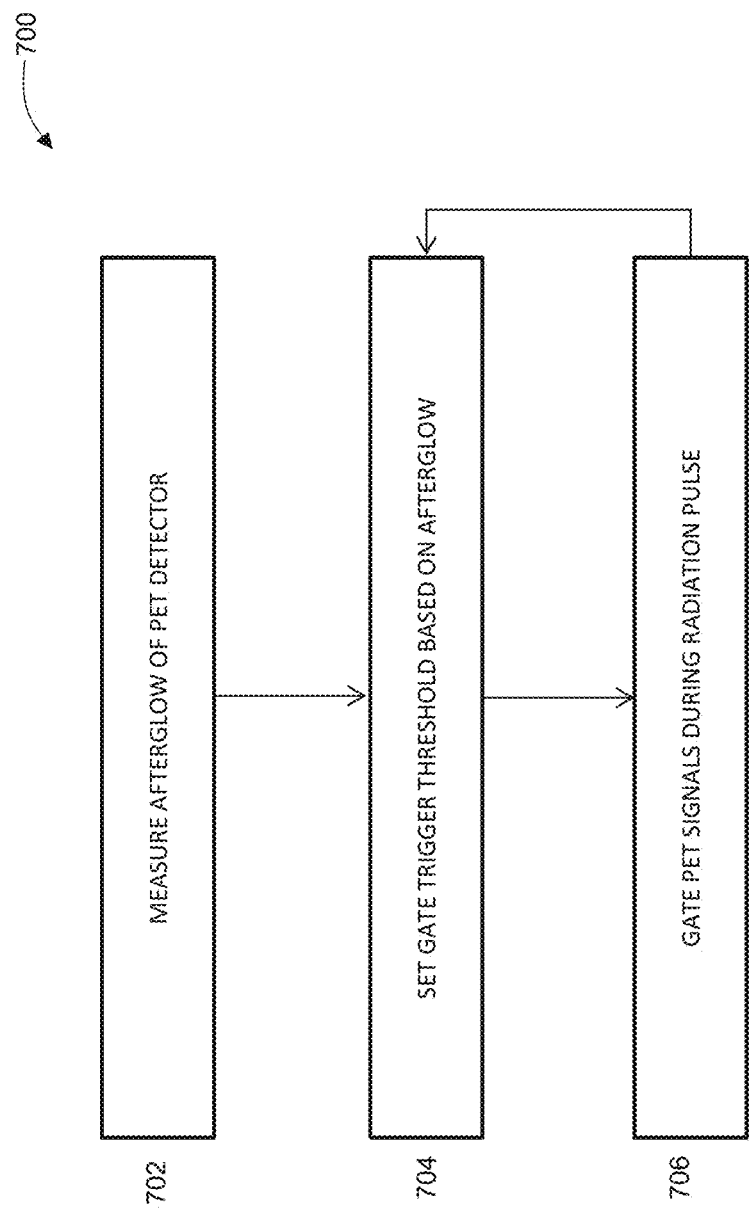
FIG. 7A is a flowchart diagram of one variation of a method for gating the communication of positron emission data from PET detectors to the controller.

FIG. 7A depicts a flowchart representation of one variation of a method for gating positron emission data. As depicted there, method 700 may comprise measuring 702 the effects of afterglow on the PET detectors. The amount of afterglow may be qualitatively and/or quantitatively determined based on one or more of the metrics described herein, including but not limited to PET detector noise levels, detector timing distributions, dark count rate, bias current, temperature, ambient radiation levels, etc. The method 700 may comprise setting 704 a gate trigger threshold based on the amount of afterglow. A gate trigger threshold is the time interval during which positron emission data is not transmitted from the PET detectors and/or positron emission data is not stored by the controller. For example, if any of the parameters indicative of afterglow levels exceed a predetermined threshold (e.g., a noise level, timing, dark count rate, bias current level, temperature level, radiation level), the gate trigger threshold may be increased such that communication of positron emission data between the PET detectors and the controller is suspended for a longer period of time. The gate trigger threshold may remain at an increased level until the afterglow returns to the PET detector pre-afterglow level (or within about 5% of the pre-afterglow level). The method 700 may further comprise gating 706 the positron emission data during and/or after the linac pulse based on the gate trigger threshold. The method 700 may be continuously executed by the controller during a treatment session, and/or may be executed at prescribed time intervals. In some variations, the method 700 may further comprise changing or updating the gate trigger threshold from an initial level if the measured afterglow effect exceeds a selected threshold, and/or if the change in afterglow from a previous measurement exceeds a selected threshold. For example, if the amount of detector afterglow remains relatively constant during a treatment session, the gate trigger threshold may not be updated. However, if there are substantial shifts in the amount of detector afterglow (e.g., increases or decreases in detector afterglow), the gate trigger threshold may be updated. The gating may be increased from about 500 µs to up to about 10 ms. Alternatively, the gate trigger threshold may be held constant.

Figure 7B:
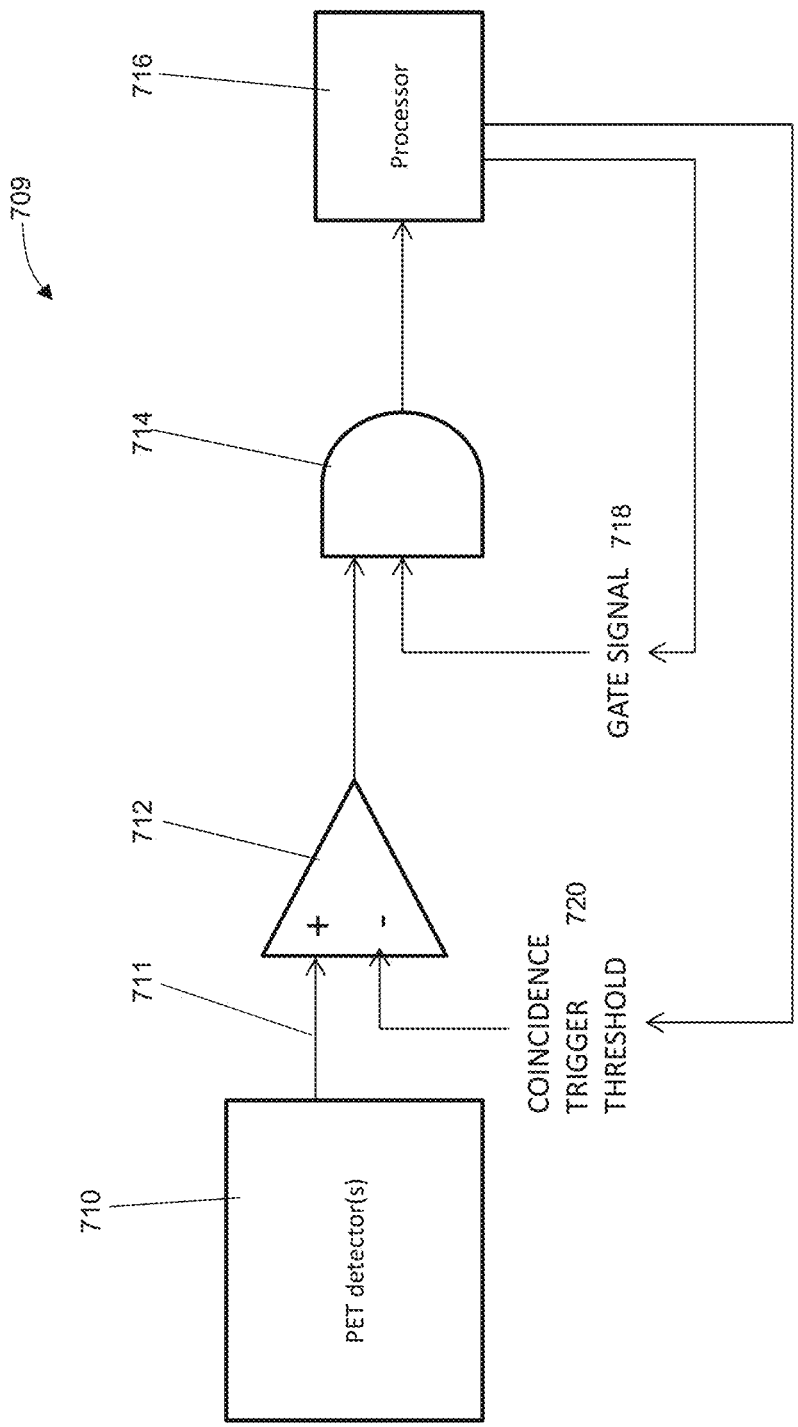
FIG. 7B is a schematic diagram of one variation of a logic circuit for gating the communication of positron emission data from PET detectors to the controller.
Figure 7C:
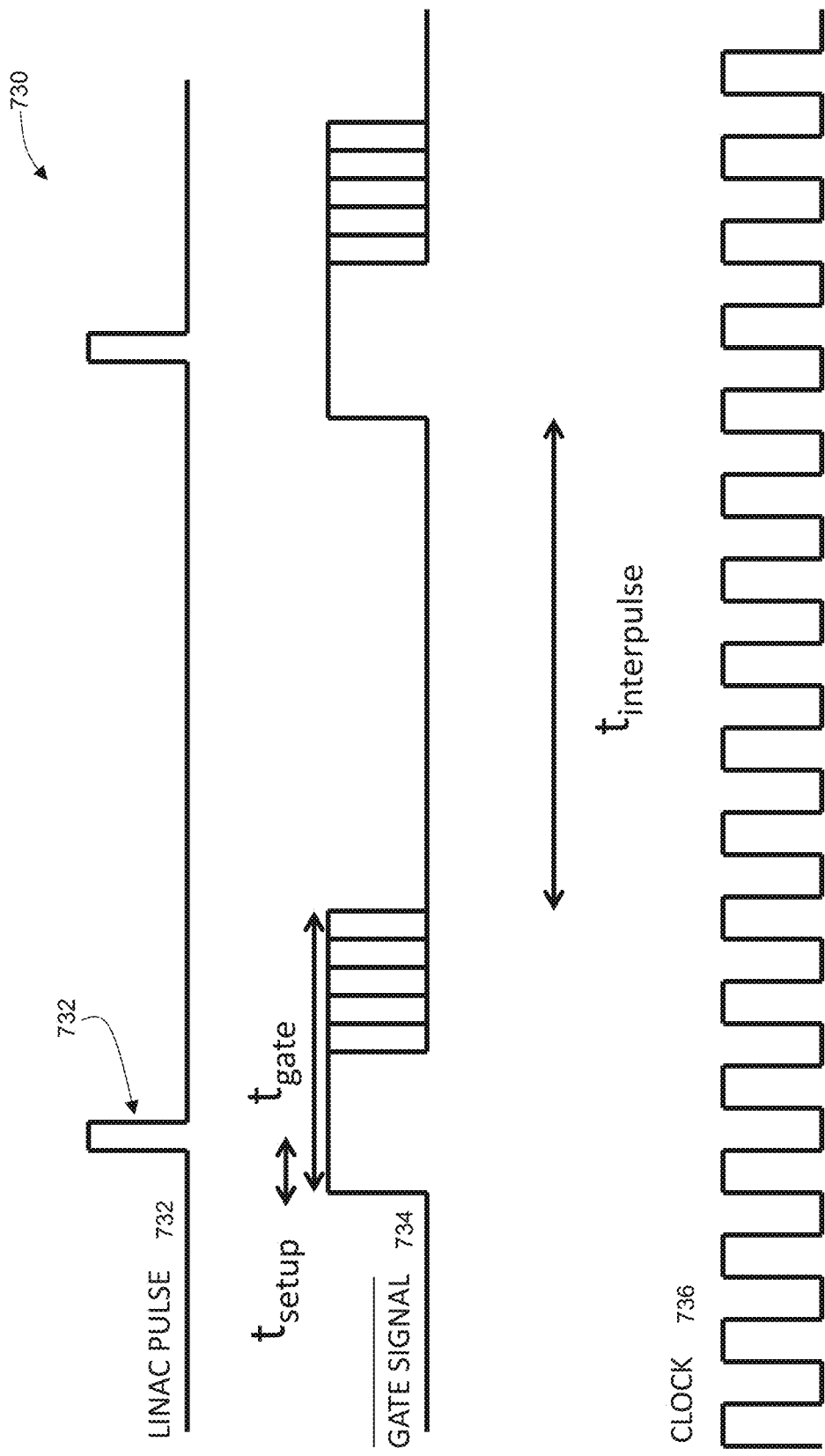
FIG. 7C is a timing diagram of one variation of a method for gating the communication of positron emission data from PET detectors to the controller.

FIG. 7B depicts a schematic diagram of one variation of a logic circuit 709 for gating PET data communication between the PET detectors and a processor of the controller. One or more PET detectors 710 (in one or more PET detector arrays) may output data 711 to a comparator 712. The comparator 712 compares the timing characteristics of the positron emission data 711 with a coincidence trigger threshold 720 from a processor 716 of the controller. The coincidence trigger threshold 720 may be determined when the system initiates (e.g., may initiate to a preset, default value) and/or may be updated as the system is used for treatment, as described above. If positron emission data is within the coincidence trigger threshold, then the positron emission data is output to a gate 714. Gate 714 may be, for example, an "AND" logic gate. Positron emission data may be transferred to the processor 716 only if a gate signal 718 from the processor to the gate 714 is active (e.g., "high"). The timing of the gate signal 718 may be such that it is inactive (e.g., "low") during a linac pulse and/or an interval of time (e.g., delay time) after the pulse, and is active (e.g., "high" after the interval of time following a linac pulse has elapsed and/or before a linac pulse. FIG. 7C depicts one example of a timing diagram 730 that depicts the timing of signals between the linac pulse 732, the inverse of the gate signal (which may be considered a "reset" signal), and a common clock signal 736 shared between the linac, PET detectors and the processor. In this example, the linac pulse 732 may have a pulse width of about 5 µs. In the variation depicted the timing diagram 730, the inverse of the gate signal 734 is "high" during a setup time period $t_{setup}$ of about 10 µs before the start (i.e., rising edge) of a linac pulse 733, during the linac pulse 733, and for a time interval (e.g., delay time) after the end (i.e., falling edge) of the linac pulse 733. The linac pulse 733 may be from about 2 µs to about 15 µs, with a duty cycle of less than about 0.001. The total duration $t_{gate}$ that the inverse of the gate signal is "high" may be from about 100 µs to about 3 ms. While the inverse of the gate signal is "high", positron emission data transfer/acquisition is suspended. Positron emission data transfer/acquisition may resume when the inverse of the gate signal is "low". The duration of time between gate signal pulses (i.e., interpulse period $t_{interpulse}$) may be as low as about 1 ms, but in some variations, the interpulse period between linac pulses may be between about 3 ms to about 10 ms. The time interval following the end of the linac pulse 733 may be adjusted based on the degree of PET detector afterglow, as described above.

Alternatively or additionally, the system may interleave positron emission data acquisition with radiotherapy delivery (e.g., linac activation). In this method, the PET detectors first acquire positron emission data. In some variations, the positron emission data from the PET detectors may be used to generate an image. After the positron emission data has been acquired and stored (e.g., into a controller memory), and/or after a PET image has been generated using the positron emission data, the PET detectors may be de-activated or disabled. The radiation source (e.g., linac or proton source) may be activated after the PET detectors have been de-activated, and may emit radiation pulses to the target (e.g., tumor region). In this interleaved mode, the positron emission data acquisition and the radiotherapy beam emission do not overlap significantly in time. In some variations, the activation of the PET detectors and the radiation source may be on a 50/50 duty cycle. While this may allow for longer periods of positron emission data acquisition, it may extend the overall length of the treatment session.

The PET system may interlock or cease positron emission data acquisition afterglow levels exceed a predetermined threshold. In one variation, the bias current of the PET detector photodetectors may be measured and if the bias current exceeds a predetermined bias current interlock threshold, the PET detector(s) may interlock and cease data acquisition. The system controller may continue to poll the bias current at regular intervals, optionally generating notifications to a clinician or technician that indicate the bias current levels and/or afterglow levels. The PET detector(s) may resume data collection (i.e., clear the interlock) when the bias current value is lower than an interlock-release threshold. In some variations, the interlock-release threshold may be the same as the interlock threshold, while in other variations, the interlock-release threshold may be less than (e.g., lower than) the interlock threshold.

Oscillating Scatter Shield

Some variations of a radiotherapy system may comprise a movable radiation shield or filter that may be disposed over the PET detectors during a radiation pulse and moved away from the PET detectors after the radiation pulse. The radiation shield or filter may absorb scattered radiation and/or deflect scattered radiation away from PET detectors, which may help to reduce the amount of PET detector afterglow. A physical shield or filter that eclipses the PET detectors during linac pulses may also help reduce or eliminate the back-projection information associated with the linac pulses. In some variations, the shield may eclipse the PET detectors during the linac pulses and expose the PET detectors before or after the linac pulses. Because of the inertia associated with a physical shield or filter, some of the PET detectors may be eclipsed for more time than the linac pulse.

For example, emission-guided radiation therapy systems may comprise a plurality of PET detectors and a linac that are mounted on a gantry that is rotatable about a patient. Emission data acquired in real-time by the detectors may be analyzed by a system controller. Based on this emission data, the system controller may rotate the gantry to direct radiation from the linac to the PET-avid tumor regions from various firing angles. In some variations, the linac and the PET detectors may be mounted on a rotatable ring-shaped or circular gantry and the patient treatment area may be located along the center of the circular gantry (e.g., along the axis of rotation). A radiation therapy system may comprise a radiation filter ring, which may comprise one or more radiation shields or filters. In some variations, the radiation filter ring may comprise a closed ring structure, while in other variations, the radiation filter ring may comprise one or more ring segments (e.g., open ring, partial segments or arcs of a ring, etc.). The radiation filter ring may be sized to fit within an inner diameter of the first circular gantry. The radiation filter ring may have the same axis of rotation as the first circular gantry, and may move independently from the circular gantry. In some variations, the radiation filter ring may rotate while in other variations, the radiation filter ring may oscillate with respect to the circular gantry, where the radiation filter ring moved into the diameter of the gantry and out of the inner diameter of the gantry in a lateral direction along the axis of rotation of the gantry. In some variations, radiation shields or filters may comprise one or more radiation-blocking or radiopaque components (e.g., panels comprising high-Z materials) that may be circumferentially located along the radiation filter ring. The other portions of the radiation filter ring may be radiation-transmitting or radiotransparent (e.g., comprising low-Z materials). The radiation-blocking section(s) of the radiation filter ring (i.e., the portions of the radiation filter ring where the radiation-blocking components are located) may have a size and shape that corresponds to the size and shape of the PET sensor arrays. In a first configuration (e.g., a radiation-blocking configuration), the radiation filter ring may be located such that the radiation-blocking sections are disposed over the PET detector arrays. In a second configuration (e.g., a radiation-transparent configuration), the radiation filter ring may be located such that the radiotransparent sections (i.e., the portions of the radiation filter ring which do not have radiation-blocking components) are disposed over the PET detector arrays. A motion controller (that may be separate and/or independent from the motion controller for the first circular gantry) coupled to the radiation filter ring may rotate or oscillate the radiation filter ring to transition between the first and second configuration. The motion controller for the radiation filter ring may comprise an actuator, motor, and/or drive mechanism coupled to the filter ring that supplies a motive force sufficient for changing the position of the filter ring according to a specific time interval or schedule (as described further below). In some variations, the motion controller may comprise a spring mechanism having one or more springs and an actuator system or mechanism (e.g., a pneumatic or hydraulic actuator, cam-based motor, slotted-link motor, electromagnetic actuators, etc.). The spring mechanism may assist the actuator system or mechanism by providing an additional motive force to help expedite filter ring motion and/or offset any energy loss in the motion system due to frictional and/or drag forces.

In some variations, a rotatable radiation filter ring may make one half of a rotation for each linac pulse. Alternatively or additionally, an oscillating radiation filter ring may make half a cycle for each linac pulse. An oscillating radiation filter ring may be centered over the PET detector arrays so that its velocity (e.g., the lateral speed at which it moves across the PET detector arrays into and out of the inner diameter of the gantry) is higher when the radiation-blocking sections eclipse the PET detectors as compared to its velocity when the radiation-transmitting sections are disposed over the PET detectors. The time during which the PET detector arrays are obstructed or shielded from scattered radiation (e.g., from a linac pulse) is relatively short as compared to the time during which the PET detector arrays are unobstructed. That is, for a given linac pulse duty cycle, the PET detectors are in PET data acquisition mode and as such, may be unobstructed by the radiation-blocking sections of the radiation filter ring. For example, the motion controller may be synchronized with the linac such that it moves the radiation filter ring into the first configuration during a linac pulse (and optionally, for a time period before and/or after the pulse) and it moves the radiation filter ring into the second configuration after the pulse (e.g., during the inter-pulse interval). The duty cycle, pulse width, pulse frequency of the linac pulse may be communicated to the radiation filter ring motion controller such that the radiation filter ring is in the first configuration during a linac pulse. In some variations, a motion controller may oscillate the radiation filter ring to cover several times the PET detector array width in its path. The length of the oscillation displacement of the radiation filter ring (e.g., the circumferential or arc length of swept by the radiation filter ring as it oscillates between the first configuration and the second configuration) may be selected such that it is greater than the width of a PET detector array. This may help to reduce the proportion of the PET detectors that are obscured when the oscillating radiation filter ring is in the first configuration. For example, an oscillation displacement having a length that is nine times the width of the PET detector array width eclipses only 5% of the available PET events.

FIGS. 8A-8B depict one variation of a radiation therapy system 800 comprising PET detector arrays 802a, 802b and a rotatable radiation filter ring 804 around a bore 803 of the system. The rotatable radiation filter ring 804 comprises a first radiation-blocking section 806a and a second radiation-blocking section 806b. The diameter of the rotatable radiation filter ring may be such that it that approximates the inner diameter of a circular gantry upon which the PET detector arrays are mounted. In some variations, the diameter of the rotatable radiation filter ring may be less than the inner diameter of the circular gantry. The PET detector arrays 802a, 802b may be located across from each other (e.g., opposite each other, such that the center of the first PET detector array 802a is located about 180 degrees from the center of the second PET detector array 802b). Similarly, to correspond with the arrangement of the PET detector arrays 802a, 802b, the radiation-blocking sections 806a, 806b may also be located across from each other. The length of the radiation-blocking section 806a, 806b may be selected such that their circumferential length corresponds with the circumferential length of the PET detector arrays 802a, 802b. FIG. 8A depicts a first configuration of rotatable radiation filter ring 804 where the radiation-blocking sections 806a, 806b (which may comprise one or more high-Z materials) are disposed or aligned over the PET detector arrays 802a, 802b. For example, the rotatable radiation filter ring may be in this first configuration during a linac pulse. FIG. 8B depicts a second configuration of the rotatable radiation filter ring 804 where the radiation-blocking sections 806a, 806b are not disposed over (i.e., are misaligned to) the PET detector arrays when the linac is inactive (e.g., not emitting a pulse, or within an inter-pulse interval). FIG. 8C is a schematic cross-sectional view of the system 800 of FIGS. 8A-8B. FIG. 8C depicts the rotatable radiation filter ring in the first configuration, where the radiation-blocking sections are disposed over the PET detector arrays such that the PET detector arrays 802a, 802b are shielded from radiation along a treatment plane 801 through the bore 803.

Figure 9B:
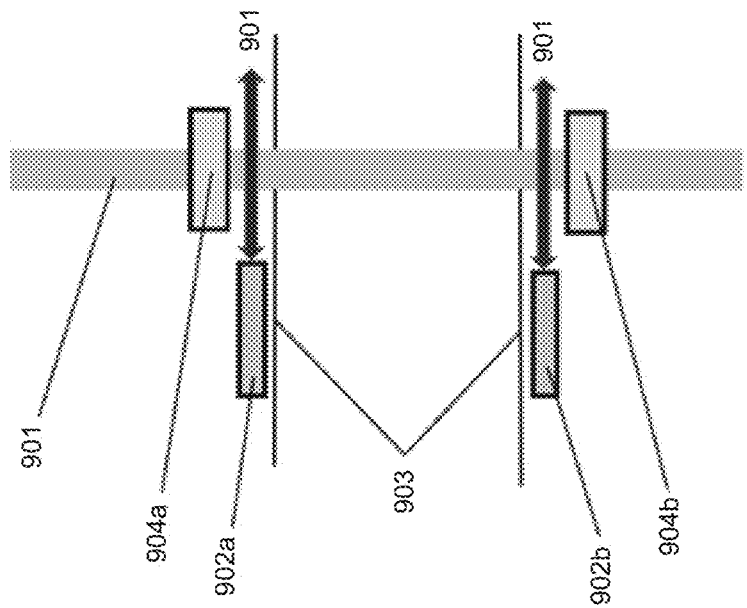
FIG. 9B is a schematic depiction of the radiation filter ring of FIG. 9A in a second configuration.
Figure 9A:
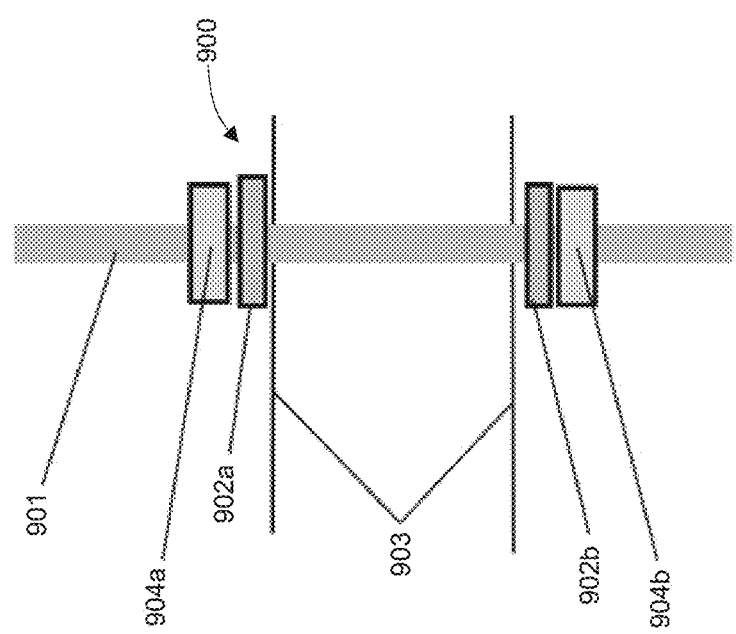
FIG. 9A is a schematic depiction of another variation of a radiation filter ring in a first configuration.

FIGS. 9A-9B depict a schematic cross-sectional view of another variation of a radiation filter ring 900, where instead of rotating the radiation filter ring within the inner diameter of the circular gantry (which may be disposed around a bore 903), the radiation filter ring 900 laterally oscillates into and out the inner diameter of the circular gantry. The oscillating radiation filter ring 900 may comprise first and second radiation-blocking sections 902a, 902b, which may have a size and shape that corresponds with the size and shape of the PET detector arrays 904a, 904b. FIG. 9A depicts a first configuration of the oscillating radiation filter ring 900 where the oscillating radiation filter ring is located within the inner diameter of the circular gantry (i.e., the radiation-blocking sections are disposed over the PET detector arrays). As described above, the radiation-blocking sections may comprise one or more panels of high-Z materials for reflecting and/or absorbing scattered radiation, and when disposed over the PET detector arrays, may help to reduce PET detector afterglow by reducing or eliminating the incidence of scattered radiation on the PET detectors. FIG. 9B depicts a second configuration of the oscillating radiation filter ring, where the radiation-blocking sections 902a, 902b are not disposed over (i.e., are not aligned to) the PET detector arrays. The lateral movement of the oscillating radiation filter ring is indicated by the arrows 901. The oscillating radiation filter ring may be in the first configuration during the linac pulse such that the PET detector arrays 904a, 904b are shielded from radiation along a treatment plane 901 through the bore 903, and may be in the second configuration when the linac is inactive (e.g., not emitting a pulse, or within an inter-pulse interval).

While the variations of rotatable or oscillating radiation filter rings described above are circular or ring-shaped, in other variations, radiation filters may be blocks of radiation-blocking or radiopaque materials that are moved over the PET detectors during time intervals where high levels of scattered radiation are expected and moved away from the PET detectors during time intervals where relatively low levels of scattered radiation are expected. For example, radiation filters may be mounted on arms, rails, etc. and/or may be coupled to actuators or motors that move them over and away from the PET detectors.

EXAMPLES

Figure 10A:
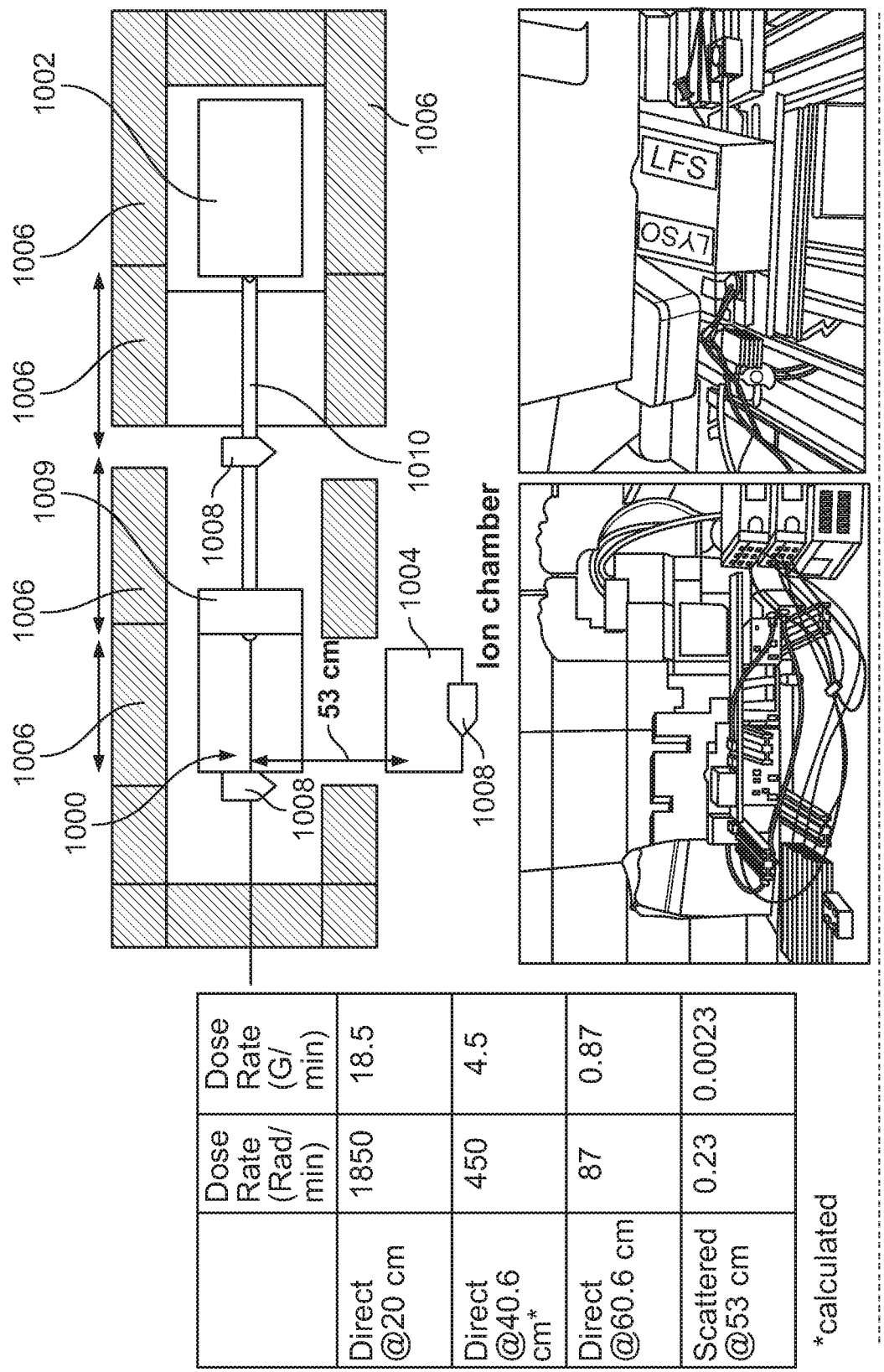
FIG. 10A depicts the parameters and arrangement of an experimental setup for measuring PET detector afterglow.
Figure 10B:
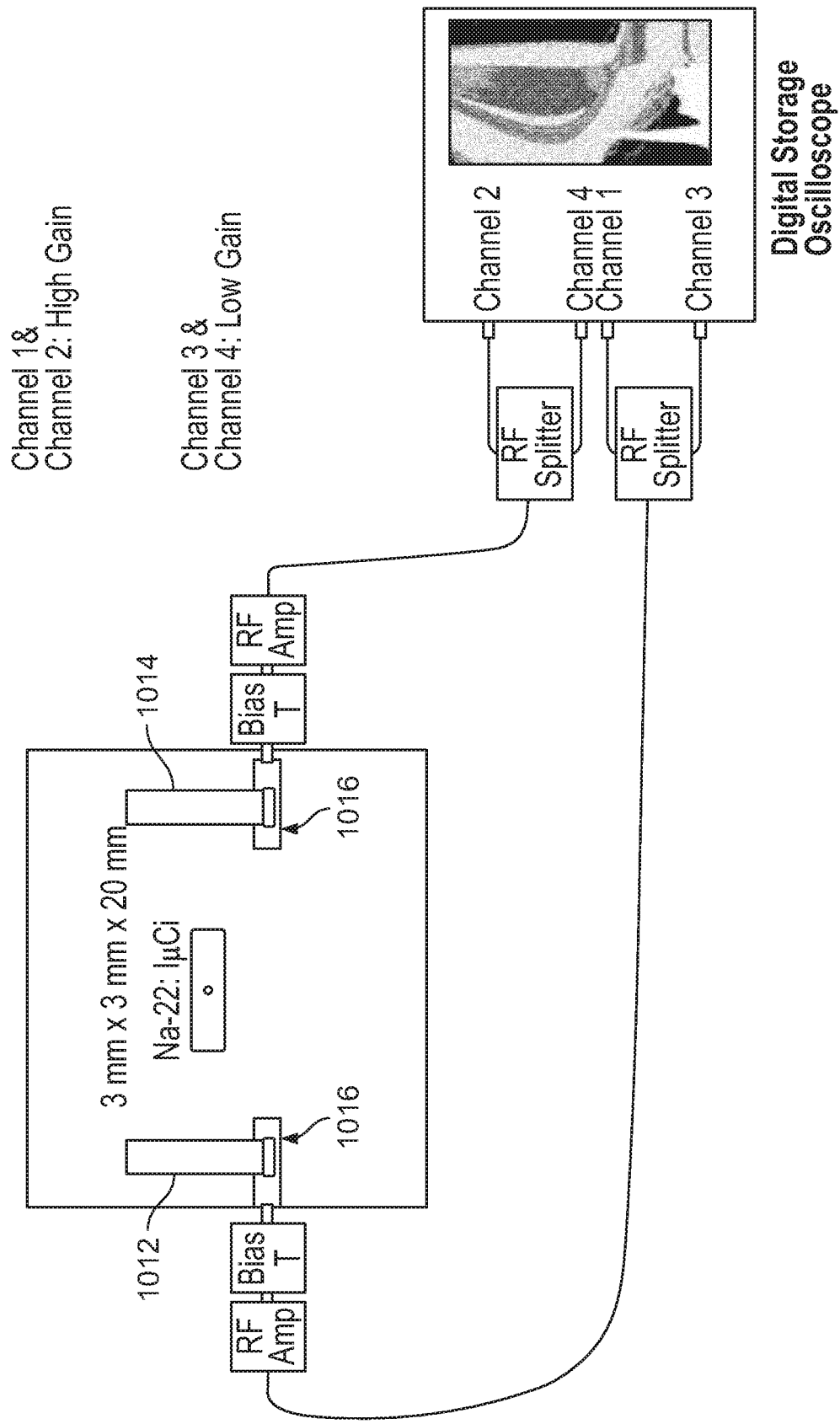
FIG. 10B is a schematic depiction of an arrangement of an experimental setup for measuring the dark count rate of single crystal PET detectors.

FIG. 10A depicts one example of an experimental setup where the PET detector afterglow was measured and characterized. Short term and long term afterglow on the PET detectors were measured. An acrylic scattering target 1000 was used to scatter radiation from a 6 MeV linac 1002. The target 1000 was a 40 cm×40 cm×20 cm block of acrylic. The scattered radiation incident on two PET detectors run in coincidence was measured using a PET detector 1004, to simulate the radiation scattering of a patient. The center of the target 1000 was 53 cm from the PET detector 1004. The 6 MeV linac 1002 generated a 10 cm×10 cm field of X-ray radiation onto the acrylic phantom 1000 with a 3 us pulse width at 153 Hz. The entire setup was enclosed by a plurality of lead blocks 1006, each having a length of about 20 cm. There was a first dose chamber 1008 in the path of the linac beam 1010, a second dose chamber 1008 located behind the PET detectors 1004, and a dose chamber 1008 located on the wall of the target 1000 furthest from the linac 1002. A film 1009 was located on the wall of the target 1000 closest to the linac 1002. FIG. 10B is a schematic depiction of two single crystal PET detectors 1012 (with LYSO scintillation crystal) and 1014 (with LFS scintillation crystal) that were used with the setup of FIG. 10A. Both of the PET detectors 1012, 1014 used a solid state photodetector or photomultiplier 1016 (such as MPPC (SiPM) photodetectors), which were capable of time-of-flight measurements, and were used to measure the effect of scattered radiation on PET data acquisition.

Figure 10C:
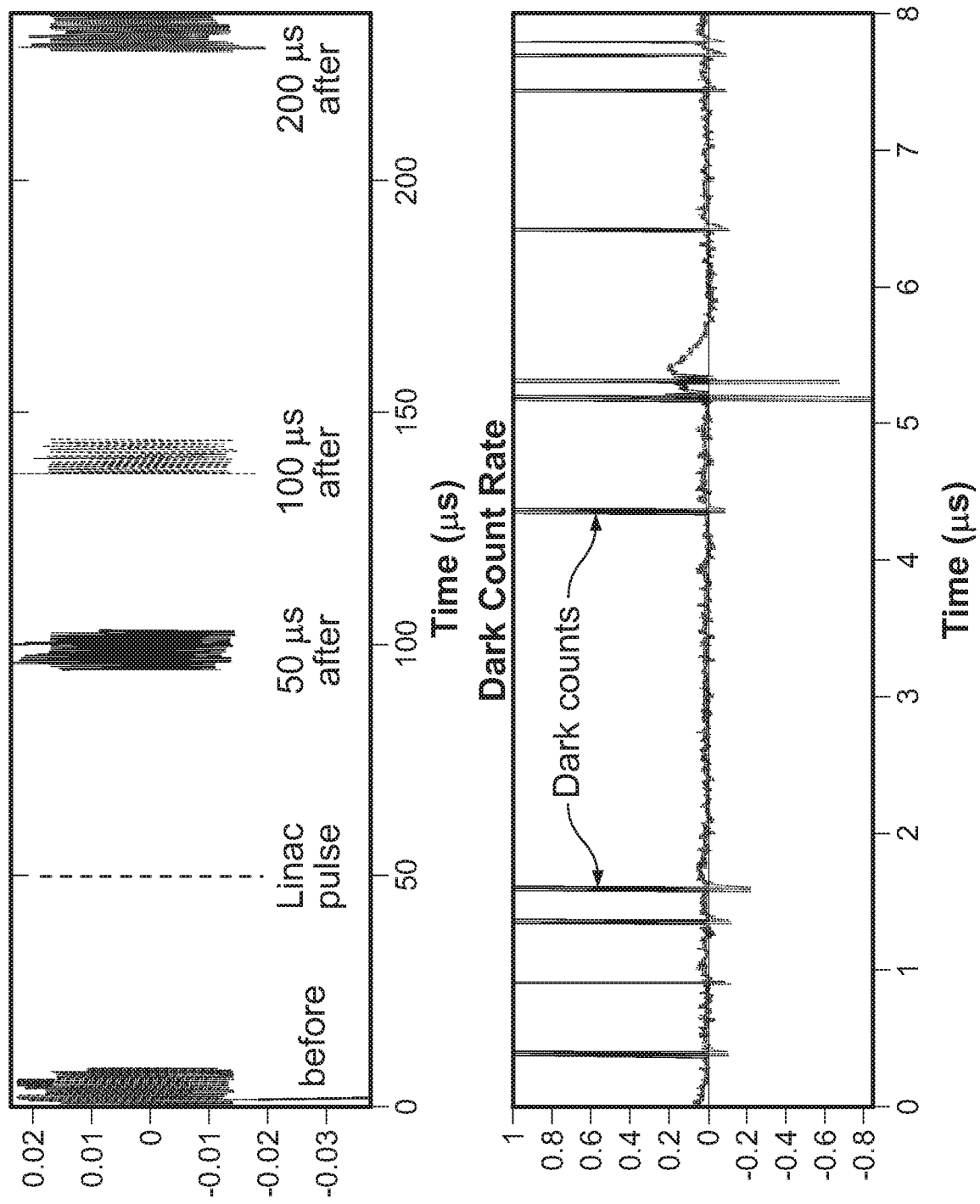
FIG. 10C provides plots of PET detector data and dark counts before, during, and after a linac pulse.

The silicon photomultiplier (SiPM) used in the PET detector may be characterized by its dark-count rate performance. The SiPM may be sensitive to single photons, and dark-counts are thermionic noise events in the detector. The scintillation detector produces a short-term afterglow, and these generate optical photons that persist between scintillation pulses. These approximate the dark-counts from the point-of-view of the detection system. The dark-count rate (DCR) of the sensor was characterized, as a function of when it occurred relative to the LINAC pulse (FIG. 10C). The DCR right before a linac pulse and the DCR 50 μs to 200 μs after the linac pulse were characterized. Based on these analyses, delaying the acquisition of PET data by the controller by about 200 μs helped to reduce the DCR to an acceptable level.

Figure 10D:
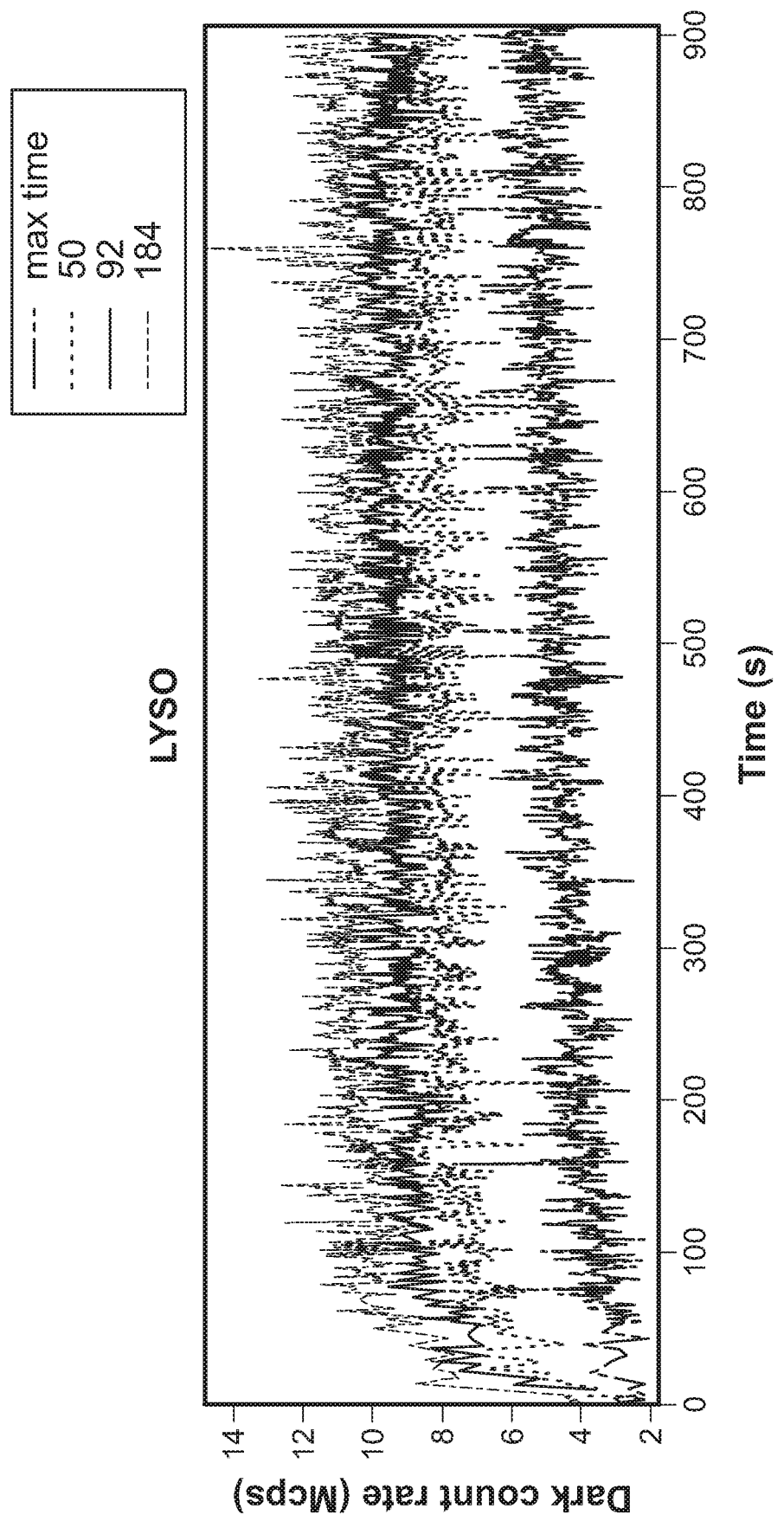
FIG. 10D provides plots of PET detector dark count rates after a linac pulse over time.

The initial DCR for the photo-sensor was 2M dark-counts per second. This matched the specification from the vendor for the device. FIG. 10D depicts the DCR as a function of total time exposure to the linac for a LYSO scintillation crystal. As the linac is pulsed, the minimum DCR was immediately before the linac pulse as expected (FIG. 10D, bottom trace). If the DCR is measured immediately after the linac pulse, it is significantly higher. Therefore, there is a short-time constant decay that contributes to afterglow.

Figure 10E:
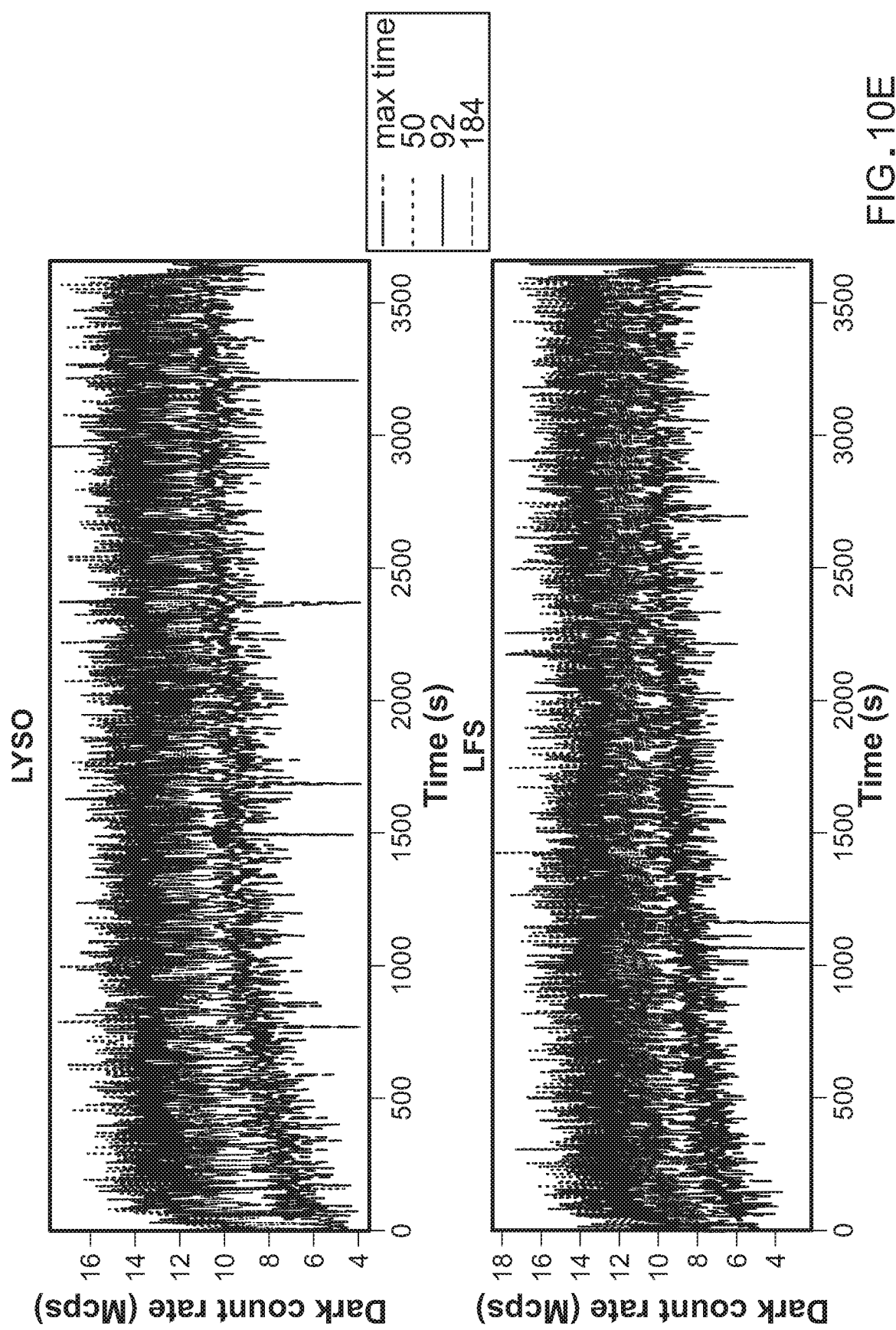
FIG. 10E provides plots of PET detector dark count rates after a linac pulse over time.

FIG. 10E depicts DCR as a function of total time exposure to the linac for a LYSO scintillation crystal for two different crystals: LFS and LYSO. The linac is run for 3600 seconds or 1 hour continuously. As the linac is run over time, the afterglow tends to build up in the scintillation crystal. This after-glow cannot be distinguished from dark-counts of the sensor. It significantly degrades the signal-to-noise ratio of the SiPM. Note, the sensor starts at a DCR of approximately 2M dark-counts/seconds. After 1 hour of afterglow, it increases to well over 10M dark-counts per second, or a factor of 5 worse.

Figure 11:
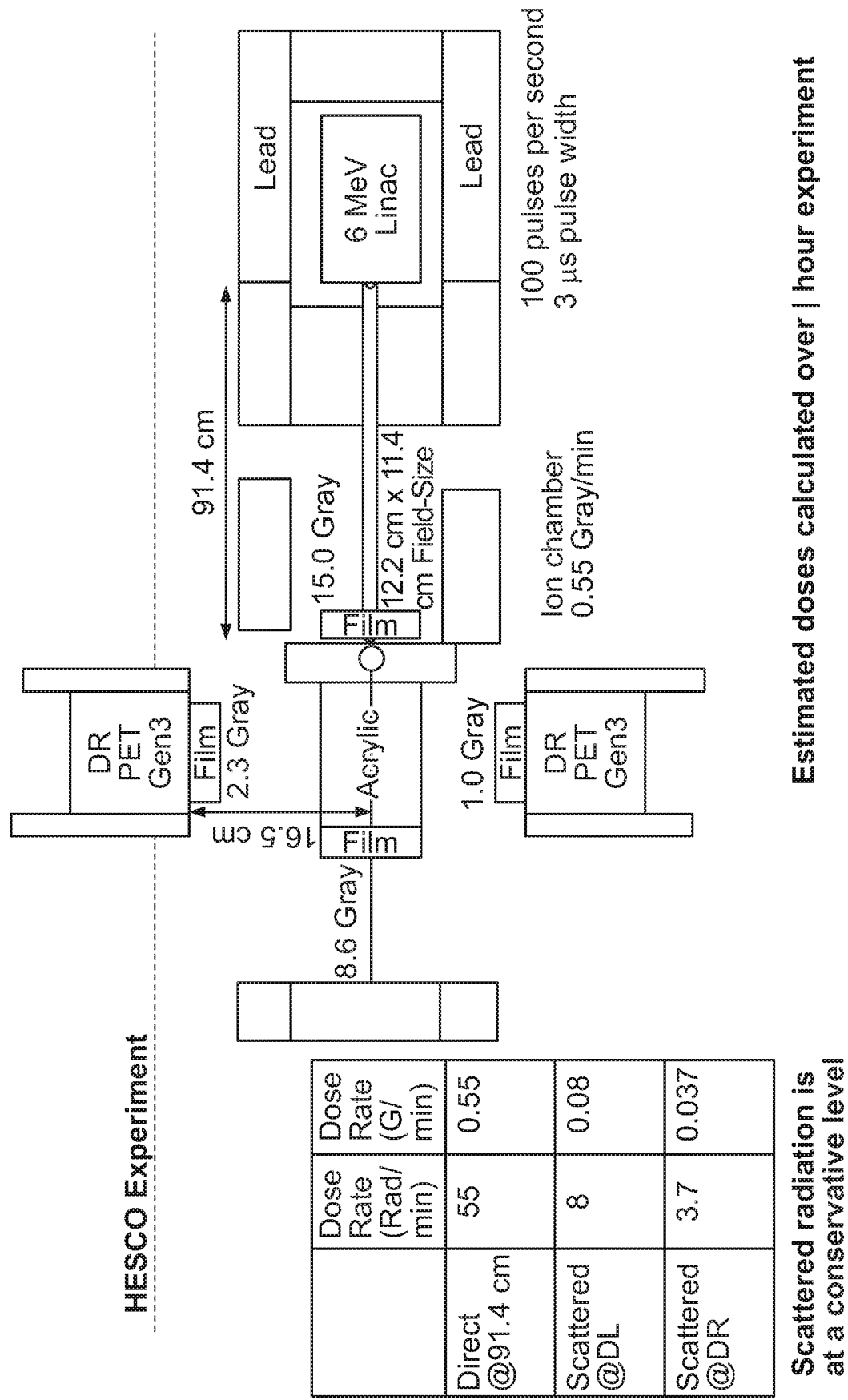
FIG. 11 depicts the parameters and arrangement of another experimental setup for measuring two coincidence multi-crystal PET detector afterglow.

FIG. 11 depicts another example of an experimental setup for measuring afterglow using two multi-crystal PET detectors.

Figure 12:
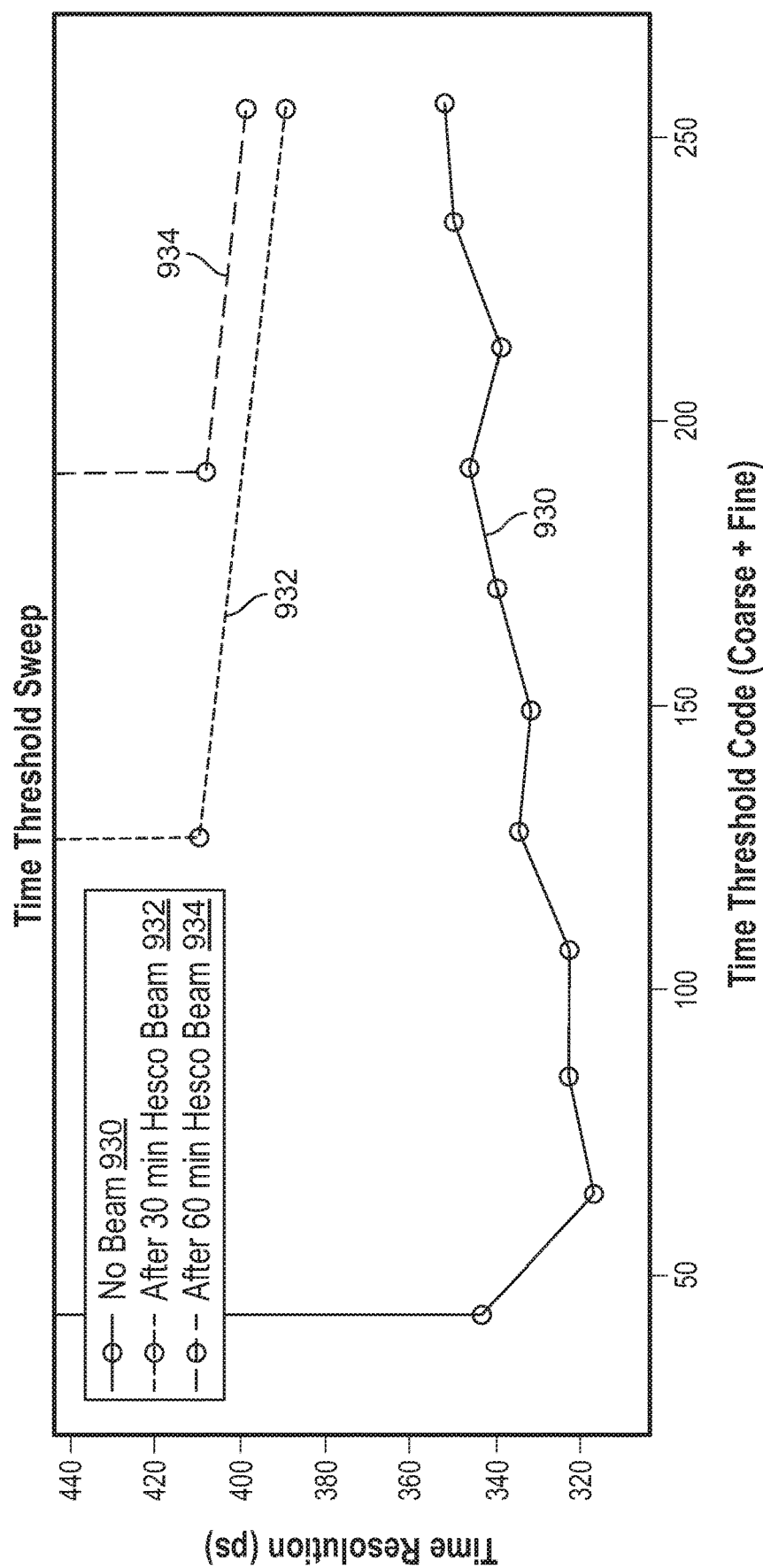
FIG. 12 is a plot of the time resolution of time-of-flight PET detectors as a function of time after a linac pulse.

FIG. 12 depicts a plot of a time-of-flight PET module at various time points after a linac pulse, where each curve depicts the time resolution at different coincidence trigger thresholds. As shown, afterglow noise may be mitigated by increasing the threshold of the PET detector modules (FIG. 11). The afterglow effect was mitigated by changing the trigger threshold of the PET detector electronics. It may be possible to measure the DCR of the system during therapy and adapt the threshold to help improve the timing performance of the system.

The radiation treatment systems described herein may comprise a controller having a processor and one or more memories. A controller may comprise one or more processors and one or more machine-readable memories in communication with the one or more processors. The controller may be connected to a radiation therapy system and/or other systems by wired or wireless communication channels. In some variations, the controller of a radiation treatment system may be located in the same or different room as the patient. For example, the controller may be coupled to a patient platform or disposed on a trolley or medical cart adjacent to the patient and/or operator.

The controller may be implemented consistent with numerous general purpose or special purpose computing systems or configurations. Various exemplary computing systems, environments, and/or configurations that may be suitable for use with the systems and devices disclosed herein may include, but are not limited to software or other components within or embodied on personal computing devices, network appliances, servers or server computing devices such as routing/connectivity components, portable (e.g., hand-held) or laptop devices, multiprocessor systems, microprocessor-based systems, and distributed computing networks.

Examples of portable computing devices include smartphones, personal digital assistants (PDAs), cell phones, tablet PCs, phablets (personal computing devices that are larger than a smartphone, but smaller than a tablet), wearable computers taking the form of smartwatches, portable music devices, and the like.

In some embodiments, a processor may be any suitable processing device configured to run and/or execute a set of instructions or code and may include one or more data processors, image processors, graphics processing units, physics processing units, digital signal processors, and/or central processing units. The processor may be, for example, a general purpose processor, Field Programmable Gate Array (FPGA), an Application Specific Integrated Circuit (ASIC), or the like. The processor may be configured to run and/or execute application processes and/or other modules, processes and/or functions associated with the system and/or a network associated therewith. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, or the like.

In some embodiments, memory may include a database and may be, for example, a random access memory (RAM), a memory buffer, a hard drive, an erasable programmable read-only memory (EPROM), an electrically erasable read-only memory (EEPROM), a read-only memory (ROM), Flash memory, etc. The memory may store instructions to cause the processor to execute modules, processes and/or functions associated with the system, such as one or more treatment plans, imaging data acquired during a previous treatment session and/or current treatment session (e.g., real-time imaging data), biological activity, physiological and/or anatomical data extracted from imaging data, updated or adapted treatment plans, updated or adapted dose delivery instructions, radiation therapy system instructions (e.g., that may direct the operation of the gantry, therapeutic radiation source, multi-leaf collimator, PET detectors, and/or any other components of a radiation therapy system), and image and/or data processing associated with treatment delivery.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs), and holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

A user interface may serve as a communication interface between an operator or clinician and the treatment planning system. The user interface may comprise an input device and output device (e.g., touch screen and display) and be configured to receive input data and output data from one or more of the support arm, external magnet, sensor, delivery device, input device, output device, network, database, and server. Sensor data from one or more sensors may be received by user interface and output visually, audibly, and/or through haptic feedback by one or more output devices. As another example, operator control of an input device (e.g., joystick, keyboard, touch screen) may be received by user and then processed by processor and memory for user interface to output a control signal to one or more support arms, external magnets, intracavity devices, and delivery devices.

In some variations, an output device may comprise a display device including at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, and/or holographic display.

In some variations, a radiation therapy system may be in communication with other computing devices via, for example, one or more networks, each of which may be any type of network (e.g., wired network, wireless network). A wireless network may refer to any type of digital network that is not connected by cables of any kind. Examples of wireless communication in a wireless network include, but are not limited to cellular, radio, satellite, and microwave communication. However, a wireless network may connect to a wired network in order to interface with the Internet, other carrier voice and data networks, business networks, and personal networks. A wired network is typically carried over copper twisted pair, coaxial cable and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, and virtual private networks (VPN). Hereinafter, network refers to any combination of wireless, wired, public and private data networks that are typically interconnected through the Internet, to provide a unified networking and information access system.

Cellular communication may encompass technologies such as GSM, PCS, CDMA or GPRS, W-CDMA, EDGE or CDMA2000, LTE, WiMAX, and 5G networking standards. Some wireless network deployments combine networks from multiple cellular networks or use a mix of cellular, Wi-Fi, and satellite communication. In some embodiments, the systems, apparatuses, and methods described herein may include a radiofrequency receiver, transmitter, and/or optical (e.g., infrared) receiver and transmitter to communicate with one or more devices and/or networks.

The invention claimed is:

1. A radiation therapy system comprising:
a therapeutic radiation source configured to output radiation by directing one or more radiation pulses toward a PET-avid region of interest, wherein each radiation pulse has a predetermined pulse duration;
a plurality of PET detectors configured to detect a positron annihilation emission path by detecting a pair of positron annihilation photons incident upon a portion of the detectors within a coincidence time-window and to generate a detector signal that exceeds a coincidence trigger threshold; and
a controller in communication with the plurality of PET detectors, wherein the controller is configured to adjust the coincidence trigger threshold during a therapy session in response to afterglow of the PET detectors caused by the one or more radiation pulses, wherein the coincidence trigger threshold is adjusted based on the radiation output of the therapeutic radiation source.

2. The system of claim 1, wherein the controller is configured to adjust the coincidence trigger threshold after a threshold number of radiation pulses have been directed toward the region of interest.

3. The system of claim 2, wherein the coincidence trigger threshold is from about two photon-triggers to about five photon-triggers.

4. The system of claim 3, wherein the coincidence trigger threshold is a first coincidence trigger threshold and the threshold number of radiation pulses is a first threshold number of radiation pulses, and wherein the controller is configured to adjust the first coincidence trigger threshold to a second coincidence trigger threshold after a second threshold number of radiation pulses have been directed toward the region of interest.

5. The system of claim 4, wherein the second coincidence trigger threshold is greater than the first coincidence trigger threshold and the second threshold number of radiation pulses is greater than the first threshold number of radiation pulses.

6. The system of claim 5, wherein the second coincidence trigger threshold is from about four photon-triggers to about six photon-triggers, and the second threshold number of radiation pulses is about 2,000.

7. The system of claim 6, wherein the second coincidence trigger threshold is less than the first coincidence trigger threshold and the second threshold number of radiation pulses is greater than the first threshold number of radiation pulses.

8. The system of claim 2, wherein the controller is configured to adjust the coincidence trigger threshold at least partially based on a timing schedule of the radiation pulses.

9. The system of claim 1, wherein the controller is configured to adjust the coincidence trigger threshold based on changes in timing greater than 10% from baseline.

10. The system of claim 1, wherein the controller is configured to adjust the coincidence trigger threshold when a dark count rate of one or more of the plurality of PET detectors exceeds a threshold dark count rate.

11. The system of claim 10, wherein the threshold dark count rate is from about 3 Mcps to about 10 Mcps.

12. The system of claim 1, wherein the controller further comprises a current detector configured to measure a bias current of one or more of the plurality of PET detectors, and wherein the controller is configured to adjust the coincidence trigger threshold when the bias current exceeds a threshold bias current value.

13. The system of claim 12, wherein the threshold bias current value is from about 0.1 mA to about 1 mA.

14. The system of claim 1, wherein the controller is configured to adjust the coincidence trigger threshold when the amount of radiation emitted from the therapeutic radiation source exceeds a threshold radiation level.

15. The system of claim 14, wherein the threshold radiation level is from about 0.1 cGy/min to about 1 cGy/min.

16. The system of claim 1, wherein the controller further comprises a signal processor and a switch configured to selectively communicate a PET detector output signal to the signal processor, wherein the switch is configured to suspend communication of the PET detector output signal to the signal processor for a predetermined period of time following each radiation pulse, wherein a ratio of the predetermined period of time to the duration of each radiation pulse is between about 25:1 to about 100:1.

17. The system of claim 16, wherein the controller is configured to suspend communication of the PET detector output signal to the signal processor for the duration of each radiation pulse and the predetermined period of time following each radiation pulse.

18. The system of claim 17, wherein the controller is configured to suspend communication of the PET detector output signal to the signal processor based on a gate signal.

19. The system of claim 18, wherein the gate signal causes the controller to suspend communication of the PET detector output signal to the signal processor for at least 100 μs following each radiation pulse.

20. A method for automatically adjusting the coincidence trigger threshold for PET detectors comprising:
measuring a characteristic of a radiation therapy system comprising two or more PET detectors having a coincidence trigger threshold;
determining whether the measured characteristic exceeds a pre-determined threshold for that characteristic; and
adjusting the coincidence trigger threshold based on the determination of whether the measured characteristic exceeds the threshold for that characteristic.

21. The method of claim 20, wherein adjusting the coincidence trigger threshold comprises increasing the coincidence trigger threshold if the measured characteristic exceeds the pre-determined threshold for that characteristic or decreasing the coincidence trigger threshold if the measured characteristic is at or below the pre-determined threshold for that characteristic.

22. The method of 21, wherein the measured characteristic is a dark count rate of the two or more PET detectors and the pre-determined threshold is a dark count rate threshold.

23. The method of 21, wherein the measured characteristic is a bias current of the two or more PET detectors and the pre-determined threshold is a bias current threshold.

24. The method of 21, wherein the radiation therapy system comprises a temperature sensor, and wherein the measured characteristic is temperature and the pre-determined threshold is a temperature threshold.

25. The method of 21, wherein the radiation therapy system comprises a radiation source having a pulse counter, and wherein the measured characteristic is a pulse count measured from the pulse counter and the pre-determined threshold is a pulse count threshold.

26. The method of 21, wherein the radiation therapy system comprises a radiation source and a collimator, wherein the radiation source and the collimator are configured to operate together with a pre-determined timing tolerance, and wherein the measured characteristic is the amount of deviation from the pre-determined timing tolerance and the pre-determined threshold is a timing deviation threshold.

27. A method for detecting positron annihilation emission paths, the method comprising:
outputting radiation by directing one or more therapeutic radiation beam pulses to a target region, wherein the target region is PET-avid;
detecting a first positron annihilation emission path defined by a first pair of positron annihilation photons that are incident upon a portion of a plurality of PET detectors within a time-window and that generate a detector signal that exceeds a first coincidence trigger threshold;
adjusting the first coincidence trigger threshold to a second coincidence trigger threshold in response to afterglow of the PET detectors caused by the one or more therapeutic radiation beam pulses, wherein the second coincidence trigger threshold is determined based on the therapeutic beam radiation output; and
detecting a second positron annihilation emission path defined by a second pair of positron annihilation photons that are incident upon a portion of the plurality of PET detectors within the time-window and that generate a detector signal that exceeds the second coincidence trigger threshold.

28. The method of claim 27, wherein the first coincidence trigger threshold is adjusted to a second coincidence trigger threshold after a predetermined number of therapeutic radiation beam pulses have been directed to the target region.

29. The method of claim 28, wherein adjusting the first coincidence trigger threshold is at least partially based on a timing schedule of radiation pulses.

30. The method of claim 28, wherein the second coincidence trigger threshold has a greater value than the first coincidence trigger threshold.

31. The method of claim 28, wherein the second coincidence trigger threshold is about four photon-triggers and the first coincidence trigger threshold is about two photon-triggers.

32. The method of claim 28, wherein the predetermined number of therapeutic radiation pulses is a first predetermined number of therapeutic radiation pulses, and wherein the method further comprises
adjusting the second coincidence trigger threshold to a third coincidence trigger threshold after a second predetermined number of therapeutic radiation pulses have been directed to the target region; and
detecting a third positron annihilation emission path defined by a third pair of positron annihilation photons that are incident upon a portion of the plurality of PET detectors within the time-window and that generate a detector signal that exceeds the third coincidence trigger threshold.

33. The method of claim 32, wherein the third coincidence trigger threshold is greater than the second coincidence trigger threshold and the second predetermined number of therapeutic radiation pulses is greater than the first predetermined number of therapeutic radiation pulses.

34. The method of claim 33, wherein the third coincidence trigger threshold is from about four photon-triggers to about six photon-triggers, and the second predetermined number of therapeutic radiation pulses is about 2,000.

35. The method of claim 27, wherein the therapeutic radiation beam pulses each have a pulse width, and the plurality of PET detectors are in communication with a controller comprising a signal processor and wherein the method further comprises
suspending communication of data from the PET detectors to the signal processor is for a predetermined period of time following each therapeutic radiation pulse, wherein a ratio of the predetermined period of time to the pulse width is between about 25:1 and about 100:1.

36. The method of claim 35, wherein suspending communication of the data is based on a gate signal.

37. The method of claim 36, wherein the gate signal causes suspension of communication of data from the PET detectors to the signal processor for at least 100 µs following the therapeutic radiation pulse.

38. The method of claim 27, wherein the first coincidence trigger threshold is adjusted to a second coincidence trigger threshold when a dark count rate of one or more of the plurality of PET detectors exceeds a threshold dark count rate.

39. The method of claim 38, wherein the threshold dark count rate is from about 3 Mcps to about 10 Mcps.

40. The method of claim 27, wherein the first coincidence trigger threshold is adjusted to a second coincidence trigger threshold when a bias current of one or more of the plurality of PET detectors exceeds a threshold bias current value.

41. The method of claim 40, wherein the threshold bias current value is from about 0.1 mA to about 1 mA.

42. The method of claim 27, wherein the first coincidence trigger threshold is adjusted to a second coincidence trigger threshold when an amount of emitted radiation exceeds a threshold radiation level.

43. The method of claim 42, wherein the threshold radiation level is from about 0.1 cGy/min to about 1 cGy/min.

* * * * *